United States Patent
Beall et al.

(10) Patent No.: US 10,403,050 B1
(45) Date of Patent: Sep. 3, 2019

(54) MULTI-USER VIRTUAL AND AUGMENTED REALITY TRACKING SYSTEMS

(71) Applicant: WorldViz, Inc., Santa Barbara, CA (US)

(72) Inventors: Andrew C. Beall, Santa Barbara, CA (US); Christopher Coffin, Goleta, CA (US); Todd Hartwig, Santa Barbara, CA (US)

(73) Assignee: WorldViz, Inc., Santa Barbara, CA (US)

( * ) Notice: Subject to any disclaimer, the term of this patent is extended or adjusted under 35 U.S.C. 154(b) by 0 days.

(21) Appl. No.: 15/948,729

(22) Filed: Apr. 9, 2018

Related U.S. Application Data

(60) Provisional application No. 62/483,845, filed on Apr. 10, 2017.

(51) Int. Cl.
| | | |
|---|---|---|
| *G06T 1/20* | (2006.01) | |
| *G06T 19/00* | (2011.01) | |
| *G02B 27/01* | (2006.01) | |
| *G06T 7/292* | (2017.01) | |
| *G06F 3/0481* | (2013.01) | |

(52) U.S. Cl.
CPC .......... *G06T 19/006* (2013.01); *G02B 27/017* (2013.01); *G06F 3/04815* (2013.01); *G06F 3/04817* (2013.01); *G06T 7/292* (2017.01)

(58) Field of Classification Search
CPC ... G06T 19/006; G06T 7/292; G06F 3/04817; G06F 3/04815; G02B 27/017
See application file for complete search history.

(56) References Cited

U.S. PATENT DOCUMENTS

| | | | |
|---|---|---|---|
| 6,574,352 B1* | 6/2003 | Skolmoski | G09B 9/307 348/115 |
| 6,720,949 B1 | 4/2004 | Pryor et al. | |
| 7,719,484 B2 | 5/2010 | Turner et al. | |
| 8,472,120 B2 | 6/2013 | Border et al. | |
| 8,482,859 B2* | 7/2013 | Border | G02B 27/017 353/28 |
| 8,570,378 B2 | 10/2013 | Zalewskl et al. | |
| 8,806,354 B1* | 8/2014 | Hyndman | G06F 3/04883 709/204 |
| 9,110,503 B2 | 8/2015 | Beall et al. | |
| 9,152,305 B2* | 10/2015 | Xu | G06F 16/4393 |

(Continued)

OTHER PUBLICATIONS

Ambisonic 3D Auralizer System, WorldViz, LLC, 2 pages, Sep. 27, 2014, https://web.archive.org/web/20140927060932/http://www.worldviz.com/products/ambisonic.

(Continued)

*Primary Examiner* — Martin Mushambo
(74) *Attorney, Agent, or Firm* — Knobbe, Martens, Olson & Bear LLP

(57) ABSTRACT

An aspect of the disclosure relates to an example marker identification and position tracking system configured to interface and work in conjunction with a marker device and camera system and to provide high fidelity tracking of user and object motion in a virtual and/or augmented reality experience. The example computing system enables use case scenarios in which certain computer aided design capabilities enable rapid creation/configuration of a multi-user, interactive, virtual reality, and/or augmented reality slide presentation experience.

19 Claims, 36 Drawing Sheets

(56) References Cited

U.S. PATENT DOCUMENTS

| | | | |
|---|---|---|---|
| 9,153,195 B2 * | 10/2015 | Geisner | G09G 5/00 |
| 9,159,168 B2 * | 10/2015 | Elber | G06T 19/20 |
| 9,183,807 B2 * | 11/2015 | Small | G09G 5/00 |
| 9,213,405 B2 * | 12/2015 | Perez | H04N 21/25891 |
| 9,541,634 B2 | 1/2017 | Beall et al. | |
| 9,595,298 B2 * | 3/2017 | Lee | G11B 27/28 |
| 9,692,990 B2 | 6/2017 | Beall et al. | |
| 9,792,491 B1 | 10/2017 | Ramaswamy | |
| 9,792,714 B2 * | 10/2017 | Li | G06T 13/40 |
| 9,804,257 B2 | 10/2017 | Pusch et al. | |
| 2002/0036617 A1 * | 3/2002 | Pryor | G06F 3/042 345/156 |
| 2004/0130566 A1 * | 7/2004 | Banerjee | G11B 27/034 715/716 |
| 2008/0219566 A1 | 9/2008 | Teoh | |
| 2008/0310714 A1 | 12/2008 | Stern | |
| 2010/0070859 A1 | 3/2010 | Shuster | |
| 2010/0185124 A1 | 7/2010 | Bisbee, III | |
| 2010/0311512 A1 * | 12/2010 | Lock | A63F 13/00 473/199 |
| 2012/0092328 A1 | 4/2012 | Flaks | |
| 2012/0156652 A1 * | 6/2012 | Lane | F41J 9/14 434/11 |
| 2012/0178054 A1 * | 7/2012 | Jomander | G09B 9/307 434/38 |
| 2012/0194419 A1 | 8/2012 | Osterhout et al. | |
| 2012/0194420 A1 | 8/2012 | Osterhout et al. | |
| 2012/0194549 A1 | 8/2012 | Osterhout et al. | |
| 2012/0194551 A1 | 8/2012 | Osterhout et al. | |
| 2012/0194552 A1 * | 8/2012 | Osterhout | G02B 27/0093 345/633 |
| 2012/0200601 A1 | 8/2012 | Osterhout et al. | |
| 2012/0206334 A1 | 8/2012 | Osterhout et al. | |
| 2012/0212406 A1 | 8/2012 | Osterhout et al. | |
| 2012/0212499 A1 * | 8/2012 | Haddick | G02B 27/0093 345/589 |
| 2013/0050426 A1 | 2/2013 | Sarmast | |
| 2013/0223679 A1 | 8/2013 | Russ | |
| 2013/0271457 A1 | 10/2013 | Haswell | |
| 2014/0064552 A1 | 3/2014 | Miyagi | |
| 2014/0152550 A1 * | 6/2014 | Beall | G06F 3/012 345/156 |
| 2014/0361956 A1 * | 12/2014 | Mikhailov | G02B 27/0179 345/8 |
| 2015/0193018 A1 | 7/2015 | Venable et al. | |
| 2015/0215581 A1 | 7/2015 | Barzuza | |
| 2015/0235426 A1 | 8/2015 | Lyons | |
| 2015/0235434 A1 * | 8/2015 | Miller | G06T 19/006 345/633 |
| 2015/0346327 A1 | 12/2015 | Beall et al. | |
| 2016/0129346 A1 | 5/2016 | Mikhailov | |
| 2016/0140930 A1 | 5/2016 | Pusch et al. | |
| 2016/0189429 A1 * | 6/2016 | Mallinson | G02B 26/10 345/633 |
| 2016/0239472 A1 | 8/2016 | Kasahara | |
| 2016/0262608 A1 * | 9/2016 | Krueger | A61B 3/0041 |
| 2016/0266644 A1 | 9/2016 | Yamamoto | |
| 2016/0321841 A1 | 11/2016 | Christen | |
| 2017/0038829 A1 | 2/2017 | Lanier | |
| 2017/0094197 A1 | 3/2017 | Beall et al. | |
| 2017/0177939 A1 | 6/2017 | Beall et al. | |
| 2017/0178272 A1 | 6/2017 | Lashkari et al. | |
| 2017/0330362 A1 | 11/2017 | Sumner | |
| 2018/0306898 A1 * | 10/2018 | Pusch | G06F 3/011 |
| 2018/0314323 A1 | 11/2018 | Mikhailov | |

OTHER PUBLICATIONS

Augmented Reality, WorldViz, LLC, 3 pages, Sep. 27, 2014, https://web.archive.org/web/20140927061320/http:/www.worldviz.com/products/augmented-reality.

Head Mounted Displays, WorldViz, LLC, 2 pages, Sep. 26, 2014 https://web.archive.org/web/20140926011241/http://www.worldviz.com/products/head-mounted-displays.

Motion Tracking, World Viz, 4 pages, 2012.

Other VR Hardware, WorldViz, LLC, 15 pages, Sep. 27, 2014, https://web.archive.org/web/20140927061334/http://www.worldviz.com/products/other-vr-hardware.

Precision Position Tracking for Virtual Reality, WorldViz, LLC, 2 pages, Oct. 24, 2014, https://web.archive.org/web/20141024142530/http:/www.worldviz.com/products/ppt.

"The WorldViz wireless 6Dof Wand controller is used to navigate in and interact within the 3D model," architecture interactive, 2 pages, 2012.

Vizard Virtual Reality Software Toolkit, 2 pages, Sep. 26, 2014, https://web.archive.org/web/20140924064245/http:/www.worldviz.com/products/vizard.

* cited by examiner

MULTI-USER VIRTUAL AND AUGMENTED REALITY TRACKING SYSTEMS

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for multi-user interactions in association with virtual reality and/or augmented reality simulations.

BACKGROUND

Virtual Reality (VR) comprises a computer simulated environment that can simulate a physical presence in places in the real world or imagined worlds. Conventionally, virtual reality environments are primarily visual experiences, displayed on a screen (e.g., and viewed by a user using 3D glasses) or through special stereoscopic display head gear. The simulated environments can be configured to be similar to the real world in order to create lifelike experiences, or the simulated environments can differ significantly from the real word, such as in VR games.

Augmented Reality (AR) generally refers to a computer simulated environment combined with the real world. Conventionally, the elements of the real world are augmented with computer generated graphics. Often, translucent stereoscopic headsets are worn by the user in AR simulations to enable a wearer to view the real world through the headset while also being able to view computer generated graphics.

Movement of participants and/or objects in interactive VR and AR simulations may be tracked using various methods and devices.

Multi-user environments greatly expands the potential of virtual environments by allowing two or more users to inhabit the same virtual world. As such, people can socialize, play games, or otherwise interact in an entirely digital/virtual context. Moreover, a user can be in a completely different part of the planet and still experience the "physical" presence of another participant.

SUMMARY OF THE INVENTION

An aspect of the disclosure relates to an example marker identification and position tracking system configured to interface and work in conjunction with a marker device and camera system and to provide high fidelity tracking of user and object motion in a virtual and/or augmented reality experience.

An aspect of the disclosure relates to an example computing system configured to interface and work in conjunction with a tracking system and/or certain sensors, to provide a high quality, interactive, multi-user, virtual reality, and/or augmented reality experience. Optionally, the example computing system enables use case scenarios in which certain detected tracking and/or sensor data is provided to an operator/user/presenter and not provided to or restricted to other participants/customer prospects of the virtual and/or augmented reality experience. Optionally, the example computing system enables use case scenarios in which certain computer aided design capabilities enable rapid creation/configuration of a multi-user, interactive, virtual reality, and/or augmented reality presentation experience.

DETAILED DESCRIPTION

Figure 1:
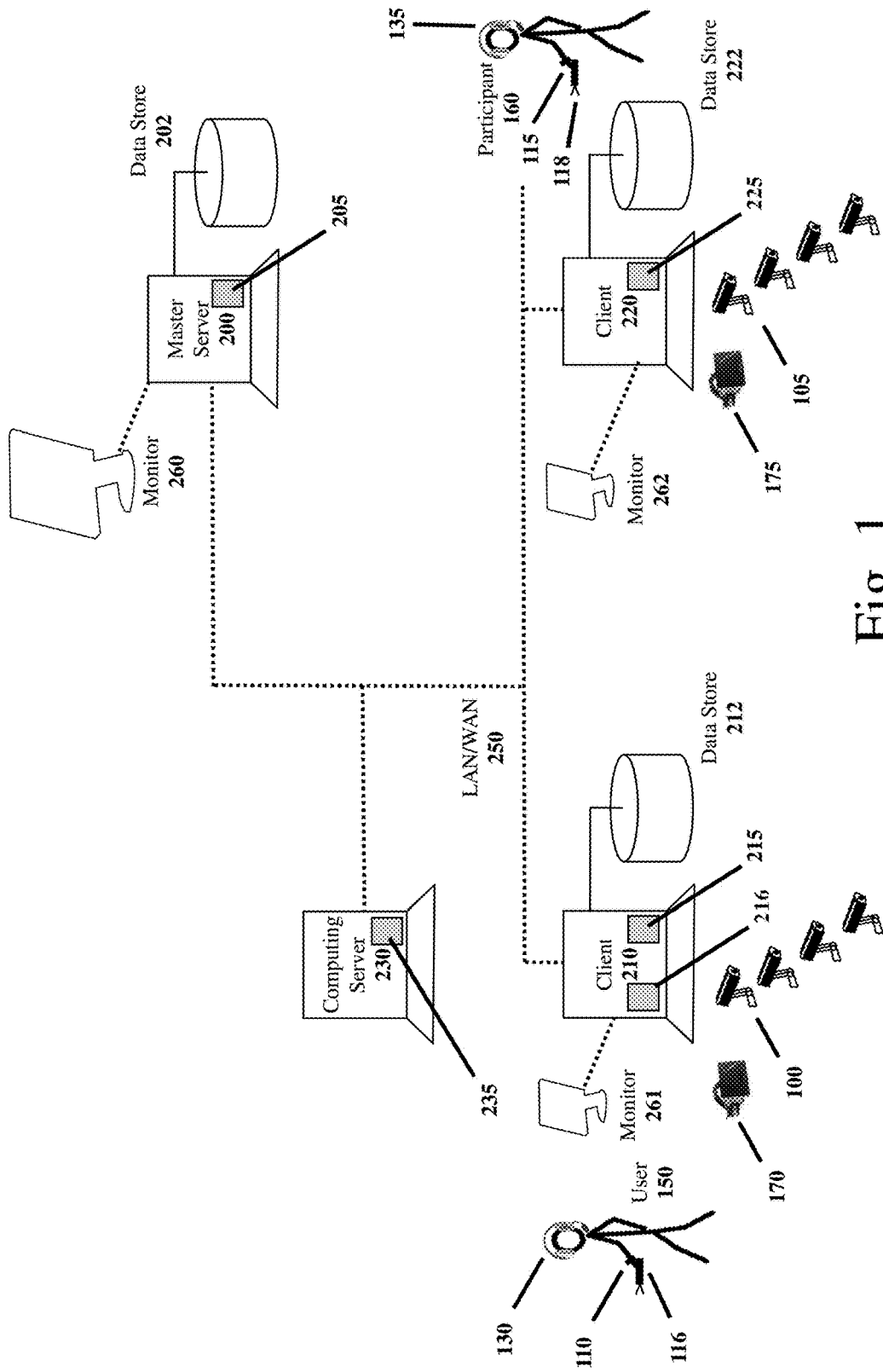
FIG. 1 illustrates an example operating environment of a collaborative virtual reality system.

Customer presentations, notably business-to-business, conventionally are provided in person with a sales person presenting a product or service of the company s/he represents to a customer prospect(s). Generally, the sales person is presenting sale-related information in a conventional meeting format to a plurality of customer prospects/meeting attendees. The sales person when giving his/her sales presentation typically employs a set of visual aids including but not limited to, for example, a visual slide presentation, an example product, a written handout, etc.

Recently, with advances in real-time streaming, there are certain video conferencing capabilities, which have enabled certain presentations to be provided remotely, obviating the needs of the sales person to physically travel to a site of the customer prospect(s) or for the customer prospect(s) to travel to a sales person's location. However, limitations have been identified in video conferencing. Such limitations may reduce the effectiveness of remote sales presentation. For example, a video display, at a customer prospects site may be limited (e.g., by size, quality, etc.) in its ability to display the video conferencing. In another example, a customer prospect may be viewing a presentation on a screen and not have a local camera on the customer's site, thereby limiting the ability of a presenter to monitor a customer prospect(s) reaction (e.g., visual feedback) to a presentation. In yet, another example, even if a camera is available at a customer site, a presenter may direct their gaze to the camera during the presentation (thereby creating a semblance of eye contact with presentation participants), obviating the ability of the presenter to gauge a customer prospect/participant's reaction on a local screen display. In yet, another example, if a sales person/presenter is presenting a slide show, a camera at the presenter's site may be directed at a set of slides, turning the presentation into a static and limited 2-Dimensional presentation. In yet another example, if a presenter is giving a product demonstration, it may be necessary for there to be a second operator/presenter, one delivering the presentation and another directing the camera at the presenter at certain times and the product at other times.

Certain video conferencing capabilities enable shared user controls enabling a presenter to manipulate and control the content displayed on a local monitor of a participant/customer prospect and/or even control a computing device of the customer prospect, enabling a richer experience. While these technology enhancements have improved remote collaboration, these technology configurations still are very deficient as compared to the richness of an in-person interaction and shared user experience.

Additionally, there are certain limitations when a sales person visits a customer prospect(s) at their business location. For example, a sales person may want to illustrate to a customer prospect certain aspects/features of a product, for example a new airplane. However, it may not be possible to bring a product to a customer prospect's site or demonstrate a certain service, for example, a new airplane or a new type of data center configuration.

Advantageously, as illustrated in this disclosure, virtual reality and/or augmented reality systems and processes may be used in a remote configuration to overcome some or all of the disadvantages of conventional remote presentations. In addition, this specification further discloses a set of computer-aided tools which enables the development of virtual reality simulations, and computer-assisted tools for managing a delivery of the developed presentations to customer prospects/participants.

An aspect of this disclosure relates generally to devices and methods for enabling an interactive, multi-user virtual or augmented reality experience, and in particular, to a computing system which works in conjunction with motion capture and tracking input devices. Another aspect of this disclosure relates to computer-aided presentation design and features enabling a choreographed delivery of a presentation (e.g., a slide presentation) by a user to one or more local and/or remote participants via one or more local and/or remote devices.

Other embodiments of a multi-user virtual or augmented reality experience are described in U.S. patent application Ser. No. 14/971,720, filed on Dec. 16, 2015, the contents of which are incorporated herein by reference in their entirety.

Advantageously, virtual/augmented reality and/or simulated environments as described herein can optionally be used in a number of application areas including but not limited to: real estate, architecture, product design, human behavior analysis, user training, gaming, product and marketing evaluation, design verification, data visualization, teleoperation, and telepresence or any physical environment that for reasons of, for example, physical impracticality, cost, or potential harm to a user can be simulated rather than directly experienced. Optionally, the virtual reality and/or augmented reality environment as described herein can be used in business/enterprise-to-business/enterprise and/or business/enterprise-to-consumer application areas. In addition, virtual reality as described herein may also be used in augmented reality environments, including for examples, in an automotive, construction, and assembly environments and/or teaching scenarios.

Multi-user VR environments/worlds have been created which enable users to collaborate and share a virtual world experience. Motion tracking is a significant component of most virtual reality systems. By tracking the position and/or orientation of each user, the computing system can control the simulation's viewpoint such that the user may navigate through the virtual world just as naturally as they would navigate through the physical world. In addition, tracked movements of a user in the physical world may be mapped onto certain movements of an avatar representation of the user in the virtual/augmented world as viewed by one or more participants/operator of the simulation session.

Thus, in a multi-user virtual/augmented reality session, a computing system may provide, via a respective user VR/AR headset or other display, each user with a view of the virtual/augmented world/scene (from the user's unique viewpoint and/or position in the virtual/augmented reality world/scene) and one or more avatars representing each session participant in the scene. Optionally, the computing system further enables one or more operators/observers to view a multi-user virtual/augmented reality session via one or more monitors from one or more positions in the virtual/augmented reality world. Optionally, one or more operators/observers may observe the virtual/augmented reality session from the viewpoint of one or more of the session participants. A session participant's movement may be tracked, for example, via motion tracking cameras and tracking devices (e.g., via tracking devices, such as light emitting diode devices or reflective materials, affixed to a user) or using other mechanisms (e.g., accelerometers, gyroscopes, optical tracking devices, pressure sensors, tilt sensors, haptic gloves, etc.). Optionally, virtual world sound effects and each user's voice are broadcast to other session participants and/or session observers/operators (e.g., via earbuds worn by the user or speakers). Optionally, other perceptional senses may be provided to other session participants and/or session observers/operators including the sense of smell, touch, taste, heat, cooling, etc. to enable a fully immersive and interactive experience.

Certain marker identification systems used in virtual and augmented reality tracking systems use infrared light. Advantageously, infrared light is invisible to human eyes and, thus, is not distracting to simulation participants and/or operators. Further, infrared light is relatively easy to record and the emitted and/or reflected light can be distinguished (e.g., via image processing) in recorded images. However, other wavelengths/colors and light types may be used.

Conventionally, infrared marker identification systems used in virtual and augmented reality environments use reflective or active markers.

With respect to the use of reflective markers, a given infrared sensitive camera may have an infrared light emitting strobe attached to or integrated thereto. The infrared light emitted from the strobe reflects off one or markers attached to or associated with a subject or object and is received at the camera, which captures the image of the reflected light.

To track an object, markers may be placed (e.g., with adhesive, clip, tape, magnets, snaps, sewn on, or otherwise placed/affixed) on an object to be tracked. For example, three markers or more markers may be utilized in order to track an object in 6 degrees of freedom, x-axis, y-axis, z-axis, pitch, yaw, roll. If more than one subject (wherein the subject may be a moveable object, such a person or a person's limb) is to be tracked in a given tracking area, the plurality of markers may be placed in unique patterns on the subject, (e.g., if each marker in a set of markers is not by itself distinguishable from the rest of the markers). A unique reflected pattern recorded in the video images enables the system to determine at a given moment (e.g., video frame or set of frames) the location and/or orientation of the subject to which the markers are attached.

With respect to the active marker system, pulsed light (e.g., infrared light) is emitted from a given active marker so as to provide tracking and identification information. Advantageously, a given marker in a tracking field may optionally be configured to emit a unique identifier wherein the identifier is defined by a unique pattern of pulsed light. Thus, for example, an 8-bit binary encoding can be used to encode 256 marker identifiers, a 5-bit binary encoding can encode 32 marker identifiers, etc. Other active marker systems may also be used, including, for example, a marker system in which only a single marker in a set of markers is emitting light at any given time period (e.g., a video frame or a set of frames). For example, each marker in the set may be assigned a different periodic time window in which to emit light. This optional active marker systems may have reduced tracking smoothness relative to the active marker with integrated marker identification, as the camera system may need to record each marker binary encoded pattern (e.g., one marker identification per frame or frame set) in the system of markers before returning to the first marker).

While both an infrared light reflecting system of markers and/or an infrared light emitting system of markers can be used in certain virtual/augmented reality simulations, an infrared light emitting tracking system may have certain advantageous over a reflective system when tracking multiple subjects in a tracking area. For example, the reflective systems may need to track a larger number of markers and may need to further track patterns, increasing the likelihood of two or more marker patterns traversing across each other when the markers are in close proximity to each other causing marker confusion (e.g., marker swapping). In addition, in a reflective marker system, as the number of subject/objects in a tracking area increase, the number of markers needed to create distinguishable patterns may increase. Having several markers in a cluster in close proximity to each other can decrease tracking quality as the tracking cameras may not see each marker clearly in a cluttered marker environment.

For clarity, the description herein may refer to virtual reality, which is intended to encompass both virtual reality and augmented reality, unless the context indicates otherwise. Similarly, the description herein may refer to an operator, which is intended to encompass either a system operator or system administrator (which also could be an end user) responsible for among other things configuring and initiating a simulation session, unless the context indicates otherwise.

FIG. 1 illustrates an example system architecture. As described herein, the illustrated system architecture can be used to facilitate a virtual and/or augmented reality experience, and in particular, a multi-user virtual and/or augmented reality experience with enhanced sensor tracking. The system may be configured to perform some or all of the following: image capture and tracking functions (including enhanced tracking as further described herein), video/image processing, speech processing/recognition, pattern matching, data mining, marker identification (e.g., LED marker identification), user/object position calculations, action synchronization, and/or dynamic rendering of virtual worlds in an optimized (e.g., in substantially real-time and/or minimal rendering delays) manner to create a lifelike experience.

As illustrated in FIG. 1, a master server computing device 200 is coupled to a plurality of client computing devices 210, 220 over a data network 250 (e.g., a local area network, a wide-area network, the Internet, a private network, a public network, etc.). Optionally, the master server 200 may be directly connected to a console/monitor 260 (or over the data network 250 to a console/monitor 260) which displays a configuration user interface provided via master server software 200. The user interface may be utilized by a user/participant or operator to provision, designate, and/or configure the master server 200 (e.g., download and/or upgrade software, provision data communication interfaces, configure accounts, administer security, edit files, etc.). Optionally, the master server 200 also provides a computing platform for compiling and/or executing certain programs and/or programmatic scripts (e.g., simulations), receiving and sending certain communications, performing video/image processing tasks, performing math computations, displaying/rendering certain images (e.g., rendering virtual worlds), providing client synchronization, hosting a client application, etc.

Figure 2:
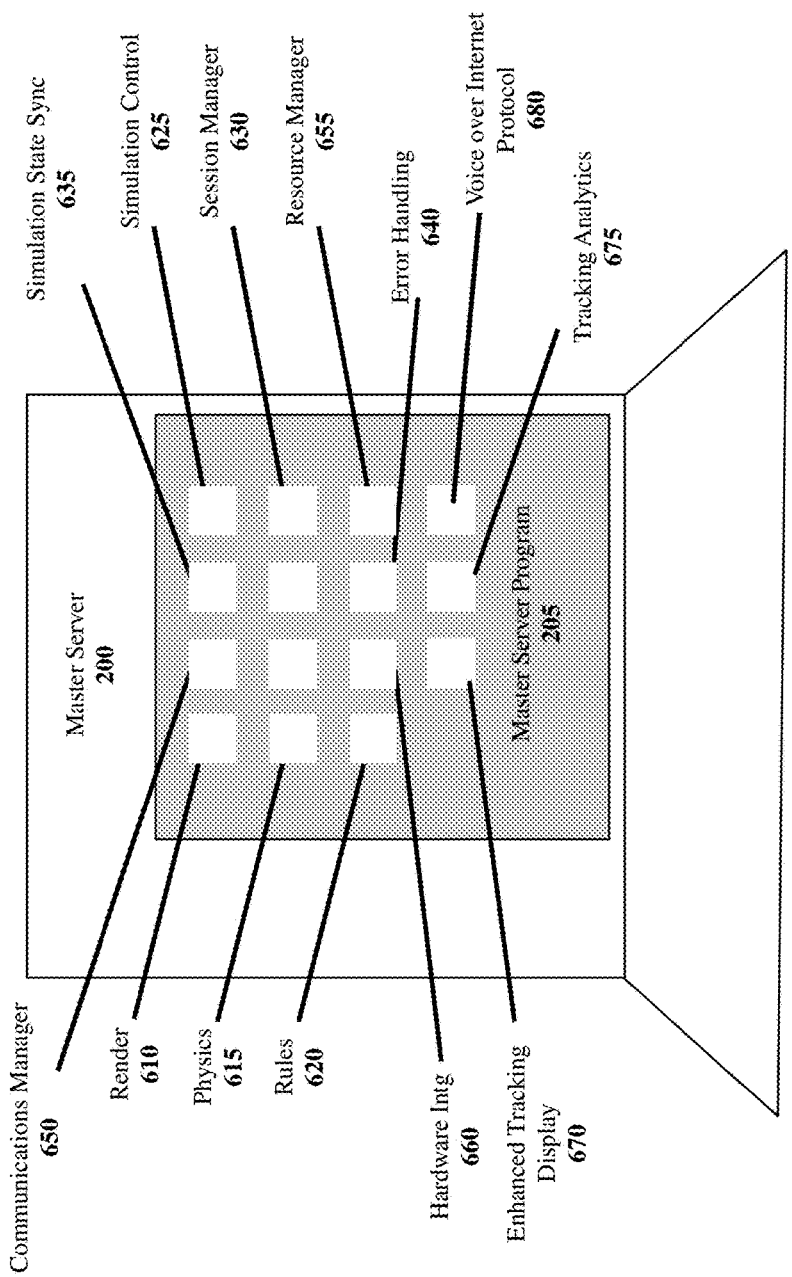
FIG. 2 illustrates an example configuration of software modules of a collaborative virtual reality system.

A given computing device 200, 210, and 220 may be further configured with a data store 202, 212, and 222, respectively, enabling the server to store in memory data associated with the VR session, simulations, models, objects, images, certain parameters, executable scripts/code, local event logs, error logs, sensor data, speech, video, etc. Thus, for example, the master server computing device 200 may host a master server software program 205, as illustrated in FIG. 2, comprising a single software program or a plurality of software programs or software modules including, for example, a render engine 610 configured to render and/or enable the rendering of VR scenes, a physics engine 615 (e.g., that provides a simulation of physical systems, such as rigid and soft body dynamics, collision detection, and fluid dynamics, and that provides an interface that hides the low-level details of the physics needed in virtual reality applications to enable application/game developers to focus on the higher-level functionalities of the application), a rules engine 620, a simulation control engine 625 (that coordinates simulation execution), a session manager 630, a simulation state synchronizer engine 635 (that, for example, synchronizes associated client viewpoints) and/or an error handling 640, a client-server communications manager 650 (that, for example, manages client server communications including over a data communication network (e.g., a low latency data communication network)), resource manager 655 (that, for example, manages resources, including shared resources (e.g., simulation objects, scenes, etc.), speech-to-text conversion module 670, sensor analytics and inference module 675, video compression module 680, virtual reality tracking and marker identification software 660 (e.g., the Vizard VR™ toolkit and PPT Studio software from WorldViz LLC of Santa Barbara) by way of example, enhanced tracking sensor output processing and display 670, enhanced tracking analytics 675, and Voice over Internet Protocol 680 (e.g., for voice communications between session collaborators).

The master server computing device 200 may include cluster nodes (e.g., companion computing devices) that handle gameplay/simulation logic, tracking software, and one or more additional servers that process communications from client computing device. The master server computing device 200 may include a login server, including a client/user identity and access authentication engine, that manages login sessions with client computing devices, validates client computing devices (e.g., by checking password and device identifiers), and if the client computing devices are validated, enables the devices to access the master computing device 200 and/or cluster nodes. The data store 202 associated with the master server computing device 200 may store user account information such as password information, user/device identifiers, status of game/simulation play which may be stored upon a user suspending a game/simulation or other virtual/augmented reality activity and which may be accessed and utilized when the activity is restarted to provide a continuous experience, user usage information (e.g., time and duration of virtual/augmented reality activity), other users the user may be linked to (e.g., other users the user has interacted with when engaging in virtual/augmented reality activities), etc.

The master server computing device 200 may further comprise multiple servers distributed over a broad geographic area to reduce latency with respect to interactions with client server devices, wherein a given server (or servers) may serve client computing devices in its geographical area. The various master server computing devices may include network interfaces and may be interconnected via high speed data networks to further reduce latencies. The cluster nodes may include dedicated high speed graphic processors to process virtual/augmented reality graphic tasks. The master server computing device 200 may include one or more administrator terminals.

Similarly, as illustrated in FIG. 1, one or more client computing devices 210, 220 (e.g., a general purpose computer, a tablet computer, a cloud-based server, a smart phone, a graphics processing unit, a game console, etc.) are coupled to the master server 200 over a data network 250 (e.g., a local area network, a wide-area network, the Internet, a private network, a public network, etc.). Optionally, a given client device 200, 210 can connect with other client devices via the data network 250 (e.g., in a peer-to-peer manner) as they may be local or remote from each other. Optionally, a given client computing device 200, 210 may be connected directly or over a network to a console which displays a user interface via client software 215, 225 to a user/participant or operator and which can be used to provision, designate, and configure the given client computing device 200, 210 (e.g., download and/or upgrade software, provision data communication interfaces, configure accounts, administer security, edit files, etc.). Optionally, the client software 215, 225, when executed, enables a user to access and participate in a Virtual Reality (VR) slide presentation as further described herein. Optionally, a Presentation Designer client software program 216 enables a user to design a VR slide presentation as further described herein. Optionally, each client device 200, 210 may be coupled to one or more local participant sensors 110-115 (e.g., a wearable heart rate monitor), cameras 100-105, (wherein, optionally, cameras 100 is a plurality of cameras 100a, 100b, 100c, 100d, cameras 105 is a plurality of cameras 105a, 105b, 105c, 105d), and/or headset (e.g. microphone and/or speakers) 130-135 which enables said local participant device outputs to be received by each client device 200, 210. Optionally, the various local participant sensor, camera, and microphone outputs are connected wirelessly or via direct cabling to each client device 200, 210. Optionally, the local participant sensors 110-115, cameras 100-105, and/or headsets 130-135 interface (e.g., wirelessly) to a local computing device of the local participant (e.g., a smartwatch, smart phone, tablet computing device, etc.). Optionally, the local participant raw sensor/camera/microphone data is sent to the master server 200. Optionally, a local participant computing device 230 performs certain local computational operations with respect to the received sensor/camera/microphone data prior to sending the raw data and/or local processed output (e.g., a determined heart rate, a determined positional gaze, marker or object orientation, marker or object acceleration, marker or object velocity, speech recognition, etc.) to the master server 200. Optionally, enhanced tracking sensor/camera/microphone data (either raw data and/or locally processed output) of a local participant may be provided to the master server 200 via the LAN/WAN 250. Optionally, a given client computing device 200, 210 provides a computing platform for compiling and/or executing certain programs and/or programmatic scripts, receiving and sending certain communications, performing video/image processing tasks, performing speech processing including speech-to-text, performing sensor/camera/microphone output software analytics, identifying distinct markers from recorded infrared light, calculating marker positions in space, performing math computations, enabling the displaying/rendering of certain images (e.g., rendering virtual worlds or augmented images), etc. For example, a given client computing device 200, 210 may include a 3D rendering engine, a 3D sound engine, haptic feedback engine, a virtual reality execution engine, an avatar engine, a simulation state synchronizer engine, a session manager engine and/or a network interface. Optionally, the client computing device 200, 210 may access one or more external data stores 290 (e.g., a cloud-based data store, a network-based server, etc.) over the LAN/WAN 250.

Figure 3:
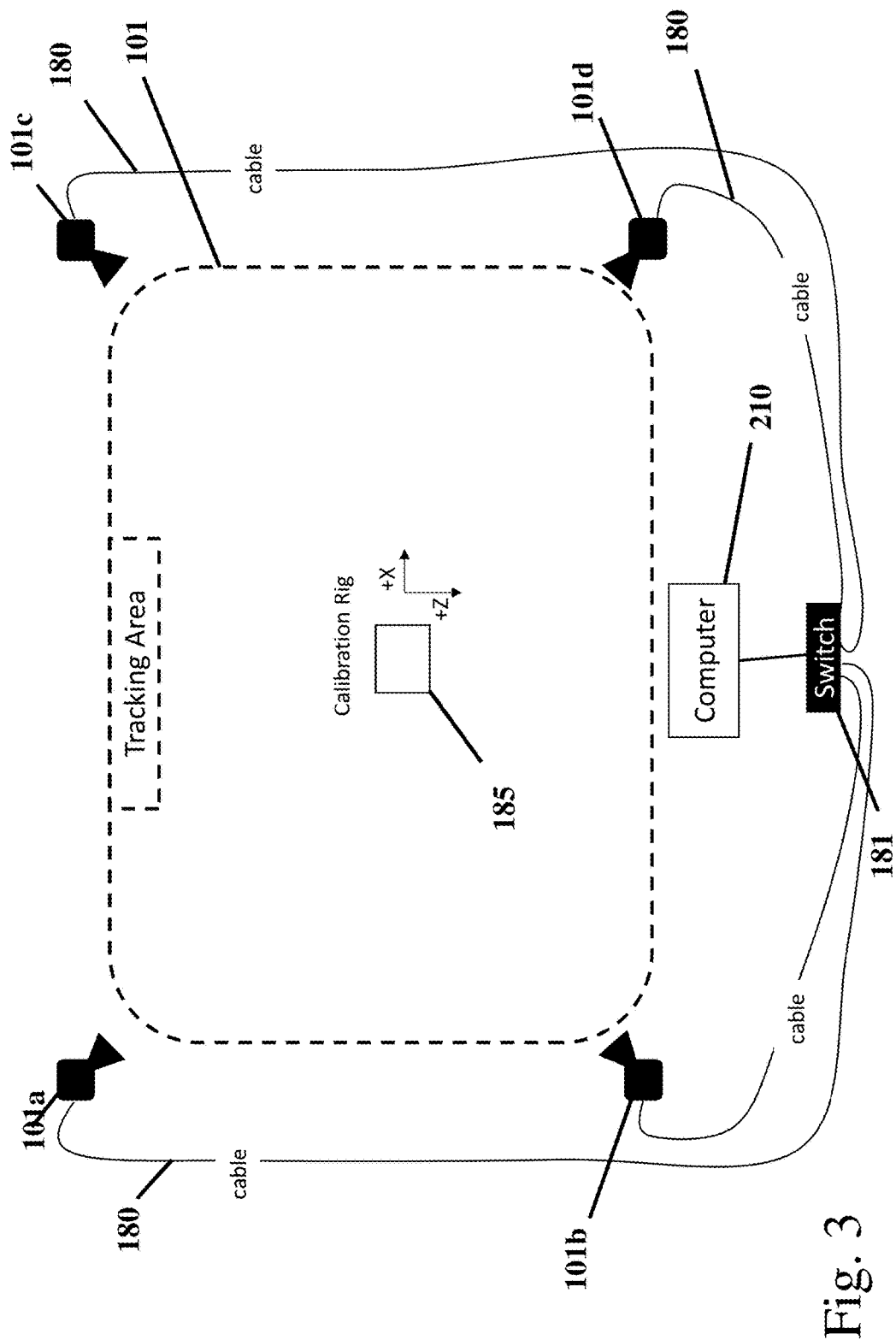
FIG. 3 illustrates an example operating environment of a precision positioning tracking motion capture system.

FIG. 1 also illustrates an optional element of the cluster system, a plurality of motion capture cameras 100a, 100b, 100c, 100d, (referred to herein as 100) and 105a, 105b, 105c, 105d (collectively referred to herein as 105). Motion tracking is a significant component of most virtual reality systems. By tracking the position and orientation of the user, the cluster system can control the simulation's viewpoint such that the user can navigate through the virtual world just as naturally as they would navigate through the physical world. In addition, tracked movements of an individual (e.g., tracked using accelerometers, gyroscopes, optical tracking devices, pressure sensors, tilt sensors, haptic gloves, etc.), in the physical world may be mapped onto certain movements of an avatar in the virtual world. Optionally, these motion capture cameras 100, 105 are connected physically via cabling or wirelessly to the data network 250 and/or directly to the master server 200 and/or clients 200, 210. Optionally, the video output and/or detected marker identities and marker positions are streamed from the cameras 100, 105 to the master server computing device 200 and/or the client computing devices 200, 210. Optionally, a plurality of motion capture cameras are positioned above and/or reside within a staging area in which VR session users participate in a simulation. FIG. 3 illustrates an example camera positioning in a simulation. By way of example, multiple (e.g., 2, 4, 6, 8, 9, 10, 11, 12) tracking cameras (e.g., precision position tracking (PPT) cameras, such as the PPT X™ precision motion tracking cameras from WorldViz LLC of Santa Barbara) may stream live video to a master server computing device 200, or a client computing device 200, 210, which are provisioned with virtual reality tracking software (e.g., the Vizard VR™ toolkit or PPT Studio from WorldViz LLC of Santa Barbara; dll for Windows; C source library for Linux) capable of image processing live video images in substantially real-time.

Further, with respect to FIG. 3, one or more motion tracking cameras 100a-100d are positioned to video record a tracking area 101 with one or more participants in a single or multiuser virtual reality or augmented reality simulation as illustrated in FIG. 3. Optionally, each tracking camera 100a-100d is positioned in each of four corners of a square or rectangular tracking area with the camera lens pointing inward as illustrated in FIG. 3. Optionally, a given tracking camera 100a-100d is elevated above the tracking area (e.g., via tripods, affixed to walls, etc.) with the tracking cameras lens directed in a slight downward angle, enabling an improved view of infrared emitting tracking devices (e.g., a tracking device affixed to a head mounted display of a user) and/or markers. Optionally, a given tracking camera is connected to a data network 250 formed via cabling (e.g., Ethernet cabling 180) or wirelessly and an Ethernet Switch 181. Optionally, a computing device/server 200, 210 is connected, for example via a network interface card and cable, to the data network 250. Optionally, the tracking cameras 100a-100d are wirelessly connected to the computing device 200, 210.

As previously described herein, the motion tracking cameras 100, 105 may record emitted infrared light pulses (e.g., emitted infrared light pulses) from tracking emitter device(s) associated with a VR participant. An example tracking device which emits trackable infrared light signatures is a wireless Precision Position Tracking (PPT) device, PPT Eyes™, from WorldViz LLC of Santa Barbara. The PPT Eyes is a motion tracker mountable to 3D glasses or VR head mounted displays which provides wide-area tracking and can be integrated with or attached to display headgear enabling the tracking of a user's head and/or body movements when combined with virtual reality tracking software. The tracking software, which is optionally executed by computing devices of the camera 100, 105, on the master server 200, a standalone computing device/server 230, and/or client computing device 200, 210, is capable of identifying via the streaming camera video the one or more markers of the PPT devices.

Other features of a head mountable wireless PPT device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (with low intensity setting) with a range of more than 20 meters (with high intensity setting) without impacting performance; optionally factory or self-mounted onto commercially available passive and active 3D glasses; automatic "go-to-sleep" mode if not moved for a first period of time (e.g., 30 seconds), and turn off after a second period of times (e.g., 10 minutes) to save on battery power; user switchable between USB charge mode and USB power mode; easily reprogrammable device settings (sleep mode and turn-off timer periods, LED Identifiers, LED light intensity) via a simple application (or via software toolkit from WorldViz LLC of Santa Barbara) wherein the device is connected to a user's computer via a wired or wireless interface (e.g., a micro USB port); compatible with a plurality of protocols (e.g., TrackD, VRPN, WorldViz PPT Studio™, etc.); six degrees-of-freedom (X, Y, Z, yaw, pitch, roll) enabling the full determination of left/right eye locations needed for stereoscopic viewing; angular range of a full 360 degrees— all axis; tracking precision of approximately less than a quarter of a millimeter over a 3 meter by 3 meter by 3 meter volume with a rotation precision of 0.09 degrees; position accuracy of approximately less than a quarter of a millimeter over a 3 meter by 3 meter by 3 meter volume with a rotation accuracy of one degree RMS yaw, one quarter of a degree RMS roll; update rate of 180 Hz); latency of no more than 20 milliseconds; light weight 30 grams (with two infrared red diffusion balls); device size of 203 by 14 by 32 millimeters; active LED mode (PPT Marker IDs). It is understood that dimensions, ranges, and components, other than those recited above, may be used, such as those discussed with respect to other embodiments.

Optionally, the motion tracking cameras record emitted infrared light pulses from tracking devices held by a user. An example handheld tracking device which emits trackable infrared light signatures may be a wireless Precision Position Tracking (PPT) Wand™ from WorldViz LLC of Santa Barbara. The PPT Wand is a wireless, battery powered wand. The wand provides interaction and navigation in immersive virtual reality systems and may include a joystick/pad and trigger enabling hand tracking and hand grabbing and/or moving of virtual objects. Other optional features of a handheld wireless tracking device may include some or all of the following: a rechargeable (e.g., lithium ion) battery endurance of 8 hours with a range of more than 20 meters without impacting performance; an ergonomic one-handed design, vibrant button touch, and a multitude of input modes; automatic "go-to-sleep" mode if not moved for one minute, and turn off after 10 minutes to save on battery power; user switchable between USB charge mode and USB power mode; easily reprogrammable wand settings (sleep mode and turn-off timer periods, LED Identifiers, LED light intensity) via an application (or via software toolkit from WorldViz LLC of Santa Barbara) wherein the wand is connected to a user's computer (e.g., wirelessly, via a micro USB port, or via other interface); compatible with a plurality of protocols including TrackD, VRPN, and WorldViz native PPT protocol; six degrees-of-freedom (X, Y, Z, yaw, pitch, roll); angular range of a full 360 degrees—all axis; tracking precision of approximately less than a quarter of a millimeter over a 3 meter by 3 meter by 3 meter volume with a rotation precision of 0.03 degrees; position accuracy of approximately less than a quarter of a millimeter over a 3 meter by 3 meter by 3 meter volume with a rotation accuracy of one degree RMS yaw, one quarter of a degree RMS in pitch and roll; update rate of 180 Hz with PPT E series); latency of 20 milliseconds with PPT E series; light weight 196 grams; wand size of 239 by 65 by 110 millimeters; passive and active LED mode (PPT Marker IDs). It is understood that dimensions, ranges, and components, other than those recited above, may be used, such as those discussed with respect to other embodiments.

Optionally in addition or instead, a dedicated computing device 230 (e.g., a laptop, PC, smartphone, server, etc.) may be provisioned with virtual reality software (e.g., Vizard VR and/or PPT Studio from WorldViz LLC of Santa Barbara) capable of processing received live camera output stream in substantially real-time. Optionally, the motion capture cameras record image data including emitted infrared light in a tracking area. Optionally, the recorded image data is provided (e.g., streamed) to the computing device 230 or other computing device via a data network (e.g., 250). Optionally, the computing device receiving the image data has certain software (e.g., PPT Studio software from WorldViz LLC of Santa Barbara) capable of determining from the image data, a position and identity for each infrared marker in the field of view/tracking area of the motion capture cameras.

Optionally, the calculated/determined/derived marker position and identity information (e.g., tracking data) may be used (e.g., by the computing device) to render a change in a scene or orientation of a scene as viewed by a user (e.g., in a head mounted display or other display). For example, infrared markers may comprise light emitting devices (LED) which may be configured to be attached to or mounted on an item worn by the user (e.g., headgear) or directly to the user (e.g., via adhesive tape). Optionally, a marker device can be attached to articles of clothing and/or strapped or otherwise attached to or physically associated with a user (e.g., painted on as a reflective marker). Optionally, an infrared marker tracking device includes two or more light emitting components attached to one or more items worn by the user and the system tracks the light source in three dimensions to determine the user's movements in time. Optionally, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user may be modified to simulate the sideways movement of the user (e.g., displaying an image behind a tree which was obstructing the user's view prior to the user's sideways movement).

Virtual Reality software may include a hardware integration module 660 which may incorporate a visual tool for configuring devices that the VR software supports, including displays (e.g., head-mounted displays, multi-screen projection walls, consumer 3D monitors), trackers (head trackers, gloves, full body motion capture), input devices (e.g., wands, steering wheels, gamepads, joysticks, etc.), feedback devices (e.g., haptic feedback devices that simulate the sensation of force, pressure and/or resistance by using electric actuators, pneumatics hydraulics, and/or neuromuscular stimulators).

The VR software may enable editing of transform nodes (e.g., position, rotation, scale), clone/copy nodes, rename nodes, delete nodes, insert new group/transform nodes, and/or add/remove/modify descriptors. The VR rendering software 610 may enable the layout of a virtual scene by combining and arranging multiple independent 3D models. The VR software may enable a given virtual reality scene or objects to react to a user's natural body motions. Thus, for example, the VR software may enable a user to interact with head, hands, and feet with virtual objects in a manner similar to real objects to provide a convincing sensation of telepresence. The VR software optionally provides full body motion capture technology that delivers full human presence for both first person point of view and third person points of view experiences. The VR software optionally enables the integration of live full feature avatars.

An optional aspect of an interactive, multi-user, virtual reality session is the utilization of one or more motion tracking cameras that record emitted infrared light pulses from tracking emitter devices. Motion tracking camera video output may be received by the computing devices of the system directly or via various wired or wireless networks or peripheral interfaces/buses. Optionally, motion tracking camera video output may be received via direct cabling (e.g., a local simulation participant's camera output connected to the computing system), via a local area network (e.g., a local simulation participant camera output directed to a computing device and with the computing device connected to the computing system over a local area network), via a wireless network (e.g., a local simulation participant camera output to a wireless router associated with the computing system), and/or via a data network such as the Internet (e.g., a geographically remote simulation participant). Optionally, motion tracking camera video output may be directed to or received by a computing device (e.g., a smartphone, a networked server, etc.) local to the simulation participant but which may be remote from the computing system. Optionally, the local computing device determines in whole or in part, for example using tracking software, head location/position coordinates and location/position changes and only transmits head tracking location/position coordinate data to the computing system (e.g., via access to shared networked storage, sent via a data network, etc.) and not the camera video output, thereby reducing the amount of data sent over a data network from a remote site and so reducing network bandwidth utilization. This approach may reduce the need to have complex high performance networks.

Figure 4:
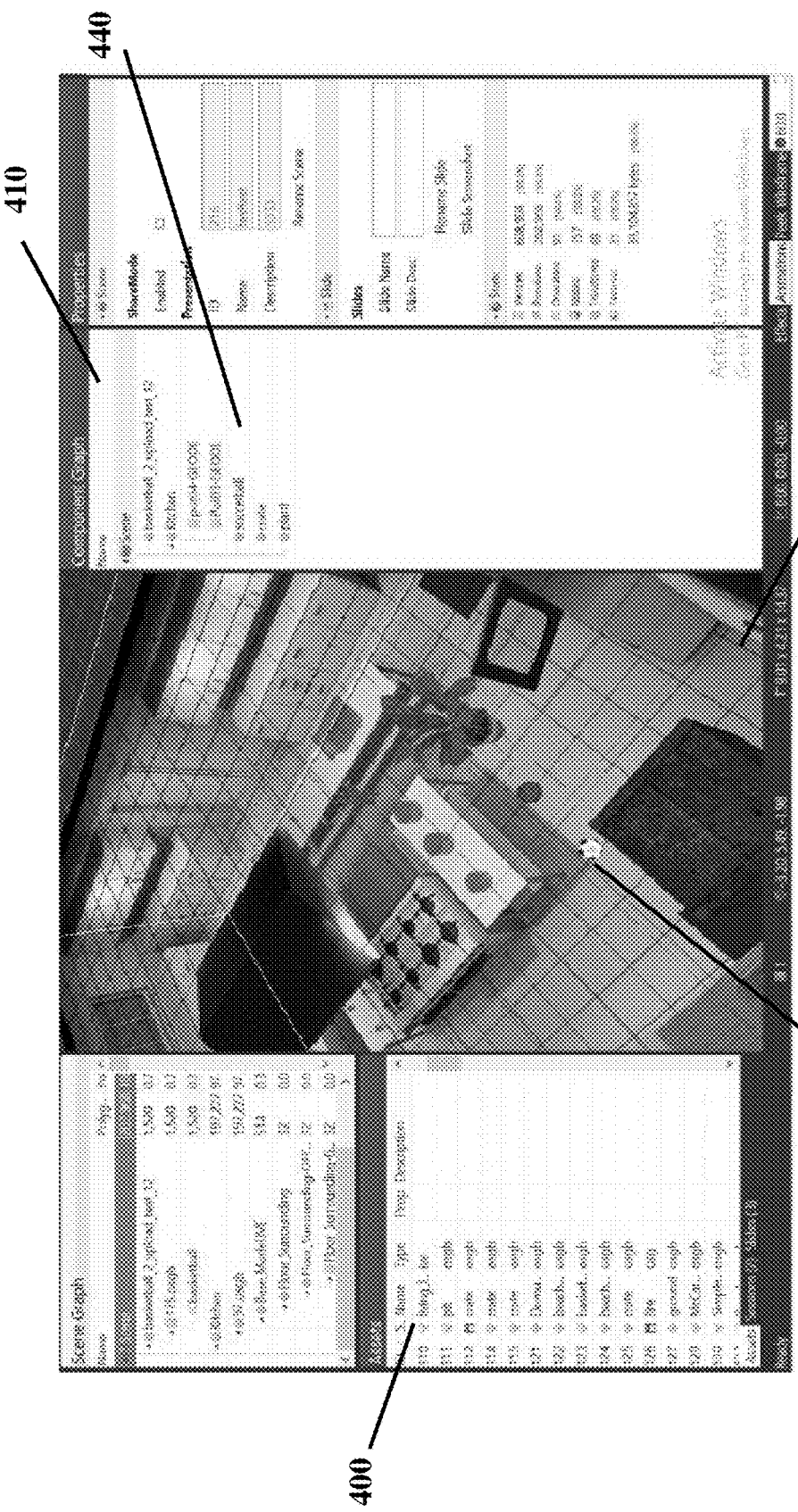
FIG. 4 illustrates an example display of a computer-aided design client.

Example VR slide presentations will now be described. FIG. 4 illustrates an example user interface of a computer-aided design client, for example a VR presentation designer client. Optionally, the user interface includes a scene, for example a Kitchen Scene 430 within a slide of a VR slide presentation. Optionally, the computer-aided design client displays one or more panes. For example a pane may be displayed in response to a user interface control selection. An example user interface pane is a Component Graph pane 410 which displays elements/objects within a scene (e.g., kitchen components, sports components, etc.). Optionally, elements/objects within a scene may be configured with certain properties and features as described herein. An example element/object in the scene is a soccer ball 440. Another example user interface pane is an asset pane 400 which displays certain elements/objects accessible to a designer which may be added to a displayed kitchen scene 430 as described herein (e.g., displaying asset name, type, property description, etc.). Optionally, assets may be stored locally on a server and/or may be stored in an associated local or remote cloud computing environment, and/or may be designed art which may be accessible and/or purchased on the Internet. A scene pane may list different available scenes in a hierarchal tree.

Figure 5:
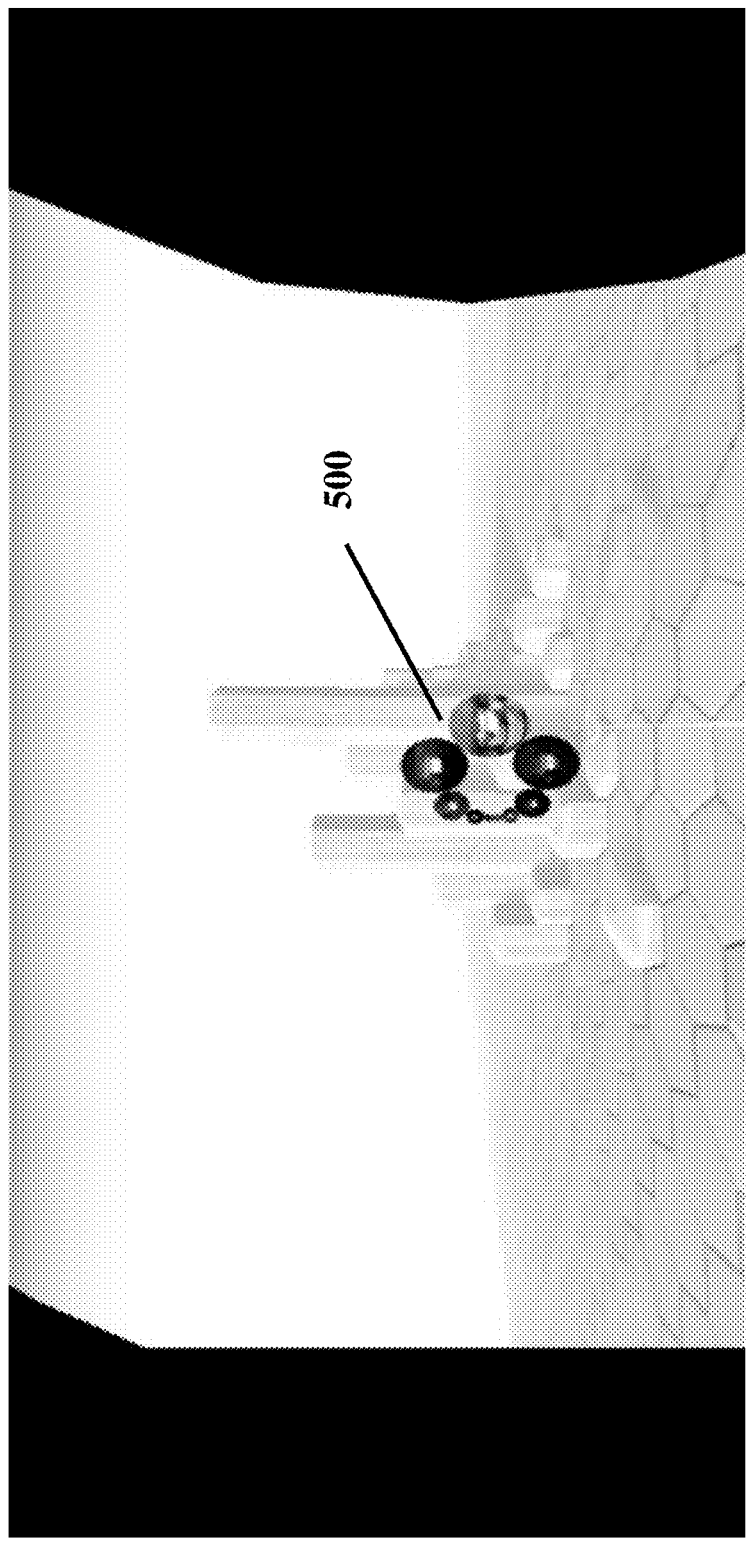
FIG. 5 illustrates an example virtual reality client display of a Homeworld scene visible in a Head Mounted Display of the user or participant.

FIG. 5 illustrates an example virtual reality client display of a Homeworld (e.g., a virtual meeting room) visible in a Head Mounted Display (HMD) of a user or participant. Optionally, a given virtual displayed world 500 corresponds to one or more scheduled and/or active VR slide presentations accessible (optionally subject to certain login credentials). Optionally, a user and/or participant may scroll through the displayed virtual worlds 500 and/or peer (e.g., position their HMD within the proximity of a displayed representative virtual world which causes the system to display to the user/participant an active presentation session) into a virtual world to determine, for example, who might be in attendance and/or whether the presentation has started, ended, next scheduled, etc.

Figure 6:
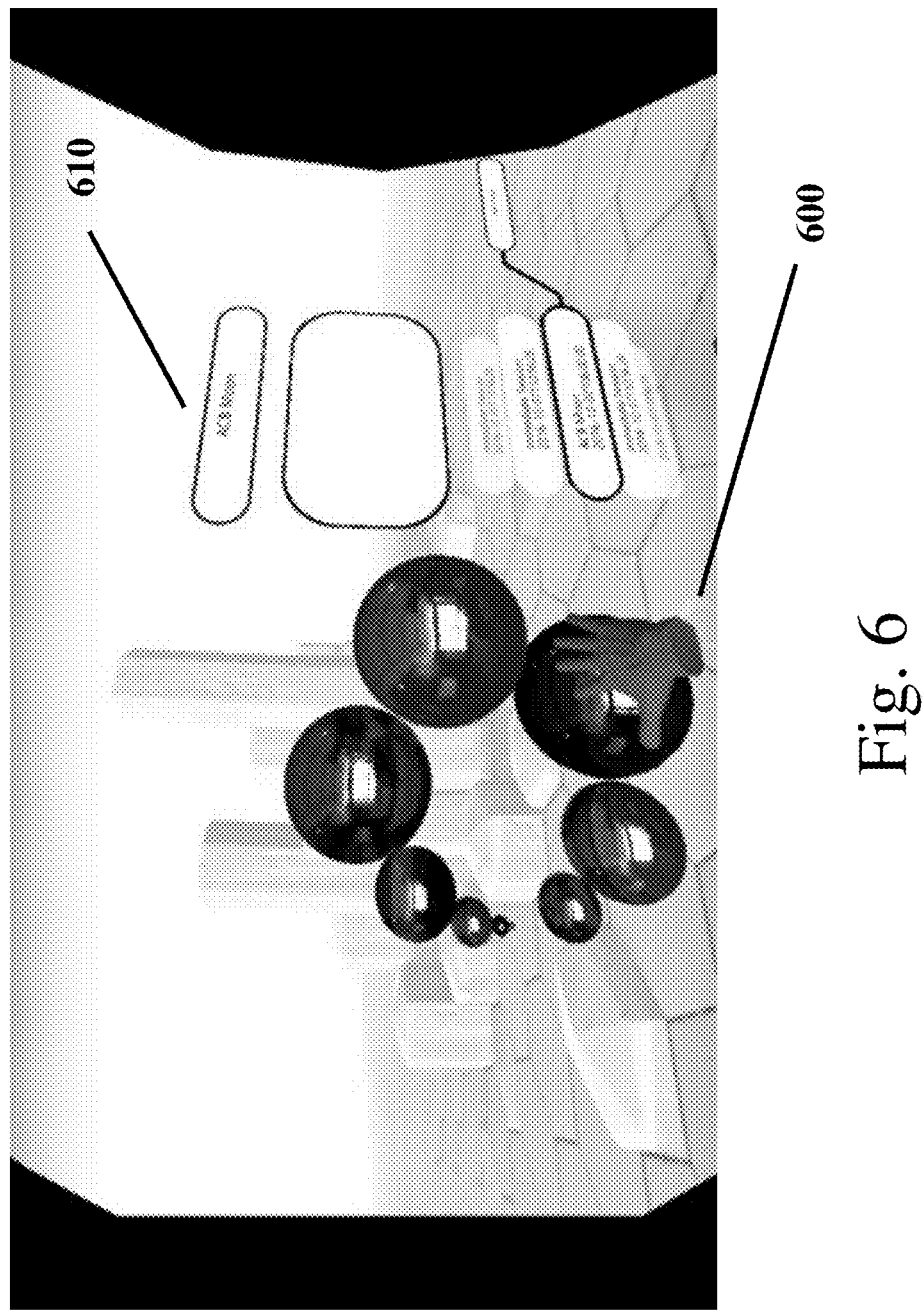
FIG. 6 illustrates an example virtual reality client display in a Head Mounted Display of a user or participant. The scene includes an example user/participant scrolling action in a virtual world in a Homeworld scene.

FIG. 6 illustrates an example virtual reality client display in a Head Mounted Display (HMD) of a user/participant. The example illustrates how a controller, such as a Wand Controller, may be used to scroll through a displayed grouping of virtual worlds. Optionally, certain descriptive information 610 is displayed in association with each virtual world including information relating to one or more associated VR slide presentations and scheduled session times. Movement of the controller may be reflected in the display in the form of a hand or other pointer object. Movement of the controller is mirrored by movement of the hand, which can "touch" a virtual world and corresponding descriptive information may be emphasized (e.g., displayed in larger size). Optionally, the user can touch and select the descriptive information.

Figure 7:
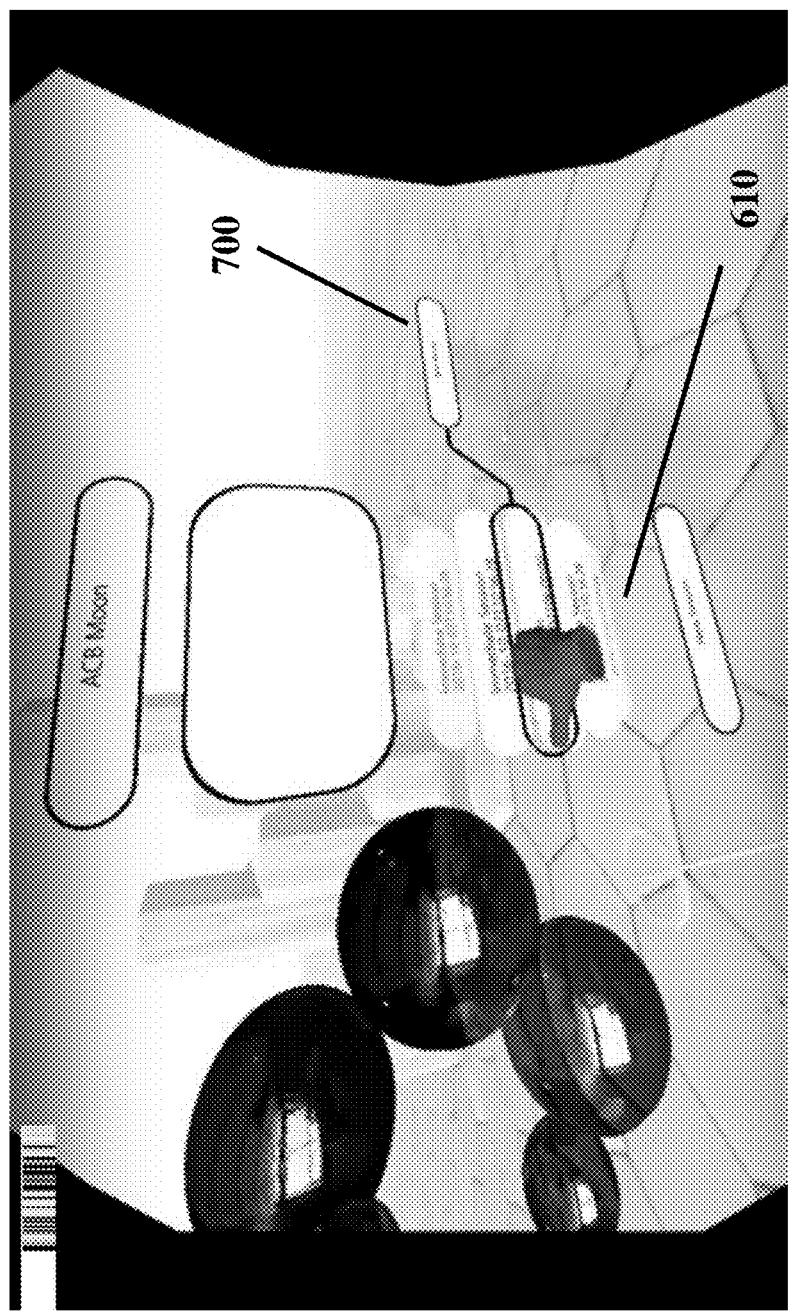
FIG. 7 illustrates an example virtual reality client display in a Head Mounted Display of a user or participant. The scene includes an example selection of a virtual world in a Homeworld scene.

FIG. 7 illustrates an example virtual reality client display in a Head Mounted Display (HMD) of a user/participant. Optionally, a user selects a displayed session (e.g., using the "hand" or other pointer) and then selects a session presentation launch control 700 to access the presentation (e.g., presentation meeting room and/or active presentation session).

Figure 8:
FIG. 8 illustrates an example virtual reality client display in a Head Mounted Display of a user or participant. The scene is an example of a user/participant view while peering into a virtual world.

FIG. 8 illustrates an example virtual reality client display in a Head Mounted Display (HMD) of a user/participant. In this example display a user/participant is peering into a displayed virtual world in a Homeworld to determine, for example, who might be in attendance (e.g., via names and/or avatars of participants displayed in the virtual world) and/or whether the presentation has started, ended, next scheduled, etc.

Figure 9:
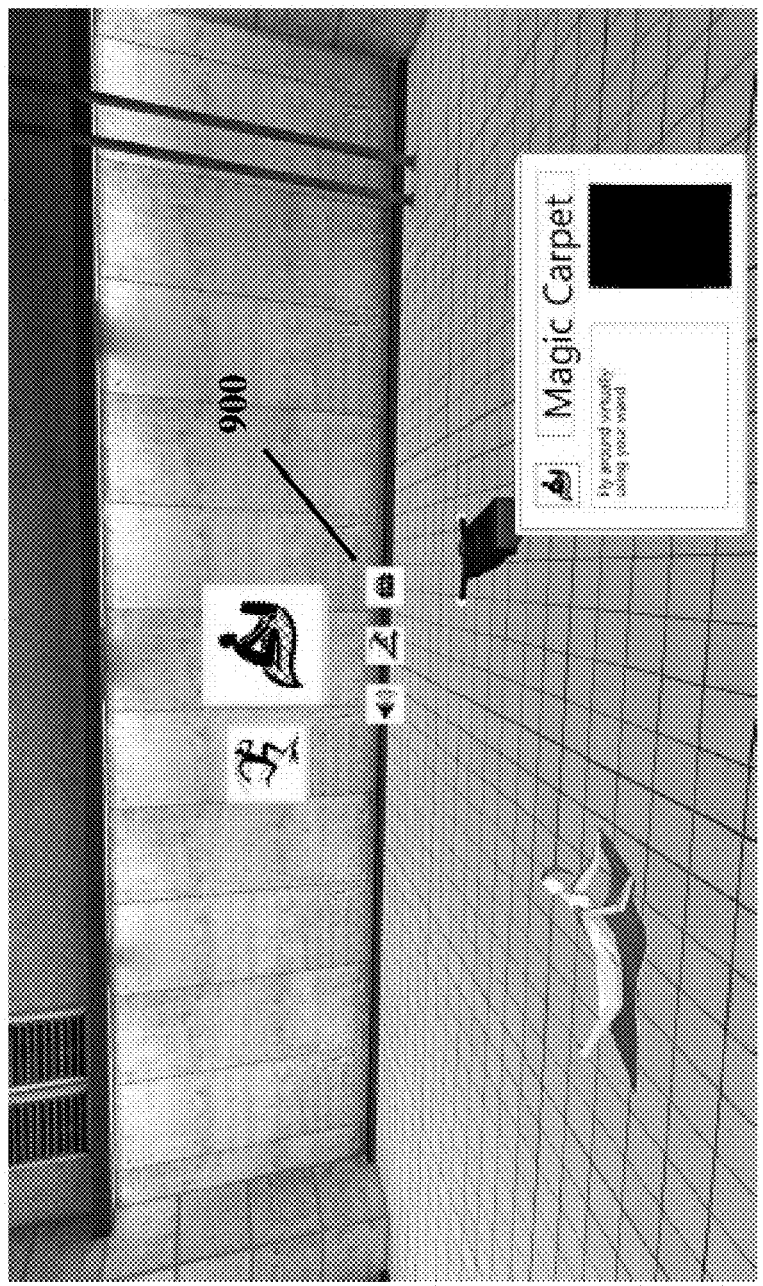
FIG. 9 illustrates an example virtual reality client display in a Head Mounted Display of a user or participant.

FIG. 9 illustrates an example virtual reality client display in a Head Mounted Display (HMD) of a user/participant. This is an example embodiment initial screen display to a participant/user upon invoking a virtual reality client. Optionally, a Homeworld of the system containing one or more virtual worlds/VR presentations may be accessed by selecting the Homeworld control 900. Optionally, a control is provided (e.g., a magic carpet control), which when activated enables the user to fly around a displayed scene.

Figure 10:
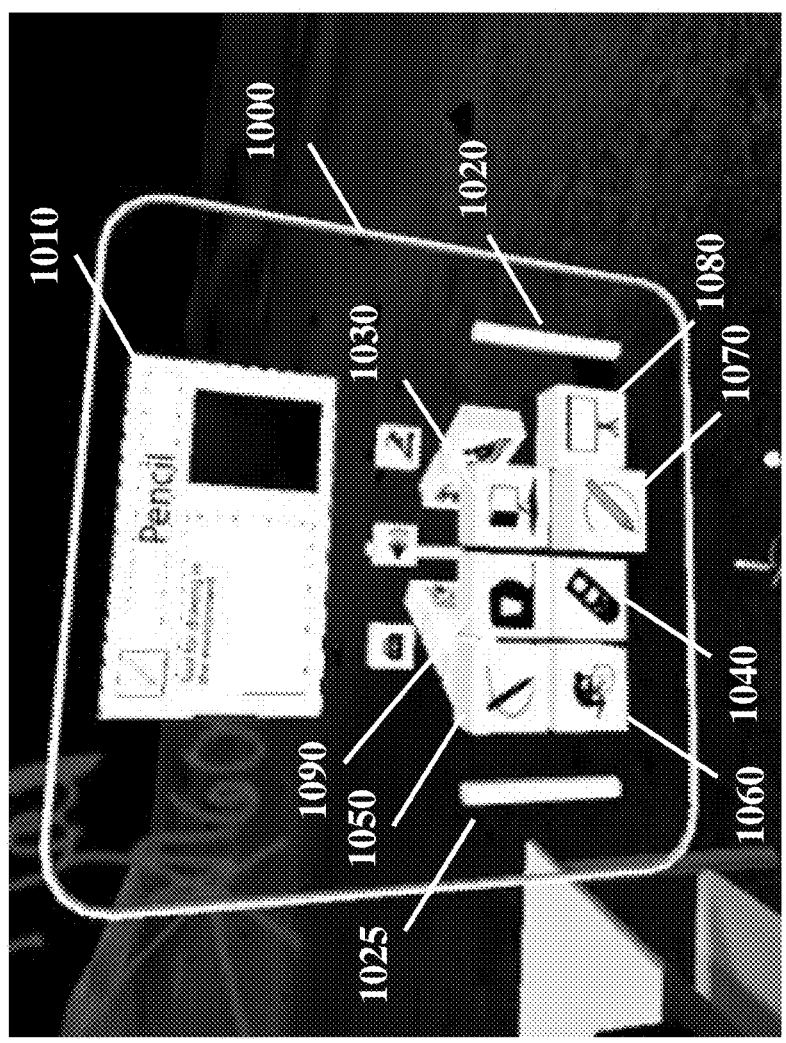
FIG. 10 illustrates an example virtual reality client display in a Head Mounted Display of a user or participant. The scene includes an example first tools menu display.
Figure 11:
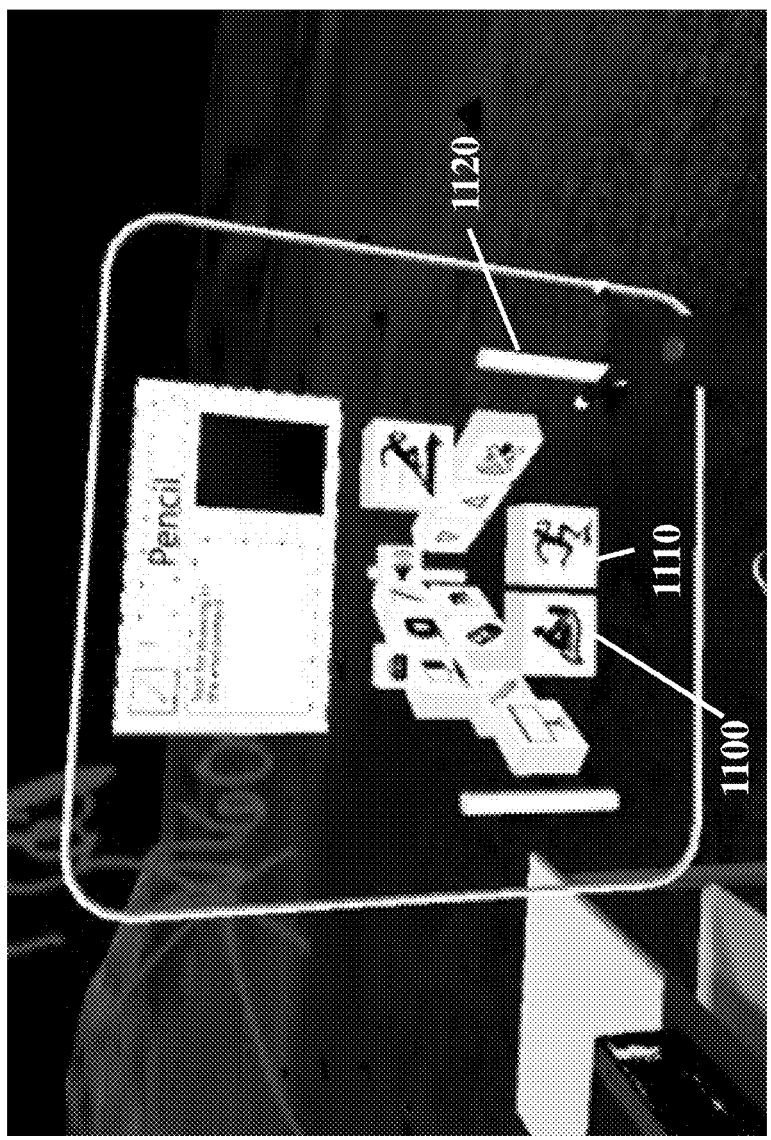
FIG. 11 illustrates an example virtual reality client display in a Head Mounted Display of a user or participant. The scene includes an example second tools menu display.

FIG. 10 illustrates an example virtual reality client display in a Head Mounted Display (HMD) of a user. This is an example embodiment user menu display (e.g., Tools menu) 1000 of controls available in an active VR slide presentation. A selected menu control item 1070 is highlighted and an associated descriptor 1010 of the control item's features is displayed to the user. Other menu control items displayed in FIG. 10 include: Scroll Control 1020 (e.g., scroll to the left), Scroll Control 1020 (e.g., scroll to the right), Prop Dropper 1030 (to enable a prop/object to be placed within the slide), Screen/Presentation Remote 1040, Laser Pointer 1050, Grabber 1060, Pencil/Marker 1070, Slide Clicker 1080, Measuring Tape 1090. The controls are described in greater detail elsewhere herein. FIG. 11 illustrates an example virtual reality client display in a Head Mounted Display (HMD) of a user/participant. This is another example user menu display (e.g., Transport menu) of controls available in an active VR slide presentation. Displayed controls include: Magic Carpet 1100 and Jump To 1110 (which enables the user to jump to a desired location).

Figure 12:
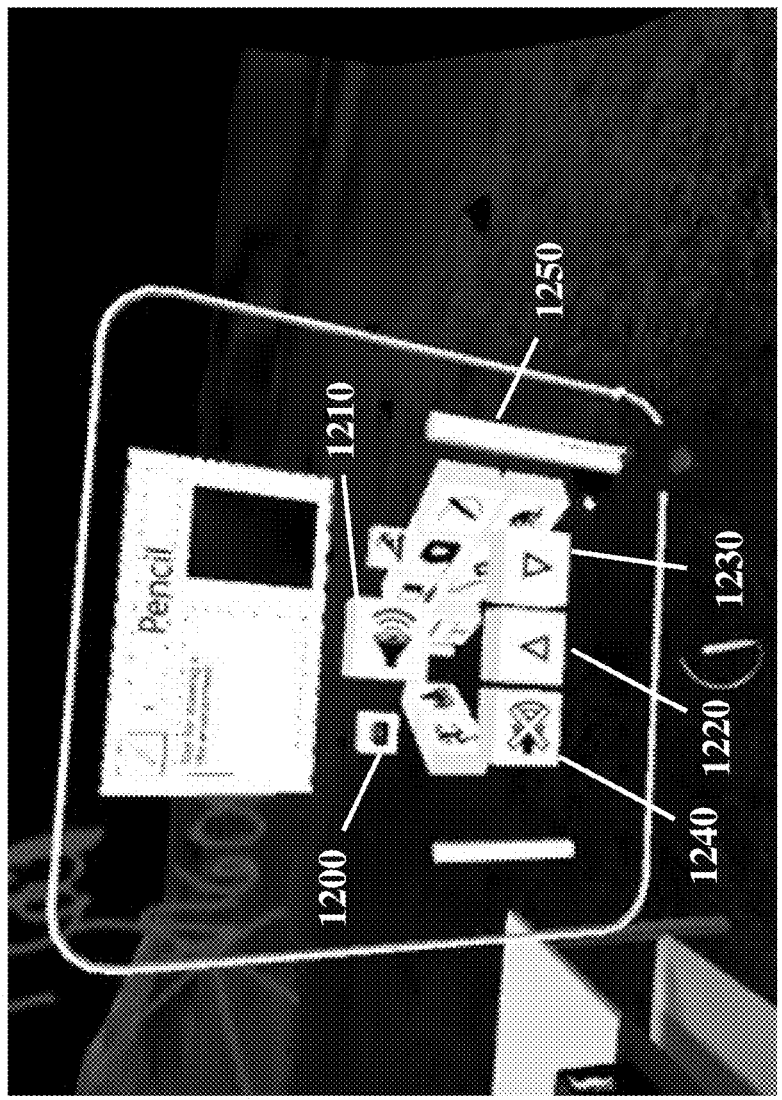
FIG. 12 illustrates an example virtual reality client display in a Head Mounted Display of a user or participant. The scene includes an example third tools menu display.

FIG. 12 illustrates an example virtual reality client display in a Head Mounted Display (HMD) of a user/participant. This is another example user menu display (e.g., General menu) of controls available in an active VR slide presentation. Displayed controls include: Lower Audio 1230, Raise Audio 1220, Mute Microphone 1210.

Figure 13:
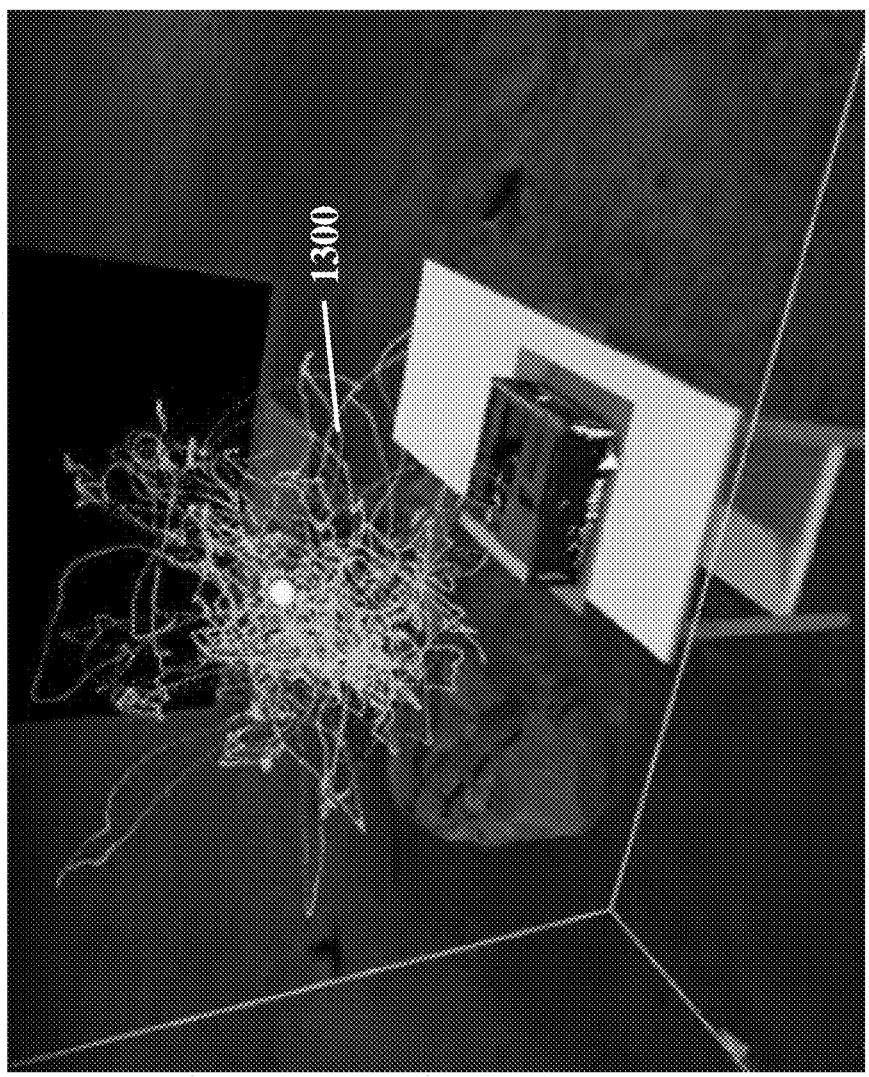
FIG. 13 illustrates an example virtual reality slide presentation cloud trace of recorded movement during a presentation session.

FIG. 13 illustrates an example virtual reality slide presentation cloud trace of recorded movement of a user's limb during the course of a portion or entire portion of a VR slide presentation.

Figure 14:
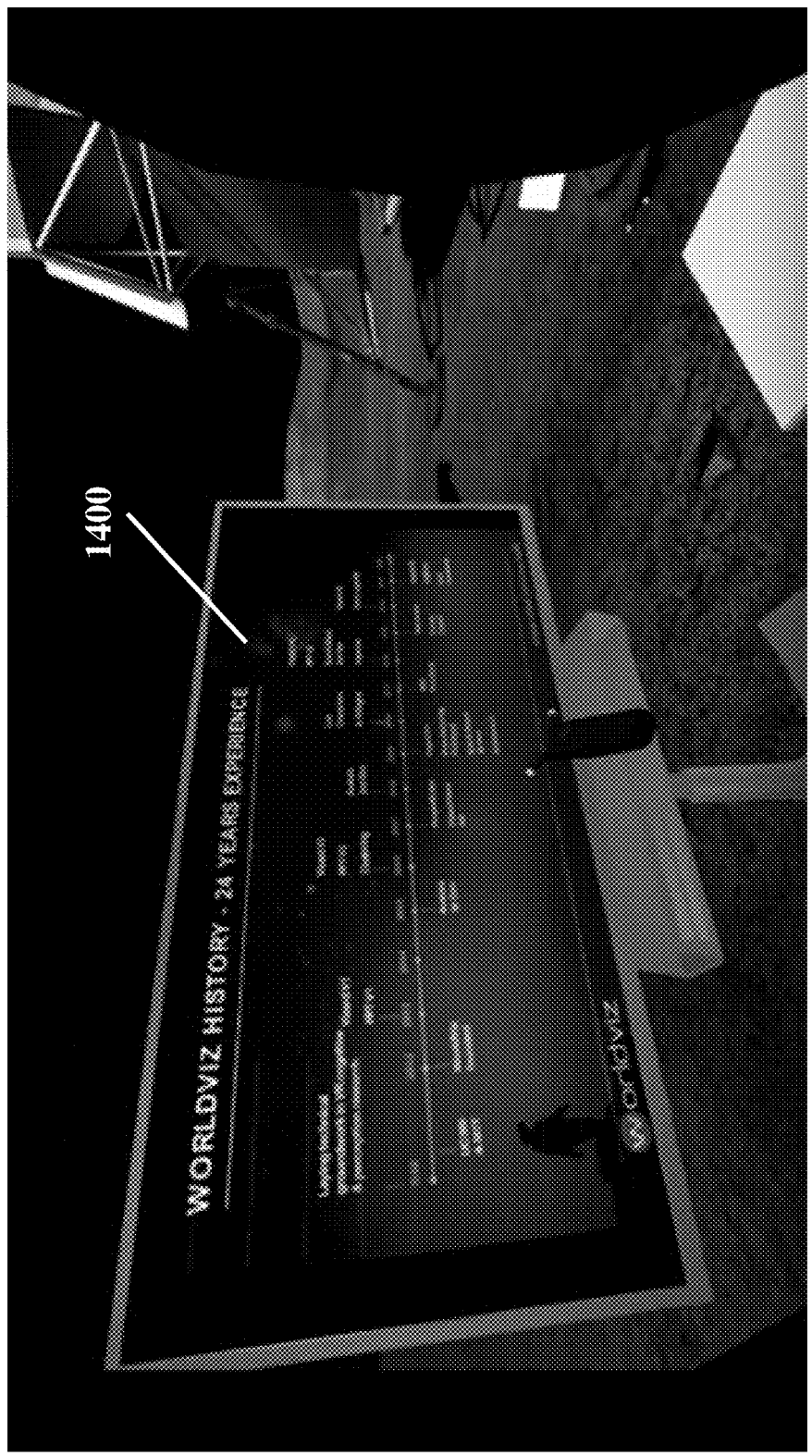
FIG. 14 illustrates an example virtual reality client display in a Head Mounted Display of a user or participant. The scene includes an example Virtual Screen prop.

FIG. 14 illustrates an example virtual reality client display in a Head Mounted Display (HMD) of a user/participant. In this example, a virtual screen 1400 is included in the display and enables a user to display slides associated with a conventional 2-Dimensional slide presentation.

Figure 15:
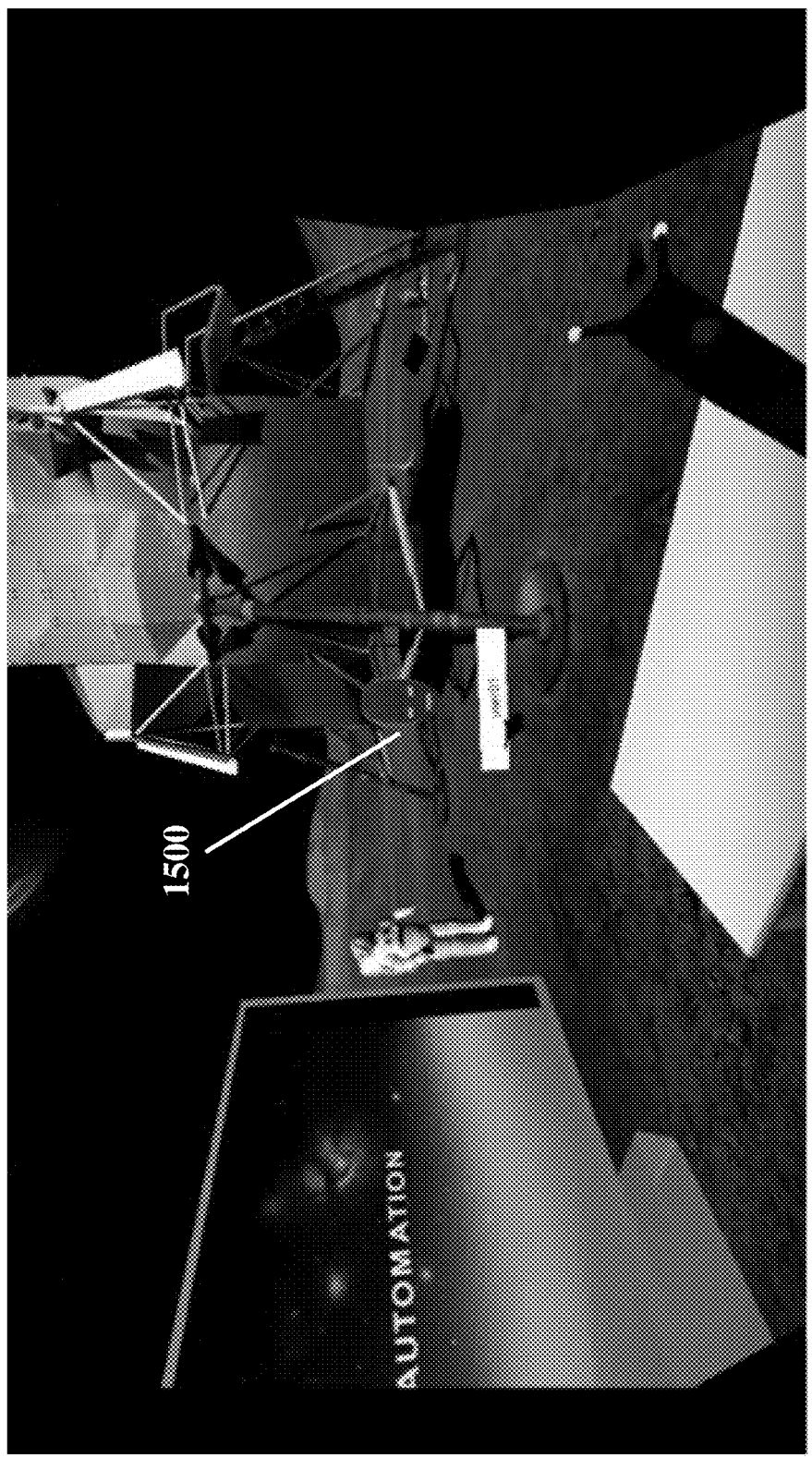
FIG. 15 illustrates an example virtual reality client display in a Head Mounted Display of a user or participant. The scene includes an example Avatar of a participant.

FIG. 15 illustrates an example virtual reality client display in a Head Mounted Display (HMD) of a user. In this example embodiment an Avatar representation 1500 of a session participant 160 is illustrated in the slide.

Figure 16:
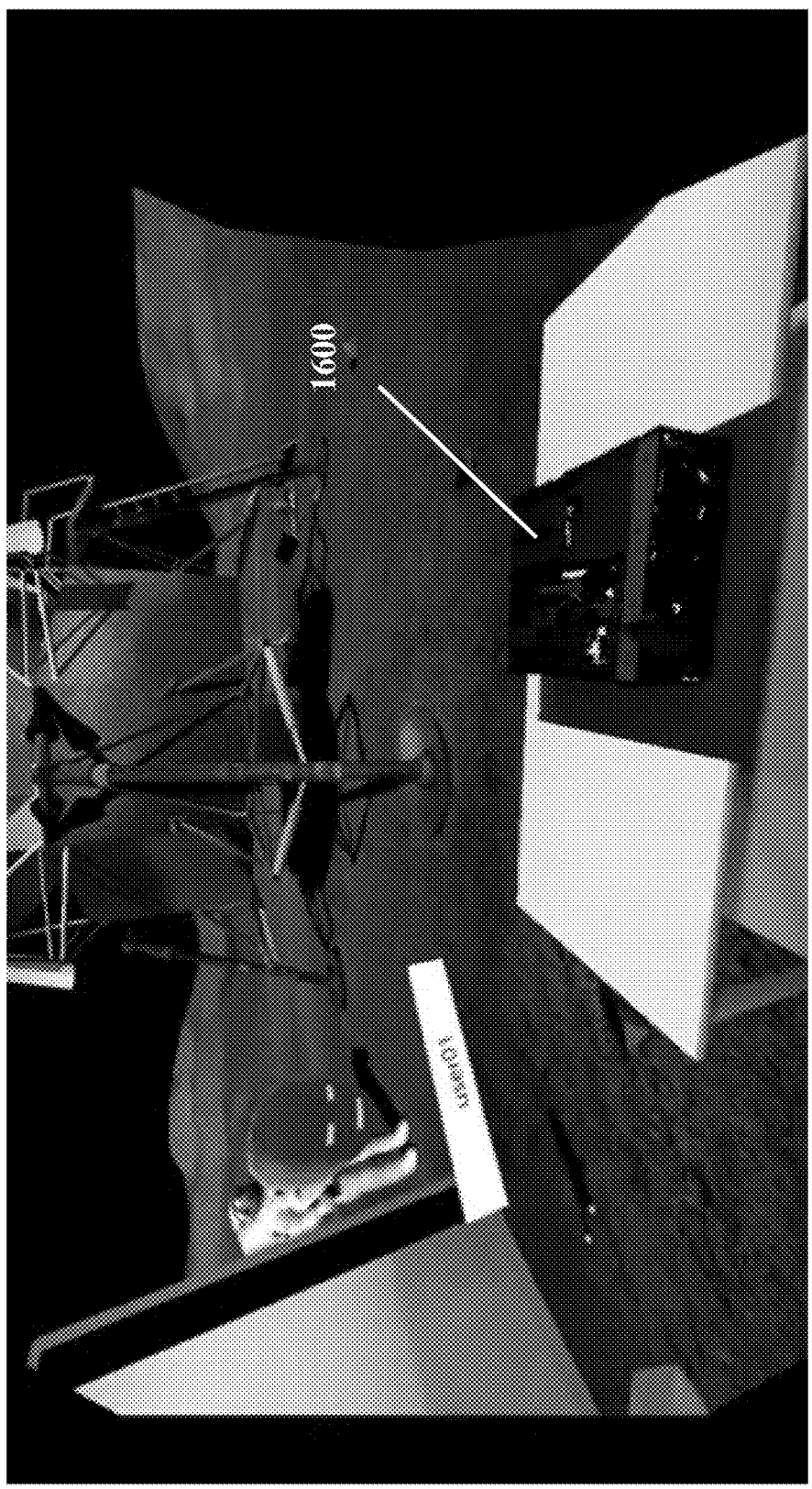
FIG. 16 illustrates an example virtual reality client display in a Head Mounted Display of a user or participant. The scene includes an example Workstation prop.

FIG. 16 illustrates an example virtual reality client display in a Head Mounted Display (HMD) of a user. In this example, a Workstation prop 1600 is displayed on a table.

Figure 17:
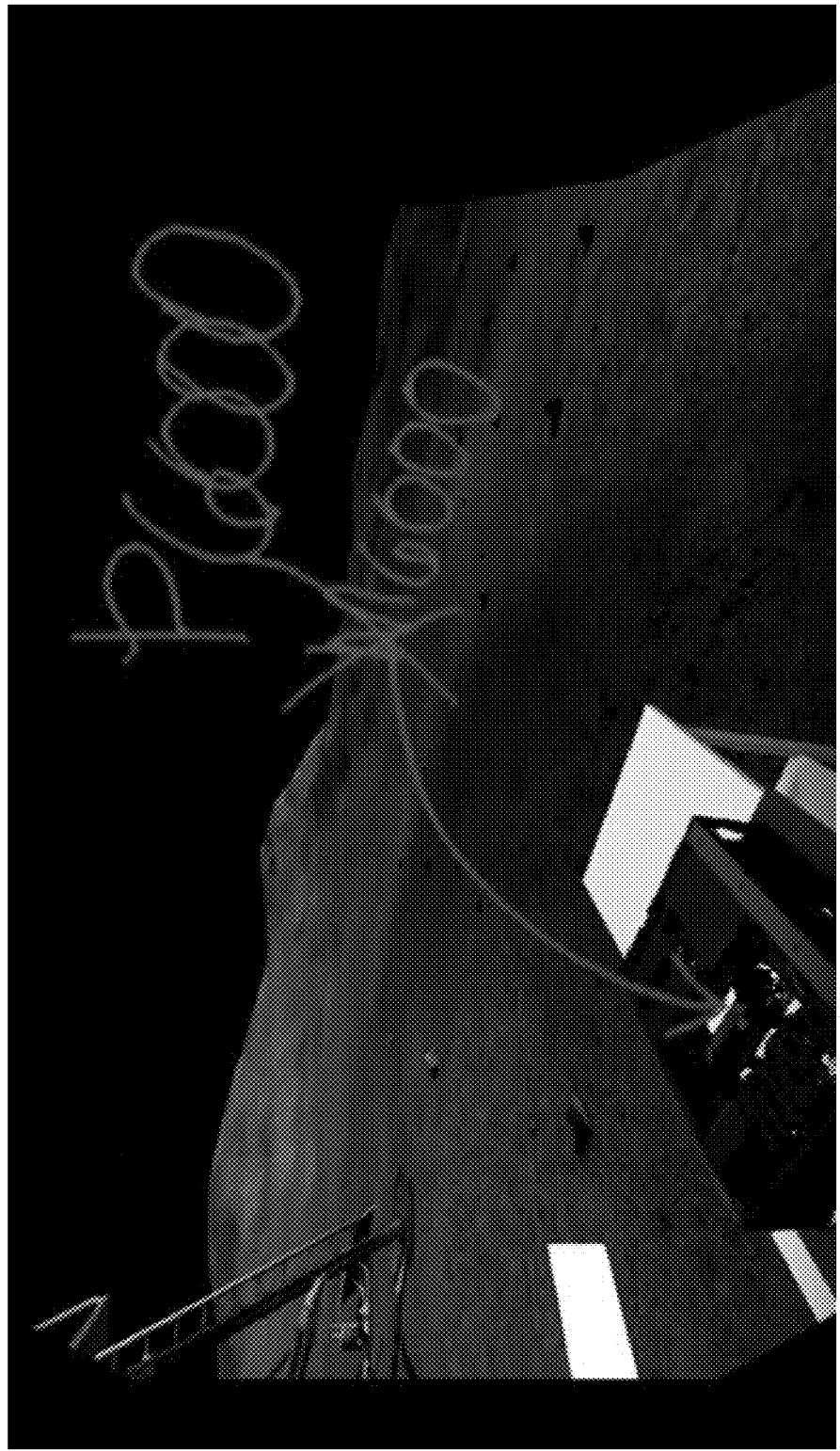
FIG. 17 illustrates an example virtual reality client display in a Head Mounted Display of a user or participant. The scene includes an example display of a Pencil/Marker tool drawing.

FIG. 17 illustrates an example virtual reality client display in a Head Mounted Display (HMD) of a user/participant. The figure illustrates an example use of a Pencil/Marker tool which enables a user to draw in a scene for display to user and participants.

Figure 18:
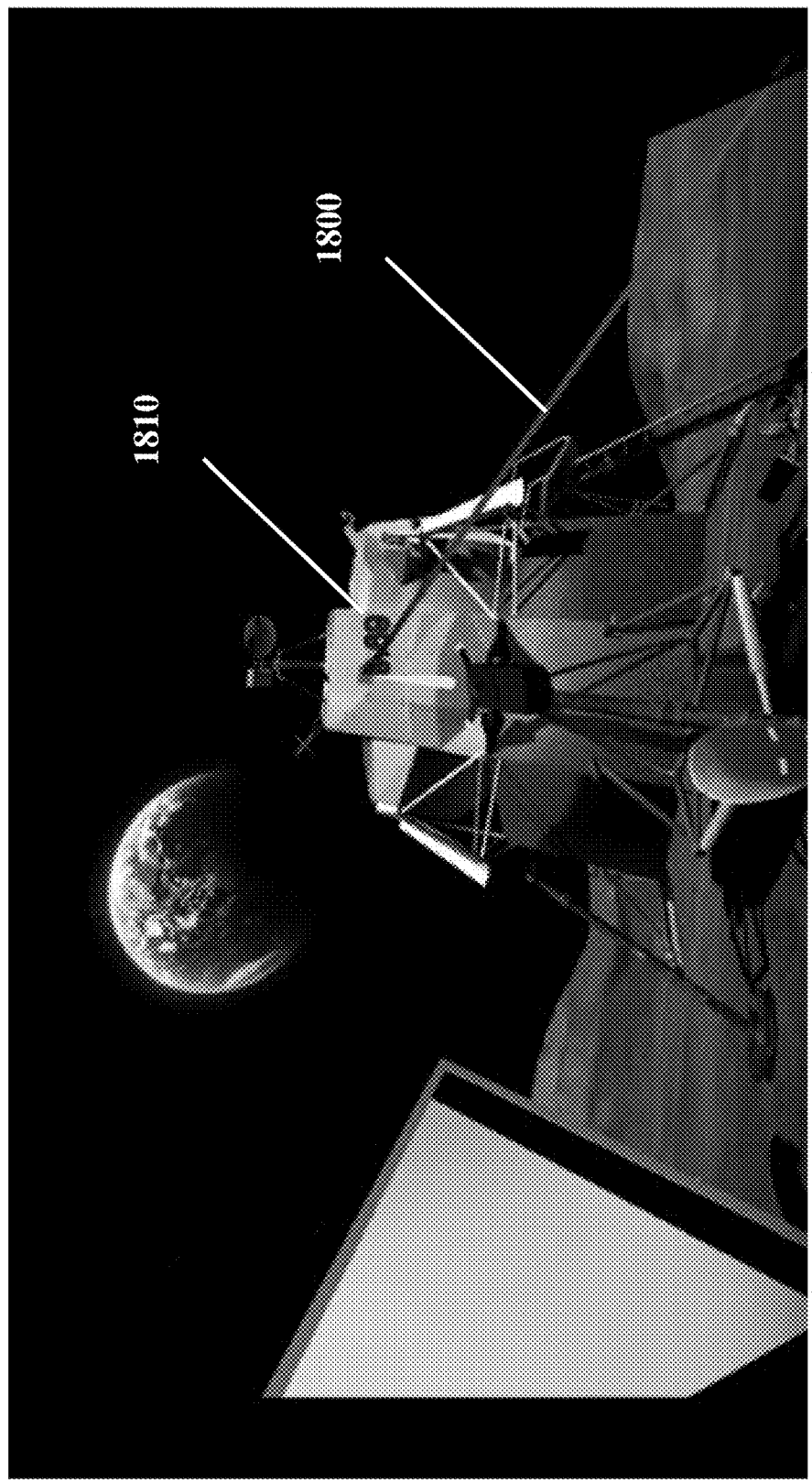
FIG. 18 illustrates an example virtual reality client display in a Head Mounted Display of a user or participant. The scene includes an example display of a Measuring Tape tool measurement.

FIG. 18 illustrates an example virtual reality client display in a Head Mounted Display (HMD) of a user/participant. The figure illustrates an example use of a Measuring Tape tool enables a user to measure a distance between two points in a scene of a slide.

Virtual Reality Presentation Capabilities

Virtual reality and/or augmented reality comprise a computer simulated environment that can simulate a physical presence in places in the real world or imagined worlds. Advantageously, the rich environment of virtual reality and/or augmented reality coupled with computer-aided presentation features enables a user to overcome many of the disadvantages of a remote conference call, remote video conference call, and/or online networked session discussed previously.

This specification discloses certain embodiments which provide a set of computer-aided tools which enables a non-programmer to develop a set of visual aids/scenes, a complex problem in three dimensional virtual reality environments, and mechanisms for controlling a delivery of the developed presentations to customer prospects.

The terms "assets" and "objects" as used herein are intended to be used interchangeably unless the context indicates otherwise. The terms, as described herein, may refer to renderings of physical objects, including 3-Dimensional objects, which may be used in a scene to achieve a specific objective such as to create a life-like virtual world, to enable the demonstration of a product/service, and/or features/attributes of a product/service, etc.

The description herein may refer to a user, operator, administrator, moderator, sales person, marketing person, meeting host, host, or presenter as an individual configured to present a VR slide presentation, for example a sales/marketing presentation to a receiving group of one or more observers, participants, customer prospects, technicians, aides, etc., unless the context indicates otherwise. For clarity, the terms user, operator, administrator, moderator, sales person, marketing person, meeting host, host, or presenter may be used interchangeably unless the context indicates otherwise. The terms observers, participants, customer prospects, technicians, aides, may also be used interchangeably unless the context indicates otherwise. Optionally, a user/meeting host may have access to certain session controls not available to a participant. The description herein may also refer to a term "collaborators" which may include user/meeting hosts and participants. The description herein may also refer to the terms audience and observers, which may also be used interchangeably, and include individuals which may view a VR presentation from a user's perspective or from a participant's perspective but are not active participants in the VR session, unless the context indicates otherwise. For example, an observer may not have a device capable of activating and/or selecting controls, such as a PPT Wand Controller.

Optionally, a Virtual Reality system is configured to enable a user to present a choreographed set of VR presentation slides to one or more participants in a VR session. Optionally, a user and participants are in the same physical room/area or the user and participant(s) are geographically remote from each other, or some combination of geographically local user(s) and remote participant(s). In a scenario where user and participant(s) are geographically separated, a user device and participant device(s) may be connected via a data network. Given an adequately configured data network (e.g., a cable or T1 broadband network), although a user and participants may be remote from each other does not adversely affect the VR experience. Optionally, the user (e.g., meeting host) selects certain controls of the VR system, to initiate a VR presentation session. Optionally, a VR slide presentation session comprises one or more scenes, in which a given scene may include fixed or dynamic objects and/or displayed representations (e.g., avatars) of session participants. In certain augmented reality presentations, certain objects in a display correspond to real world objects/items. Optionally, a given scene in a presentation includes certain visual and/or audio animations which may be controlled by a user. Optionally, a scene may be a three dimensional representation of a virtual environment in which a presenter and participant(s) are interacting together, for example, a room, an outdoor plaza, a park, etc. Optionally, a scene completely encompasses a presenter and participant(s), can be viewed by a user and/or participant in any direction (e.g., forward, behind, above, and below), and a perspective of a scene adjusts appropriately by the VR system (e.g. via head tracking technologies) in order to create a life-like user experience.

Presentation Designer Client

Conventionally, creating collaborative Virtual Worlds is challenging endeavor, generally requiring specialized programming skills not generally a skill of sales and marketing personnel. A Presentation Designer client, as described herein, enables a user, for example marketing personnel, with no, limited, or novice computer programming skills, to create/design a rich Virtual Reality slide presentation and collaboratively share the created presentation with local or remote participants. In an example embodiment, a Presentation Designer client enables a user to download (e.g., from a cloud computing system, an Internet connected server system, an app store system, etc.) a collection of Virtual Reality scenes/assets and composite them together in the context of a series or other set of slides which enables the user to tell a rich/interactive story within the context of a Virtual World.

Create Presentation

In an example aspect of the disclosed system, a user accesses a computing device with installed Virtual Reality software and runs a Designer client (or Presentation Designer client, terms which may be used interchangeably herein) on the computing device, for example by selecting (e.g., via a menu presented in the VR headset, via a menu present on a 2D display, via voice command or otherwise) a start client control. From the running Designer client, optionally under a File menu, a user selects a "Start a new presentation . . . " control or the like. Optionally, a New Presentation control displays a Properties window/pane with one or more editable fields. Optionally, a user manually or the system automatically assigns an identifier (e.g., an alphanumeric string) to uniquely identify the new presentation. Optionally, the presentation may be shared with other users/participants over a shared data network and the assigned identifier may be used to access the presentation. Optionally, a user assigns a name to identify a new presentation in a more descriptive manner (e.g., via text or voice entry). Optionally, a description field enables a user to provide a brief summary of the new presentation (e.g., via text or voice entry). Optionally, other descriptor fields for a new presentation are provided (e.g., author, department, etc.). Optionally, a VR slide presentation is configured with a unique password and/or a biometric user identifier (e.g., iris scan, fingerprint, face recognizer, etc.). Optionally, once at least a name or identifier is entered via a user interface, a user selects a Create New control. Optionally, the Create New control verifies that at least the identifier (e.g., if manually entered by a user) and/or name of the new presentation entered by the user is unique, and if so, creates a new presentation with user entered descriptors and stores the descriptors in association with the new presentation in computer memory. If the system compares a manually entered identifier with other stored presentations (e.g., other presentations within an organization), and it is determined that the presentation identifier is not unique, an error message is displayed informing the user of the condition and enabling a new identifier entry. Optionally, a New Presentation Properties control is displayed in a user interface which includes a presentation sharing control that when selected by a user causes the newly created presentation to be accessible by other users of the system (e.g., other members, local or remote to the user but within the same organization or Enterprise, guest participants, etc.)

In an example embodiment, a user may modify one or more descriptors associated with a presentation by selecting a menu control, for example "Presentation . . . ," (e.g., from under a File menu), editing an Identifier field, Name field, Password field, or Description field and then selecting a Rename Presentation control or Save Edits control. Optionally, in response to a Designer client user interface control selection and user entered changes, the presentation is renamed with new descriptors after the system verifies that a given manually entered identifier and/or password of the existing presentation entered by the user is unique. If the identifier entry is determined to not be unique, an error message is optionally displayed to the user informing the user that the identifier is not unique and instructing the user to reenter a unique identifier. Optionally, to share an unshared presentation, the user may check a control associated with sharing in a Properties window.

A presentation is delivered in a session to one or more participants/audience in the context of one or more Virtual Reality slides or a VR slide set. Optionally, each slide has certain scene dynamics which may be managed by the presenter/moderator via slide transitions and/or activation of certain controls. A slide may be thought of as a state of a scene and a given slide transition corresponds to a state transition. Optionally, a slide transition, for, example a change from slide 3 to slide 4, corresponds to a state transition. In general, elements of a scene have certain properties which may be triggered in response to a slide transition, as further described herein with respect to triggers. Optionally, certain actions performed by the Presentation Designer client may be applied to an individual slide or applied to all slides. For example a user may set an asset's/object's position, rotation, and/or scale. Optionally, the Presentation Designer may prompt a user to apply the transform on the current slide or all slides in a given slide set.

Figure 36:
FIG. 36 illustrates an example display of a computer-aided design client for Virtual Reality Slide presentations.

An example embodiment of a Presentation Designer home screen 36110 used to create a Virtual Reality slide presentation is illustrated in FIG. 36. The left-hand pane 36100 illustrates a limited number (e.g., 3, 4, etc.) of thumbnail version of created slides within a range of the current displayed slide 36200. The lower pane 36300 includes a series of Virtual Reality assets (e.g., 3D objects with or without video/audio animation) which may be added via drag-and-drop onto the current slide 36200. The right-hand pane includes a component graph which provides a listing of all configurable assets of a scene as further described herein below. The lower right-hand pane area 36600, 36700 provides a set of properties associated with presentation participants/attendees of the current slide. Optionally, the Presentation Designer includes a collection of controls. Optionally, the home screen 36110 includes a set of general controls 36250 associated with the Presentation Designer application itself. These controls 36250 may include, for examples, a settings control which enable a user to configure various features/attributes of the Designer application; a help or information control; a tutorial control which may provide an in depth written and/or visual help tutorial; an online help control which enables a user to connect to a service provider for online help/assistance. Optionally, the home screen 36010 may include a set of slide spatial manipulation controls 36350. These spatial control 36350 may include an x/y space manipulation control; a rotation in space control; a scale control, a freeze 3D model control; etc. Optionally, the spatial controls display the positional coordinates of a selected object in x, y, z, space. Optionally, the positional display coordinates may be edited by a designer manually. Optionally, there is a command to display x, y, z, coordinates using global coordinates or local coordinates of a 3D object, if the 3D object is associated with another object (e.g., a parent object). Optionally, the home screen 36110 may include certain other handy design controls 36450. These additional controls 36450 may include an indicator of the size/mass of the slide wherein, for example, too many 3D objects, animations, etc. may cause delays in slide loading; a control to enable a designer to see through an object of a slide to see what might be behind the object on the slide; a control to place/drop 3D objects onto the slide to ensure they will be properly placed in relation to other aspects of the scene (e.g., on the floor and not slightly below the floor), optionally, the placement action is animated; a grid control illustrating the positioning in x,y,z coordinates of a selected object (see example Grid display in the active slide); an audio collaboration control which enables a designer to establish an audio session/conference with one or more co-editors; a save version snapshot control which enables a designer to save a current version of the VR slide presentation to a data store; a general settings control which enables a designer to set certain settings/properties with respect to the active VR slide presentation; and, a close presentation which when activated closes the active VR slide presentation. Optionally, there is a control to create a new slide and/or delete a slide. Optionally, the Presentation Designer application includes a Start control 36500 which when activated causes the play of animation associated with an object selected in the component graph 36400. Optionally, the Start control 36500 causes the play of all animation associated with a selected object in the component graph 36400 and any animation associated with children/descendant components. Optionally, the Presentation Designer application includes a set of Attendee Management controls 36600. The Attendee controls 36600 enable a designer to set a location of an Avatar representation of an attendee in the presentation session. When an attendee joins a VR slide presentation, the attendee (or representation) will join at the location specified for each slide. Optionally, the Attendee controls 36600 display the specific x, y, z, coordinates of an attendee which may be edited by a designer. Optionally, there are specific controls which enable the Designer to replicate the attendees positioning in the previous slide, all previous slides, the next slide, all subsequent slides, and all slides in the presentation. The Attendee controls 36600 further enables a designer to specify which controls an attendee will have access to for a given slide. Example controls may include a Grabber, Tape Measure, drawing tool, laser pointer, or any other user tool accessible by the Presentation Designer application. Optionally, there are Attendee controls 36600 which enable the Designer to replicate the attendee access to certain controls to the previous slide, all previous slides, the next slide, all subsequent slides, and all slides in the presentation. Optionally, the Presentation Designer application includes a set of Attendee Menu management controls 36700. The Attendee Menu controls 36700 enable a designer to establish which menu controls are available to an attendee in the current slide. Optionally, there are Attendee menu controls 36700 which enable the Designer to replicate the attendee access to menu controls to the previous slide, all previous slides, the next slide, all subsequent slides, and all slides in the presentation.

An optional advantageous feature of the Presentation Designer is the ability of a designer/user to collaborate with another user while creating a VR slide presentation. In particular, tools/controls which enable a designer/user to record an active VR slide presentation, including tracking movements of the presenter and presenter's audio and associate the tracking and audio with the slide presentation. Optionally, the recording becomes an asset which can be drag-and-dropped into a presentation or edited in other ways as further described herein. Optionally, when working in a collaborative VR slide presentation environment, the user/presenter/collaborator may be geographically local and/or remote from the designer. In an example embodiment, a presentation designer may be sitting at home with a monitor and computing device (e.g., a laptop) connected over a network designing a presentation in which a collaborator/user/presenter is in a tracking camera equipped studio practicing a presentation, making edits to the same presentation, or just chatting with the designer. In this example, the designer can see the collaborator's movement on the laptop screen and hear the collaborator as the designer's computing device is receiving tracking data and audio. As certain 3D objects are added to the slide (e.g., by a drag-and-drop from the asset pane), for example by the designer, they appear instantaneously in the HMD of the local/remote collaborator. Together the designer and collaborator/user/presenter can jointly create the VR slide presentation (e.g., presenter Joe tells designer Sally to move the just added jet engine closer to me.) Optionally, there may be multiple collaborators at different geographic locations. To continue the example embodiment, when the designer is satisfied with the VR slide presentation, the designer asks the presenter/user to start from the beginning and give the VR presentation. The designer records the video/audio session to create, for example, a non-hosted training module as further described below. With Presentation Designer, professional, high-quality, non-hosted VR presentations can be created in which one or more local or remote attendees can participate. Optionally, the attendees may join a presentation at the beginning, drop in during an active presentation, and leave at any time and pick up where they left off at a later time. Optionally, each slide in a VR slide presentation may be partitioned into individual slides or separate assets. Optionally, separate slides may be joined to create a full VR presentation. Optionally, a given slide may require multiple takes to get the delivery just right. Once right, the slide may be replaced with a replace slide command with the new version. Optionally, just the audio may be replaced for a given slide. Optionally, just the tracking may be replaced for a given slide. Optionally, new 3D objects may be added to or removed from a recorded VR slide presentation. Advantageously, the Presentation Designer enables a designer, with or without collaborators, to rapidly create hosted or nonhosted, professional, rich immersive VR presentation experiences with minimal special purpose Virtual Reality hardware.

After creating a VR slide presentation template, a user interface of the Presentation Designer client displays a Slides pane displaying, for example, a listing of slides. Optionally, the listing includes one or more thumbnail depictions (e.g., small scale versions) of each slide in the slide deck. Optionally, in addition to or in place of a thumbnail depiction, a listing of slide titles or slide names and/or a summary description of each slide are generated and presented. In an example embodiment, subsequent to the creation of a new VR presentation, the display listing of slides is blank as no slides have been added or created by a user. Optionally, to create a new slide, a user selects a Designer client control (e.g., a right mouse click in a Slides pane), and in response to a displayed menu of controls, the user selects an "Add Slide" control. Optionally, in response to the menu selection the system adds a blank new slide. Optionally, a new slide may be created using a duplicate slide control. For example, a user may select a "Duplicate Slide" control from a displayed menu of controls, in which case, the system creates a duplicate of an existing slide, including the scene, all of the assets/objects of the existing slide, and its associated properties. Optionally, for each slide in a VR presentation slide set, a user may rename a slide and/or add a descriptive summary via the Designer client user interface. Optionally, a user may also add slide Notes as described below.

To add content to a slide, the system may enable a user may to upload a collection of assets to the system, which may be used to form one or more scenes. Optionally a slide may include but is not limited to a scene or place in a virtual world, fixed objects, and/or dynamic objects. Optionally, assets are created by a user (e.g., a graphics artist) and/or by online VR graphic designers which make assets available (e.g., for sale), optionally over the Internet and/or in a cloud computing system. In an example embodiment, assets are uploaded in response to a user selection of a Designer client control, for example, a File menu control selection, followed by an Upload Scene menu control selection. Optionally, in response to the selection, a dialog pane is presented to a user which enables the user to search/browse/select one or more file assets to upload from computer memory including computer memory accessed over a data network. Optionally, when an upload operation completes the uploaded scene is displayed to a user and assets are listed in an Assets pane 400 as illustrated in FIG. 4. Optionally, to add an uploaded asset/object to a scene, a user selects one or more assets from the Assets pane 400 and drags them into the slide at a desired location in the scene of the slide. Following an asset placement action, one or more assets are displayed in the placed location of the slide. Optionally, an asset may be uploaded directly into a slide with a Designer client control activation, with a selected asset/object placed, for example in a center of the displayed scene. Optionally, adding an asset to a slide causes an update of a Component Graph pane 410 in the Designer client interface. Optionally, a Component Graph pane provides a listing of all configurable assets of a scene. For example, with reference to FIG. 4, a user might place a soccer ball 420 into a kitchen scene 430 causing a soccer ball asset 440 to be listed in a Component Graph pane 410. Optionally, assets of a slide may be configured (move, delete, add, apply function, etc.) by control operations applied to assets within a slide or by a selection of an asset in the Component Graph pane 410. Optionally, a user may take certain actions or assign certain features/properties to assets in a slide by selecting a control in association with the asset (e.g., a mouse right click when hovering over a displayed asset or by selecting an asset in the Component Graph pane 410). To configure certain asset properties (e.g., cause an asset to be grabbable, cause an asset to be associated with certain animations, etc.) optionally an "Unlock Scene Asset" control of the Designer client is presented to the user, and in response to detecting that the user has selected the Unlock Scene Asset control and a "Make Component" option, the asset is unlocked. Optionally, in constructing a scene via the Presentation Client hosted on a desktop computer with a mouse or other pointing device control, the Presentation Client provides certain user navigation and feature desktop controls. For example, to navigate within a slide a user may move a cursor using a pointing device. Optionally, to move an asset within a slide in an x, y, or z dimension a user may "right click" or the like a mouse device control on a specific asset and drag the asset from a first location to a second location. Optionally, to rotate an asset within a slide, for example in yaw and pitch directions, a user interface is provided wherein in response to detecting that a user has provided a certain type of input (e.g., a left click a mouse device control) while pointing at (or otherwise selecting) a specific asset, the user is enabled (e.g., using drag and drop techniques) to reposition the asset from a first position to a second position. Optionally, to scale an asset within a slide, for example to expand or reduce the size of an asset proportionally, a user may select and hold a mouse device control on a specific asset and drag the object to the desired size and the system receives the user inputs and causes the size of the asset to change on the display. Optionally, to zoom in or out of a slide, a user may select a scene and use a mouse device scroll wheel control to zoom in and zoom out and the system receives the user inputs and causes the corresponding zoom action to be performed via the display. To remove an asset from a slide, a user may select an asset from a list of assets in the Component Graph pane 410 or, using a pointing device control, select an object itself, and provides a delete command (e.g., by right clicking on a control to cause a menu to be displayed, and selecting a Delete option), and in response, the system will delete the asset from the slide.

Component Functions

Component Functions are features that the system enables a user to apply to active slide components to cause certain assets/objects in a slide to be associated with a set of properties (e.g., certain animations). Examples of properties of an asset/object which may be configured by a user include but are not limited to one or more of the following: move to, rotate to, scale to, run animation, stop animation, set highlightable, set grabbable, hide, timer, etc.

Optionally, a Designer client enables a "Move To" function to be associated with a trigger condition (e.g., a slide transition) which causes a user identified asset to be repositioned in the scene/slide to a user specified x, y, z coordinates. For example, in the example kitchen scene illustrated in FIG. 4, a "Move To" function may be configured on a slide transition to cause a soccer ball 420 to move from a floor 440 to a kitchen counter 450 in a scene 430. Optionally, a Designer client enables a "Rotate To" function to be associated with a trigger condition (e.g., a slide transition) which causes a user identified asset to be rotated in a scene/slide to a user specified position. For example, in the kitchen scene 430 of FIG. 4, a "Rotate To" function may be configured on a slide transition to cause a soccer ball 420 to rotate on a floor 440, enabling a participant to view the opposite side of the soccer ball without having to physically walk around the ball. Optionally, a Designer client enables a "Scale To" function to be associated with a trigger condition (e.g., a slide transition) which causes a scale of a user selected asset to increase or decrease to a user specified set of coordinates. For example, a "Scale To" function may be used to improve a view of an asset by a user and participants in a scene. Optionally, a Designer client enables a "Run Animation" function to be associated with a trigger condition (e.g., a slide transition), where an animation script associated with a user selected asset is invoked. Optionally, a Designer client enables a "Stop Animation" function to be associated with a trigger (e.g., a slide transition) where an animation associated with a user selected asset is halted. Optionally, a Designer client enables a "Run Audio" and "Stop Audio" in association with a trigger which causes an audio feature/script associated with a slide to start or stop playing in response to a trigger condition. Optionally, a Designer client enables a "Set Highlightable" function to be associated with a trigger condition (e.g., a slide transition), wherein a user selected asset/object in a scene is highlighted, for example, via a color change of the asset, a background color change near the asset, a halo effect around the asset, etc. Optionally, the Designer client enables a "Set Grabbable" function to be associated with a trigger condition which causes a selected asset to be grabbable by a user or participant. The system may enable an asset/object grabbed by a user/participant to be viewed from any angle in response to the user/participant moving/rotating the grabbed asset/object. Optionally, the Designer client enables a user to configure an action to occur upon a release of a grabbed asset/object. Optionally, a release asset choice may include, for example: float in space at a point of release, float back to a place and position at which an asset/object was initially grabbed (e.g., via the computing system executing a simulation script), disappear from a display and reappear in an original place and position, conventional gravitational forces and/or centrifugal force (e.g., fall to the floor), or other configured properties scriptable by a user and/or designer. Optionally, the Designer client enables a "Hide" function which may be associated with a trigger condition which causes a selected asset/object in a scene to be hidden from view of a participant and/or user.

Other Example Actions

Optionally, the Designer client enables a "Proximity Sensor" feature which enables a user to configure a sensor condition (e.g., where the sensor may be a software sensor that monitors and detects user actions with respect to a VR scene) to be triggered in response to an action within a configured proximity in a scene/slide. When a user and/or participant enters, breeches, and/or views (e.g., as configured by a user) a scene/slide, the user action is detected and this causes a sensor or other action. Optionally, a Designer client enables a "Jump To" feature to be associated with a Proximity Sensor which defines a location transport of a user and/or participant(s) in response to a triggered proximity sensor. For example, a "Jump To" feature causes a user and/or participant to be transported to a new configured location within a virtual world (e.g., to a location within the scene/slide or to a location in another scene/slide). Optionally, a trigger event other than a proximity sensor may be configured in association with a "Jump To" feature. For example, a timer, a user initiated trigger control, and/or a displayed control selection may cause a Jump To action. Optionally, a Jump To transition may be animated enabling a user and/or participant(s) to experience a virtual reality transportation route between their starting and ending locations through a virtual reality world. Optionally, a "Jump To" causes an instantaneous transportation, or nearly instantaneous transportation, of a user and/or participant(s) to a new location.

Optionally, a Designer client enables a "Virtual Presentation Screen" feature which enables a virtual presentation screen prop to be added by the user to a scene. Optionally, a presentation displayed on the Virtual Presentation Screen may be a static slide presentation and/or may include animations and/or videos. Optionally, a user associates a conventional presentation, for example a Microsoft Power Point presentation, to be used with a Virtual Presentation Screen. Optionally, a Virtual Presentation Screen may be controlled with a "Presentation Remote" which is further described herein.

Example Triggers

A Designer client enables a user to configure an initial state and a series of animations to occur for a given slide (including no animation for a slide). A signal, condition, or trigger (these terms may be used interchangeably herein unless the context indicates otherwise) is initiated by an event, such as a user/presenter control selection and/or action, timer, animation completion, proximity sensor, etc., and may cause certain actions and/or animations to occur (e.g., slide transition, scene change, animations, asset state changes, etc.). A user/presenter may, for example, configure (via the Designer client) a given slide transition to cause an object to appear or a background scene to change. A user/presenter may, for example, configure a given slide to cause an object to animate. A user/presenter may configure, for example, a given slide to cause certain objects of a scene to be grabbable by a participant. Optionally, a user may configure a given slide to cause a certain audio loop to play. Optionally, certain controls are enabled in a scene in response to a detected signal. For example, an animation associated with an object may be activated in response to a user directing a Wand Controller, for example a PPT Wand Controller, at an object. Optionally, a Next Slide action (e.g., in response to a meeting host selecting a next slide control) may be treated as an event trigger. Optionally, a Next Slide action causes a scene associated with the next slide to be displayed (e.g., in a Head Mounted Display of a user and/or participant(s)). Optionally, an expiration of a timer may be defined as an event trigger. For example, timer may be configured to be displayed to a meeting host in response to a slide transition. If the slide timer counts down to zero before a transition to a next slide occurs, the displayed timer may change color (e.g., green to red) or otherwise signal an alert indicating to the host s/he needs to move onto the next slide. A proximity sensor event is another example type of event trigger. Example proximity event occurrences may include but are not limited to: a user/participant enters a configured proximity zone, a user's/participant's gaze is directed to a configured proximity zone, a user's/participant's limb enters a proximity zone, etc.

Notes Feature

Optionally, each slide is configured with a Notes pane. In an example embodiment, the Presentation Designer client includes a control which enables a user to enter text or notes in association with a given slide. Optionally, notes entered by a user are, for example, key points a user may intend to speak to or point out regarding a scene or object depicted in a given slide. Advantageously, Notes may optionally be configured to be displayed in a fixed point in a head mounted display (e.g., center, lower left, lower right, upper left, upper right, etc.) or a dynamic display position which moves in a user's display in response to certain user triggers, actions and/or events of the simulation, and/or scene alterations or changes. Optionally, Notes positioning may be user or automatically configurable for each slide. In addition, Notes may be configured as published or unpublished, wherein unpublished notes are not visible to a participant during a session (and, therefore, not a distraction). In an example VR slide presentation, a user may advance through a series of slides in which the only changes to a scene are the Notes, a scene and assets of the scene do not change.

Virtual Reality Session Scheduling

As will be described, a scheduling system may be provided. Once a user is finished (or partially finished) with the user's VR slide presentation, the Designer client/system optionally presents a set of controls (e.g., a file control, an upload control, etc.) enabling a user to upload their finished presentation to a network-based server 200 accessible by a user/presenter and one or more VR participants and/or observers (e.g., collaborators). For example, a File, "Upload Scene" control is provided which may then be selected by a user to upload the new (or edited) VR slide presentation to a network-based server 200. In this example, the system further provides a control enabling a user to schedule a date and time to release the finished VR slide presentation to a group of participants. Optionally, a scheduling control provides a configurable VR slide presentation Session Open date and time, Session Start date and time, and/or Session End date and time. Optionally, the session Open date and time is for a virtual meeting place (e.g., a virtual reality room) enabled by the system in which collaborators may join prior to the start of a scheduled presentation. Optionally, an interface is provided via which a user may edit their presentation any time prior to a user configured presentation Session start date/time. Thus, in an example embodiment, subsequent to a creation, uploading, and session Open date and time of a VR slide presentation, certain VR slide presentation details may be viewed by one or more session participants prior to the presentation Start (e.g., while the participant is on hold, waiting for the presentation host to join the VR slide presentation). In an example embodiment, a given user, upon invoking a Presentation Client and, optionally, authenticating access, is placed via the computing system in a Homeworld scene (e.g., a virtual space in which a user may access various virtual worlds to view presentations or participate in a collaborative manner within a presentation) with access to one or more virtual worlds and associated VR slide presentations as illustrated in FIG. 5 (presuming a user/presenter dons a head mounted display). The Presentation Client renders a Homeworld virtual reality scene wherein a rendered scene includes one or more VR world objects 500 wherein a given VR world object, for example a floating circular sphere, corresponds to an accessible virtual world/VR slide presentation(s). Optionally, the computing system displays a simple listing (e.g., a text and/or thumbnail listing) of accessible presentations, a search field, and/or other interface to access one or more VR slide presentations. Optionally, a user/participant selection (or proximity to a virtual world) of a VR world object 600 (e.g., via a PPT Wand Controller) causes the computing system to display certain identification information 610 associated with a VR world, optionally including one or more available presentations of a selected virtual world as illustrated in FIG. 6. Optionally, if there are a plurality of presentations and/or presentation Start Dates/Times associated with a selected virtual world, a textual listing of each available presentation 610 is displayed in a scene in association with the selected virtual world. Optionally, the textual listing 610 describes certain aspects of the VR slide presentation including but not limited to one or more of: a title, a presentation abstract, a meeting time, a start time, or an end time. Optionally, via a controller, such as a PPT Wand Controller, a user scrolls through a list of available presentations (e.g., by selecting a trigger on a PPT Wand Controller and dragging upward/downward the displayed list 610, as illustrated in FIG. 7, causing the system to rotate the list in the direction of motion of the user's/participant's controller) in order to access a desired presentation. Optionally, a user/participant is presented with a displayed control 700 in association with each VR slide presentation which when selected by a user causes a launch of the selected presentation and the user/presenter is placed into a presentation meeting room or a first slide of the presentation. Optionally, a user/participant, may peer into each displayed VR world object 500 (e.g., by virtually inserting one's head into a virtual world sphere) to view an active presentation, a preview of a presentation, and/or a user/system configured pre-start scene, as illustrated in FIG. 8. In an example embodiment, in addition to a session Open date/time, the scheduling interface may enable the user to configure a presentation Start date/time, a day and time at which a user is expected to be present in the virtual world to commence a presentation. Optionally, a user may configure, via the scheduling interface, a presentation End date/time, a day and time at which a user/presenter is expected to end the presentation. Optionally, a scheduling interface displays a title and/or presentation description field or other similar fields enabling a user to provide textual descriptions 610 of a VR presentation which may be displayed by the computing system (for example, as illustrated in FIG. 6) via a user interface to a user and/or participant(s). Optionally, a scheduling user interface displays an "Add Presentation" control which enables a user to schedule a presentation session at a configured open, start, and end day/time. Optionally, a user interface displays, for example, in a pane, a scheduled presentation. Optionally, a user interface displays a scrollable list of all scheduled presentations associated with a user. Optionally, a user may delete a scheduled presentation, and/or make edits to the textual annotations associated with a presentation. Optionally, the user interface provides a control enabling a user to send an invitation (e.g., via email, text messaging, etc.) to a participant. Optionally, a session invitation optionally includes a unique VR slide presentation identifier. Optionally, a session invitation includes a presentation name, description, date, start time, expected end time, and/or names/identifiers of other participants. The session invitation may optionally include a link to the presentation.

In an example embodiment, presentation participants and/or observers may access a presentation meeting room/Virtual World directly, for example, by selecting a link in an invitation (e.g., an email, text message, etc. invitation) and/or by accessing a network-based server connected to or hosting a scheduled VR slide presentation. Optionally, if a participant attempts to access a VR slide presentation prior to an open/start date for a scheduled presentation an error/alert message is displayed, notifying a participant of the VR slide presentation's session open day/time and/or presentation's session start day/time. Optionally, in response to an invitation link selection, the computing system may provide a participant with a Homeworld or general meeting room experience similar to that illustrated in FIG. 5.

Client Controls

The system provides the user with a collection of User Interface controls (UI controls) to enable a rich, collaborative, VR slide presentation. These UI controls may, for example, enable a presenter, for example, to change slides, introduce objects, guide a user through a static slide presentation, etc. Optionally, a Presentation Client UI controls are available via a non-VR terminal (e.g., via desktop, laptop, tablet, or phone monitor configuration) and/or via a Head Mounted Display configuration.

Optionally, some or all of the following tools and transport features are available to a user during a presentation session. Optionally, a user/presenter invokes a client application, for example, "Presentation Client". In response to invoking the Presentation Client, the software application prompts the user to select between presenter or participant. Optionally, the Presentation Client application further prompts the user to enter a presentation identifier. Optionally, the Presentation Client prompts the user for a password. Subsequent to optional authentications, the system presents an instance of a Presentation Client instance as viewed through a HMD, an example of which is illustrated in FIG. 9.

In an example embodiment, a user is granted access to some or all of the following UI controls from a non-VR terminal (e.g., a desktop computer) while the Presentation Client is running (e.g., on the non-VR terminal). Optionally, similar controls may be accessed via a hand held controller (e.g., a PPT Wand Controller). Optionally, activation of a bring up menu Presentation Client User Interface (PCUI) control, for example a desktop Q selection, causes a display of a menu of controls, including a limited display of menu controls, wherein the limited menu of items reduces the screen clutter presented to a client user. Optionally, activation of a hide menu PCUI control, for example a desktop E, causes a display of a menu of controls to be hidden. Optionally, a cycle through menu items to the left PCUI control, for example a desktop A, causes a hidden menu control item to be displayed on the left of the menu of items and a displayed menu control item on the right to be hidden. Optionally, a cycle through menu items to the right PCUI control, for example a desktop D, causes a hidden menu control item to be displayed on the right of the menu of items and a displayed menu control item on the left to be hidden. Optionally, a Choose PCUI control, for example a desktop Spacebar, causes a highlighted menu control item to be selected. Optionally, a Go Back PCUI control, for example a desktop Ctrl, causes a highlighted menu control item to be selected. Optionally, a Move PCUI control, for example desktop Arrow Keys/WASD Keys, causes a delta change of position of a user in a scene forward, backwards, left, and right with the arrow/WASD keys, Up/W, Down/S, Left/A, and Right/D, respectively. Optionally, an Up/Down PCUI control, for example a desktop Z and X Keys, causes a delta change of position in a scene either up or down with the Z keys moving Up and the X key moving down. Optionally, a scroll control, for example a middle mouse device scroll, causes a displayed Wand in a scene to move either forward (e.g., scroll mouse forward away from user) or back (e.g., scroll mouse backward toward the user) in the Z-axis. Optionally, a menu item is distinguished from other menu items by the system when a cursor/indicator or its equivalent control is positioned on a menu item, for example by highlighting, enlargement, and both enlargement and highlighting, etc. Optionally, a cursor/indicator PCUI control is re-positioned in a display via a desktop re-position PCUI Control where a reposition corresponds to a keyboard selection. In an example embodiment, a delta reposition cursor upward corresponds to a number pad key 8, a delta reposition cursor right corresponds to a number pad key 6, a delta reposition cursor left corresponds to a number pad key 4, and, a delta reposition cursor downward corresponds to a number pad key 2. Optionally, a Select PCUI control, for example a desktop number key pad 5 or a mouse device Left Click, causes a selection of a menu item for which a cursor has been positioned. Optionally, a Start PCUI control, for example a desktop number key pad 0, causes the start of a VR slide presentation. Optionally, a Toggle Fullscreen PCUI control, for example a desktop F2 Ctrl, causes a toggle to a full screen display of the client if the client is in a minimal format screen display and vice versa.

Optionally, a user/presenter is provided access to some or all of the following additional UI controls while the client is running. Optionally, in response to a control selection by a user (e.g., a PPT Wand Controller trigger), the system displays a menu of tools and transport features 1000 in three-dimensional space available to a user during an active presentation, see example illustrated in FIG. 10. Optionally, the displayed menu is only visible to the user and not the participants. Optionally, a given menu control item is represented by a three-dimensional object, such as a cube. Optionally, the display includes a pane 1010 with text and/or graphics within the pane describing a currently selected tool or transport feature. Optionally, an active tool is highlighted in the menu, for example by color, enlargement, protrusion from a line of similar controls, animation, etc., (see for example FIG. 10, in which the selected Pencil tool 1070 protrudes outward from the other displayed tools). Optionally, the menu of tools includes one or more scroll controls (e.g., a scroll to the left 1025 and a scroll to the right 1020) which when virtually touched (e.g., by positioning a PPT Wand Controller onto or within a close proximity to the control) and/or selected by a user cause the displayed listing of tools to scroll (e.g., rotate in three dimensional space) to the right or left wherein the displayed tool icon/objects at the front of the display rotate to the back of the display. FIG. 1000 illustrates an example display of menu items prior to a right scroll selection and FIG. 11 illustrates an example of a menu of control items position after a scroll action to the right. Optionally, a Slide Clicker UI control 1080, see FIG. 10, enables a user to preview and/or change a current slide during an active VR slide presentation. Optionally, a Slide Clicker UI control 1080 enables a user to change slides to a next or previous slide in an active VR slide presentation. Optionally, a Slide Clicker UI control 1080 enables a user to preview slides (e.g., display a thumbnail version, listing of titles, etc.) of an active VR slide presentation. Optionally, a Slide Clicker UI control 1080 enables a user to select a certain slide from a list of slides (e.g., while in preview mode). Optionally, a Laser Point UI control 1050, see FIG. 10, enables a user to activate and control a virtual laser pointer within a scene/slide during an active presentation. Optionally, a laser pointer may be directed at certain items/objects within a slide to highlight items/objects to participant(s). Optionally, a laser pointer is a colored (e.g., red) thin line directed from a user's controller (e.g., from a PPT Wand Controller held by a user) to an item/object in a slide/scene.

Optionally, a Measuring Tape UI control 1090, see FIG. 10, enables a user to determine a distance between any two points, including between two objects within a slide. Optionally, a user activates a control, for example a trigger once, to choose a starting measuring point in a slide/scene and activates a trigger again to select an end point. Optionally, the computing system calculates a distance between the two trigger points, displays a visible line between the two trigger points, and displays a calculated distance in units contextually consistent with the slide/scene, for example meters, feet, inches, centimeters, miles, kilometers, etc. Optionally, a control is provided while in a measurement mode to change the displayed distance in different units (e.g., 100 meters, 109.4 yards, etc.).

Optionally, a Prop Dropper UI control 1030, see FIG. 10, enables a user to open a menu for selecting from a list of props/items/objects/assets to drop into a currently active slide/scene. In response to a user control selection from a list of props/items/objects/assets in the open menu, the selected item is placed in the slide/scene and is visible to a user and/or participant(s).

Optionally, a Homeworld UI control 1200, see FIG. 12, enables a user to exit out of an active VR slide presentation and return to a Homeworld location/meeting place. As previously described, a Homeworld is a virtual space in which a user may access various virtual worlds to view presentations or participate in a collaborative manner within a presentation.

Optionally, a Grabber UI control 1060, see FIG. 10, enables a user to grab certain objects in a scene/slide. Optionally, a grabbed object/item may be moved and/or manipulated by a user within a scene/slide. Optionally, a TV remote UI control 1040, see FIG. 10, enables a user to manage a set of image presentations on a virtual screen within a scene/slide (this control is not to be confused with nor does it control a VR slide presentation in which the user and participants are interacting within).

Optionally, once a Presentation Remote Control tool is selected by a user, certain controls (e.g., a control on a PPT Wand Controller) advance to slide presentation to the next or previous slide on a displayed virtual screen prop. Optionally, a conventional 2-Dimensional presentation, for example Microsoft PowerPoint is associated with a VR slide presentation, the contents of which are displayed on the virtual screen.

Optionally, a Pencil UI control 1070, see FIG. 10, enables a user to draw, for example in a space in a scene of the slide, using a tracked controller (e.g., a PPT Wand Controller) within their virtual world/environment. Optionally, drawings are visible to a user and participants. Optionally, a Pencil UI tool 1070 is selected from a menu display of tools or via a short cut such as a desktop left mouse button control. Optionally, a control, for example a PPT Wand Controller, activates a displayable drawing tool. Optionally, a control, for example a PPT Wand Controller Down control selection clears all displayed drawing. Optionally, a control, for example a PPT Wand Controller Left control selection, causes a change of drawing color. Optionally, a drawing color change applies to all displayed drawings and subsequent drawings. Optionally, a drawing color change is only applied to drawing subsequent to a control selection. Optionally, a control, for example a PPT Wand Controller Right control selection causes a drawing style change. Different drawing styles include but are not limited to drawing line width, dashed, solid, etc.

Transport Controls

Optionally, while using a Presentation client, a user may be provided access to certain virtual reality transport controls. These controls enable a user and associated participants to be virtually transported within a scene of a slide under the control of a user. Optionally, a Magic Carpet control 1100, see FIG. 11, enables a user and participant(s) to traverse (e.g., as if floating on a magic carpet) within a virtual environment scene of a slide. Optionally, subsequent to an activation of a Magic Carpet control, a user is provided by the system with various flight controls including but not limited to some or all of the following: up, down, left, right, forward, fast forward (e.g., immediate fast forward or gradual acceleration forward depending upon a length a control is held in a trigger position), backward, fast backwards (e.g., immediate fast backwards or gradual backwards acceleration depending upon a length a control is held in a trigger position), etc. Optionally, a Jump To control 1110, see FIG. 11, enables a user and collaborators to jump through a set of predefined locations within a virtual environment slide/scene. Optionally, a displayed control or controller device (e.g., a PPT Wand Controller) enables a user to display a listing of Jump To locations. Optionally, a displayed control or controller device (e.g., a PPT Wand Controller) enables a user to select a displayed Jump To location which causes a user and participants to be immediately transported to a selected Jump To virtual reality location in a scene of the slide or a scene of another slide.

General Controls

Optionally, while using a Presenter Client, a user and/or participant are provided by the system with access to certain general controls. Optionally, an audio control 1210, see FIG. 12, enables a user/participant to make certain adjustments to the session audio volume. Optionally, a Raise Volume control 1220 enables a user and/or participant to raise his/her audio conference volume during a session, see FIG. 12. Optionally, a separate Lower Volume control 1230 is provided which enables a user and/or participant to lower his/her audio conference volume during a session. Optionally, a Mute Audio toggle control 1240, see FIG. 12 enables a user and/or participant to mute or un-mute his/her microphone during a session.

Session Tracking

Presentations given in a Virtual Reality context have certain advantages over conventional video and teleconferencing as previously described. An advantage is an ability of the computing system to track and record all or certain movements of a user and/or participant(s) during an entire session or a given slide. Optionally, captured tracking data may be data analyzed and mined subsequent to a presentation to determine, for example, a user's interaction (or failure to interact) with virtual reality objects/slides or a user's movements in a virtual reality space, such as if a presenter failed to point out a specific object, is too expressive during a presentation with his/her movements, is not paying attention to a certain participant, etc. Optionally, any specified body part may be tracked including a limb(s), head, body, etc. (presuming the body part has associated tracking elements, for example infrared emitting LEDs.).

FIG. 13 illustrates an example point cloud trace 1300 of a presenter's right hand during a presentation session. Optionally, a noise filter may be applied to captured trace data to smooth out tracking data in order to provide generalized movement or actions of a user and/or participant and/or user's/participant's body parts (e.g., limbs). Optionally, a noise filter is dynamically adjustable enabling a user and/or operator to view in substantially real-time the effects of filter changes. Optionally, a point cloud trace of a presentation session is displayed in association with other body part movements or other body part positions. For example, a point cloud trace of a user's hand movement may be displayed when it is detected by the system that a user's gaze is directed at a specific point or object. In another example, a point cloud trace of a user's hand movement may be displayed when it is detected by the system that a participant's gaze is directed at a specific point or object. Optionally, detected user/participant movements and/or actions (e.g., detected using accelerometers, gyroscopes, optical tracking devices, pressure sensors, tilt sensors, haptic gloves, etc.) are compared against a knowledge base which may enable the computing system to infer certain characteristics/attributes of the participant's emotional state or state-of-mind. For example, in a training use case, detected up and down nods during a presentation may infer the session participant is in agreement with points being made by the presenter. Detected side-to-side movements may indicate a session participant is in disagreement with certain aspects of the presentation. Optionally, tracking is only recorded during certain visual and/or audio events and/or conditions (e.g., in response to a state change in a simulation, an introduction of an element into a simulation, in response to a participant's head position change of state, in response to a slide change, a pre-configured trigger condition, a trigger condition invoked by a presenter and/or participant, etc.)

Optionally, trace data is recorded, stored, and data mined/analyzed in real time or subsequent to the presentation session. Optionally, participants are interviewed subsequent to the presentation session to determine state-of-mind, reactions, attitudes, physiological, and other psychological criteria to create a knowledge base of certain movements and/or actions in different contextual virtual reality presentation and VR slides. Optionally, user/participant actions and/or user/participant action attributes (e.g., participant yes/no head nods and/or count of yes/no head nods, period of time user/participant's head is directed to an object of the presentation/scene, period of time a participant's head is direct towards the presenter and vice versa, participant head leanings forward or back, rapid head actions (e.g., in response to a VR slide), etc.) may be integrated into a data store to create a knowledge base of user/participant actions corresponding to certain user/participant reactions or likely emotional state. This knowledge base may be used to make certain direct inferences from tracking data or indirect inferences when tracking data is combined with other aspects of a presentation (e.g., a likelihood of a product or service sale, expected social media feedback, etc.)

Optionally, a created knowledge base from virtual reality tracking and/or general research related to tracking may be used to score a session wherein the score is associated with the likelihood the session participant may take a certain action (e.g., purchase a good or service). Optionally, the score/grading enables a user to refine and improve certain presentation skills of a user by providing feedback to the user. Optionally, the computing system records/logs related information associated with or at a time of a participant's actions. In association with a detected participant's action, the system may record some or all of the following information: the time and date, a continuous voice snippet/phrase spoken prior to or during the movement by the participant or other user/participant in the presentation, other sensory detected attributes associated with a participant (e.g., heart rate, body temperature, perspiration, etc.). Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Collaborative Editing

The desktop authoring tool enables two or more authors to create and/or edit Virtual Reality slides of the same presentation at the same time including but not limited to editing certain elements on different or even the same slide. In an example embodiment, a first user shares a file comprising a VR presentation. Optionally, a VR presentation is stored in a file sharing system (including, for example, a conventional cloud computing environment) which enables public and/or private author/collaborators access to the VR presentation at the same time. Optionally, to access a collaborative editing session co-editors provide certain identification credentials and the file sharing system authenticates co-editor access. In an example embodiment, the Collaborative Editing feature provides a signal to other co-editors when a portion of the slide is being edited. For example, if an image in a slide or embedded control is being modified, the image/control may be highlighted, flashing, or some other means provided to distinguish the slide element from other elements not being edited/modified. Optionally, any slide edits and/or changes will appear substantially, immediately to all co-editors/collaborators. Optionally, a collaborative user may suggest changes to a one or more slides which may be tracked. Optionally, a VR collaborative editing tool notifies (e.g., via an email, text, etc.) a user, if a user is not actively editing a slide, of one or more changes to a portion of a slide and/or presentation s/he authored. Optionally, an original author or subsequent author has the option to disregard or accept suggested slide edit. Optionally, an editor may enter a comment with regard to a portion of a slide. Optionally, other conventional document collaborative editing features known to those skilled in the art of conventional slide presentations collaboration may be applicable to VR slide collaborative editing.

Example Process

FIG. 19 through FIG. 29 illustrate an example process flow of an example virtual reality system capable of supporting a collaborative environment including a user/presenter and participant, referred to herein with respect to this example process as a system or a computing system comprising multiple network-based servers 200, 210, 220, an example of which is illustrated in FIGS. 1-3. Process states are listed on the left and elements of the operating environment of FIGS. 19-29 are listed across the top. In this example, a meeting host/presenter 150 is creating and then giving a virtual reality presentation to a geographically remote technician/participant using the VR slide presentation features described herein. The terms meeting host, host, presenter, and user as used herein are intended to be used interchangeably and generally refer to an individual or group responsible for creating and/or presenting a presentation to one or more participants. The terms participant and technician (with respect to this example process workflow) as used herein are also intended to be used interchangeably and generally refer to an individual or group receiving the presentation. The terms meeting host, host, presenter, user, technician (with respect to this example process workflow), participant, refer to collaborators, for example collaborators in a virtual reality simulation. Optionally, tracking camera images and/or marker positional data is transmitted to a master computing device, a general purpose computing server(s) (e.g., server 200 and/or 230) and/or client computing device(s) (e.g., servers 210 and/or 220) as described in U.S. patent application Ser. No. 14/971,720, filed on Dec. 16, 2015, the contents of which are incorporated herein by reference in their entirety. Optionally, the configured system determines (e.g., based on configuration settings, default settings, determined privileged or non-privileged operations, etc.) which computing device enables a view/orientation of a scene (or change to a view) of a simulation to be rendered in a head mounted display of a user and/or participant. With respect to the example embodiment describe below, any computing device of FIG. 1 (e.g., general purpose server 230, master server 200, client computing device 210 or 220) may receive the various cameras outputs 100, 105 and perform image rendering in head mounted displays of a user or a participant as a privileged (e.g., local) or non-privileged operation. For example, in the process flow described below client computing device 210 may be configured as master server 200. For simplicity, and because the user 150 and technician 160 in this example embodiment are remote from each other, the master server 200 receives the various camera outputs 100, 105 (via servers 210, 220, respectively, and which certain processing may occur locally by servers 210, 220 before streaming certain motion/action position data to master server 200) and provides view rendering/positioning instructions to each client computing device 210, 220 of the other simulation participants. Therefore, for example, the technician's 160 movement within a room are captured by local cameras 105, processed by the client computing device 220, and rendered in the technician's 160 HMD 175 for high-frequency response. The cluster system, and in particular the master server software 200, further provides certain instructions to the client computing device 220 to enable the display of the user 150 actions/movements (or any other participant's action/movements) within the rendered scene as further defined below in cluster system operation. As this example is intended to illustrate certain aspects of a VR slide presentation with enhanced tracking not each and every step, state, or instruction in a conventional simulation initialization and/or simulation session is described. For example, motion camera tracking output and/or position tracking data of detected markers is optionally continually streaming to servers 210 and 220 during the course of the simulation. Generally, all of the operations described in this example are performed substantially immediately and/or in real-time such the user experience simulates a real-life experience. As a reminder to the reader, some of the steps below explicitly note that an operation(s) is performed substantially immediate and/or real-time.

In the following states of this example, a presenter first develops their VR slide presentation.

Figure 19:
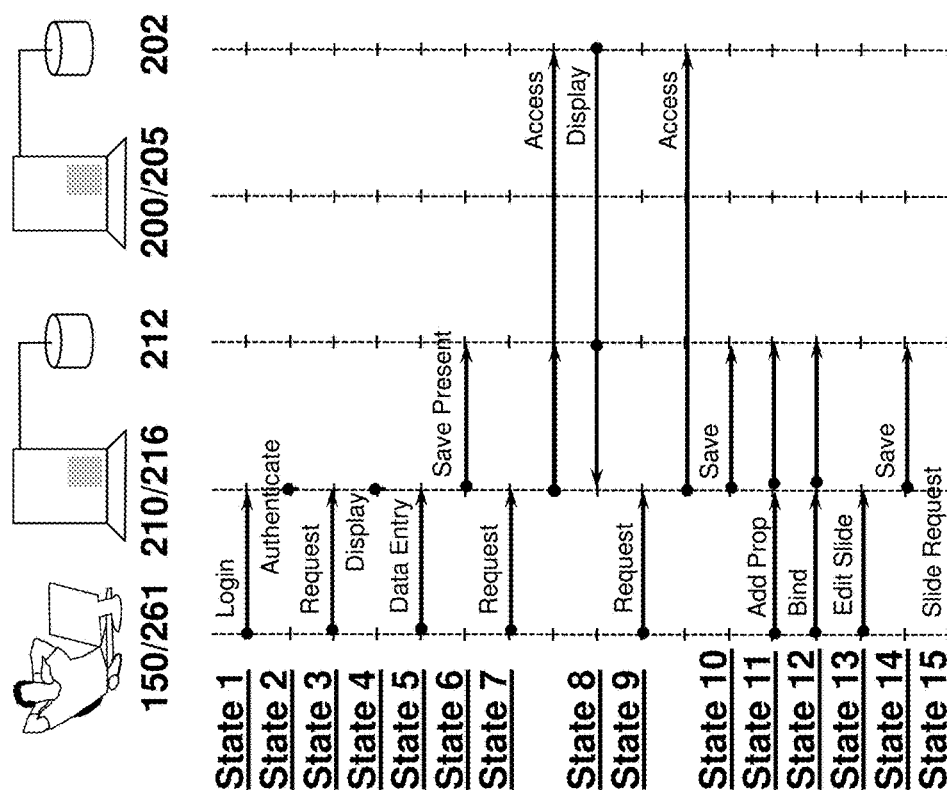
FIG. 19 illustrates a process of an example embodiment of a multi-user virtual reality example embodiment.

State 1 of FIG. 19. The user 150 logs into a Presentation Designer account by entering a username and password into a client computing device/server 210.

State 2. The client computing device/server 210 (which is also connected over a network 250 to other computing devices including, for example, computing device 200, 220) receives the login request and authenticates the entered credentials. In this example the login is valid and the user interface of the Presentation Designer client 216 is displayed on a desktop monitor 261 connected to the server 210 of the system.

State 3. The user 150 creates a new presentation by selecting a "Presentation . . . " control under a "File" menu and then selecting a "New Presentation" control in the Designer client 216.

State 4. The server 210 responds to a create presentation request by displaying a "New Presentation" pane and one or more empty fields on desktop monitor 261, and automatically generating a unique identifier associated with the new presentation.

State 5. The user/author 150 enters in a name/title field a title for the presentation and further types in a brief description of the presentation in a presentation field. The user 150 also selects a "share with organization" check box signifying the presentation is to be made available to other members within the organization (including for example a technician 160 at a remote site). The user 150 saves the entered changes by selecting a user interface control.

State 6. The server 210 receives the edits and save request and saves the presentation name and description changes in a data store 212 and causes the presentation to be accessible via network 250 to other members of the organization with proper access credentials.

State 7. The user 150 chooses to upload a certain scene from a palette of scenes available in a cloud computing network. The user 150 selects an "Upload Scene" menu item in the Designer client 216.

State 8. The server 210 receives the upload scene menu request and displays a palette of scenes stored locally or previously stored in a cloud computing network of servers (e.g., 200 or other external network-based server and associated data storage 202) associated with the system.

State 9. The user 150 selects a scene depicting a lunar landscape with a space craft module.

State 10. The server 210 receives the upload selection request for the lunar scene and proceeds to upload the lunar scene from a cloud computing network of servers 200 and associated data store to a server 210 local to the user 150 and stores the scene in computer memory 212. The lunar landscape scene is displayed on the user's 150 monitor 261.

State 11. The user 150 intends to initially overview certain aspects of the scene before a maintenance task is illustrated to a technician 160. This portion of the presentation is a static power point presentation. The user 150 adds a Slide Presentation Screen prop to the scene by selecting an "Asset" pane 400 and dragging a Slide Presentation Screen prop from the Asset pane 400 and placing the Screen prop in a desired location in the scene. The server 210 receives the request and adds a slide presentation prop 1400 to the scene and saves the change to the data store 212.

State 12. The user 150 associates (e.g., via a control) a conventional Microsoft PowerPoint® presentation on the server 210 with the VR slide presentation. The server 210 binds the presentation to the VR slide presentation and saves the change to the data store 212.

State 13. The user 150 configures the first slide to activate a Presentation Remote Control when the slide starts (e.g., wherein the slide start is a trigger condition.) Alternatively to a trigger on slide start, the user 150 simply accesses a Presentation Remote Control tool during the VR slide presentation. The user proceeds to edit the first slide of the VR slide presentation.

State 14. The server 210 receives the edits to the first slide of the VR slide presentation. The server 210 stores the configured trigger, the Slide Presentation Screen prop and associated Microsoft PowerPoint presentation to the scene in computer memory 212.

State 15. The user 150 next configures a second slide in the VR presentation relating to a specific maintenance action with a workstation computer. The user 150 selects a "Slide" control in the Designer client 216.

Figure 20:
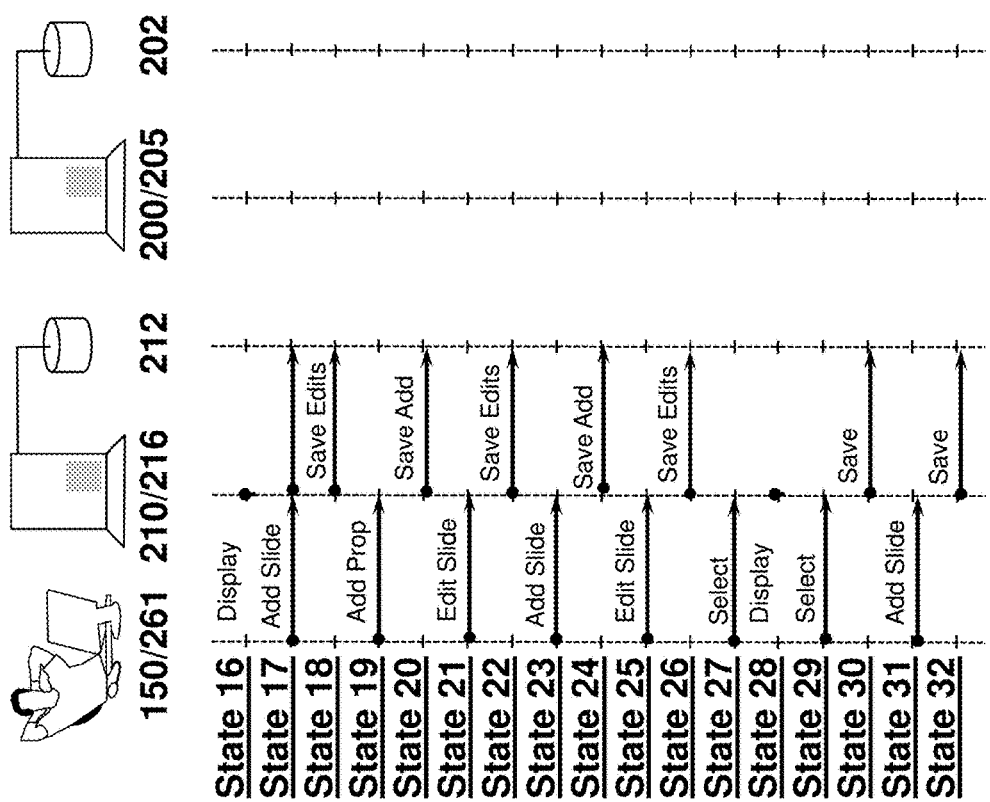
FIG. 20 illustrates a continued process of an example embodiment of a multi-user virtual reality example embodiment.

State 16 of FIG. 20. The server 210 receives the request and displays, in the Designer client 216 user interface, a pane containing thumbnail versions of the currently configured VR presentation slides which at this point in the presentation creation is a single slide, slide 1.

State 17. The user 150 adds a second slide by selecting a right click mouse control (or other appropriate control) and chooses a "Duplicate Slide" control in the Designer client 216.

State 18. The server 210 receives the duplicate slide request, adds a second slide as a duplicate of the first slide, displays the second slide as a thumbnail slide next to the first slide in the Designer client 216, and saves the new second slide in computer memory 212.

State 19. The user 150 adds a cutaway Workstation computer prop to the second slide by selecting a Workstation prop from the Asset pane 400 of the Designer client 216 and drags the workstation object from the Asset pane 400 to a location in the scene.

State 20. The server 210 receives the requested Workstation prop addition and saves the new prop in the second slide in computer memory 212.

State 21. To enable a participant to grab the scene Workstation computer, the user 150 adds, via the Designer client 216, an action by selecting a Workstation computer object in the scene, then selecting a "Triggers" dropdown option in a "Component Functions" section of a "Properties" pane. The user 150 selects a "User Control Activation" option under a list of Trigger options. The user 150 selects an Add Action control which display a list of actions which may be configured with the Workstation computer object. The user 150 selects a "Set Grabbable" action. The user 150 configures a property of the Workstation object, via a menu control of the Designer client 216, which causes the Workstation to float back to the table if a grabbed Workstation has been released by a user 150 and/or participant 160.

State 22. The server 210 receives the action edits to the second slide of the VR slide presentation and stores the changes in computer memory 212.

State 23. The user 150 adds a third slide by selecting the right click mouse control (or other appropriate control) and choosing the "Duplicate Slide" control in the Designer client 216.

State 24. The server 210 receives the duplicate slide request, adds a third slide as a duplicate of the second slide, and displays the third slide as a thumbnail slide next to the first and second slide in the Designer client 216 and saves the new third slide in computer memory 212.

State 25. The user 150 removes certain objects from the scene of the third slide via the Designer client 216 user interface. The user 150 removes the Workstation prop from the scene by either right clicking on the Workstation object in the scene or by selecting the Workstation object from a "Component Graph" pane 410 (using for example a right click control) and selecting the delete menu control. Optionally, certain elements of the scene are grouped or locked in a scene and must be unlocked before they may be removed or an action is applied. The user 150 removes a table from the scene by first causing the table component to be unlocked from the scene, for example, by right clicking on the table, selecting an "Unlock Scene Asset" control, and then selecting a "Make Component" option. The user 150 then chooses the table in the Component Graph pane 410 followed by the delete control.

State 26. The server 210 receives the requested actions to remove the Workstation and desk props, removes the props from the scene, and saves the changes to computer memory 212.

State 27. The user 150 realizes they will likely be dangerously close to the lunar module in the event it lifts off from the surface of the moon. So the user 150 decides to configure a transport tool action into the third slide. The user 150 places a mouse device cursor on a distant hill in the lunar landscape and selects the right click control (or other appropriate control).

State 28. The server 210 receives the requested action and displays a menu of controls in the monitor 261.

State 29. The user 150 selects a Jump To menu control.

State 30. The server 210 receives the requested action and configures the transport Jump To location in the scene and saves the changes to computer memory 212.

State 31. The user 150 next configures a fourth slide in the VR slide presentation. The fourth and last slide includes certain animations. The user 150 adds the fourth slide by selecting a right click mouse control (or other appropriate control) and choosing a Duplicate Slide control from the Designer client 216 user interface.

State 32. The server 210 receives the requested action and creates a fourth slide (e.g., a duplicate of slide 3), displays the fourth slide as a thumbnail slide next to the first, second, and third slide, and saves the new slide in computer memory 212.

Figure 21:
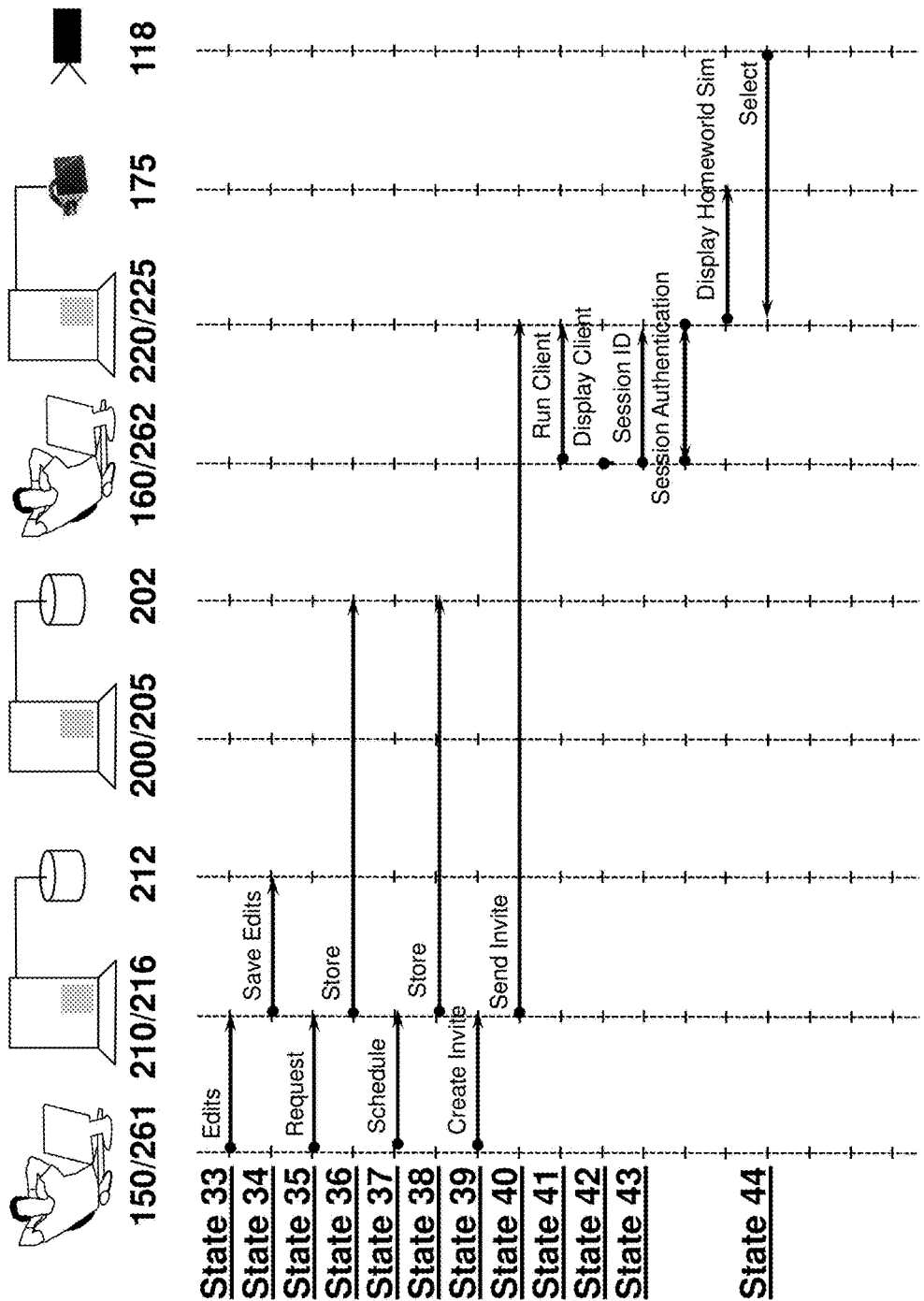
FIG. 21 illustrates a continued process of an example embodiment of a multi-user virtual reality example embodiment.

State 33 of FIG. 21. The user 150 would like to add an action to the scene in the fourth slide which is triggered in association with the slide start. In this example environment, the animation is a launch of the lunar module in the scene. The user 150 first selects the lunar module object in the scene, and selects the "Triggers" dropdown option in the "Component Functions" section of the "Properties" pane of the Designer client 216 user interface. The user 150 then selects the "When the slide starts" option under a list of Trigger options. The user 150 selects an Add Action control, and in response a list of actions is displayed which may be configured in association with the lunar module object. The user 150 selects a "Run Animation" action. In this example, the uploaded scene includes an animation script associated with the lunar module in the scene or a separate action is performed to upload the animation script.

State 34. The server 210 receives the requested configuration actions and associates the animation action with the slide and saves the configuration changes in computer memory 212.

State 35. The user 150 uploads the presentation to a network-based server 200 used to store finished presentations accessible by presenters and local/remote participant (s). (In this example, there is a default final slide 5 "The End" which is included in the presentation.)

State 36. The server 200 receives the upload request from the server 210 and saves a copy of the finished presentation in computer memory 202 of the server 200.

State 37. The user 150 next schedules the presentation via the Designer client 216 user interface by selecting a menu control "File" and control "Schedule Presentation . . . " The user 150 enters a Session Open Date and Time, Presentation Start Date and Time, and expected Presentation End Date and Time in a set of fields. The user 150 then selects an Add Session control.

State 38. The server 210 receives the schedule request, and schedules the new presentation and stores the scheduled presentation in computer memory 212 via server 200. The server 210 also updates the schedule in the server 200 and associated data store 202.

State 39. The user 150 selects a "Create Invitation" control, enters an address (e.g., via email, text message, etc. address) of a remote technician 160, and selects a "Send" control via the Designer client 216 user interface.

State 40. The server 210 receives the create invitation request and sends an invitation (e.g., via email, text messaging, etc.) to the one or more addresses entered by the user 150 including, for example technician 160 (via server 220). The invitation includes a session identifier which a client needs when logging in to view the presentation.

In this example, the technician/participant 160 is geographically remote from the user 150. A room local to the technician 160 is configured as a remote VR studio as illustrated in FIGS. 1 and 3. Optionally, the first virtual reality studio is configured as a geographically remote collaborative node (e.g., client) in a client/server configuration as described for example in U.S. patent application Ser. No. 14/971,720, filed on Dec. 16, 2015, the contents of which are incorporated herein by reference in their entirety (and also paragraph proceeding State 49, which provides additional detail on the master server 200 and client server 210 binding). The VR studio of the technician is equipped with a connected Head Mounted Display 175 (e.g., OCULUS RIFT, HTC VIVE, etc.) with an attached set of PPT Eyes for precision tracking. The first VR studio also includes a PPT Wand Controller 118. At this point or in a separate state, for example one of the previous states, the tracking cameras 105 are initialized and calibrated (e.g., with respect to any marker tracking devices used in the simulation including, for example, the PPT Eyes affixed to the head mounted display 175 used for tracking head and body movements and/or a PPT Wand Controller 118 used for sending control actions during the VR slide presentation.)

State 41. A technician/participant 160 receives the sent invitation regarding the new presentation. Subsequent to the Session Open Date and Time and before the Presentation Start Date and Time, the technician/participant runs a "Presentation Client" application 225 from a network-based server 220 in the remote VR studio (or selects a link in the invitation which causes the activation of the Presentation Client 225).

State 42. The VR presentation client 225, on startup, displays a control prompting the technician 160 to login as a presenter or participant/collaborator and to enter a presentation session identifier.

State 43. The technician 160 selects the participant option and enters the session identifier sent in the invitation of State 41.

State 44. The server 220 receives the login request and verifies the entered session identifier matches a known session, for example, by accessing over a network 250 a computing device storing presentations/sessions (e.g., a cloud computing server). The server 210 requests Homeworld access to server 200. The server 220 displays a Homeworld on the technician head mounted display device 175 in which a plurality of virtual worlds accessible by the technician 160 are displayed (e.g., pending or otherwise active presentations). Optionally, the technician 160 is placed directly into (or linked/synced with) a virtual world associated with the session identifier entered by the user. The technician 160 dons a head mounted display 175 and grabs a PPT Wand Controller 118. The technician 160 selects via a trigger, using the PPT Wand Controller 118, a displayed spherical virtual world (e.g., as illustrated in FIG. 6.) The server 220 detects/receives the trigger action. The movement of the head mounted display (HMD) 175 and Wand Controller 118 are recorded and tracked by the room tracking cameras 105 and/or using other tracking mechanisms, such as those described herein.

Figure 22:
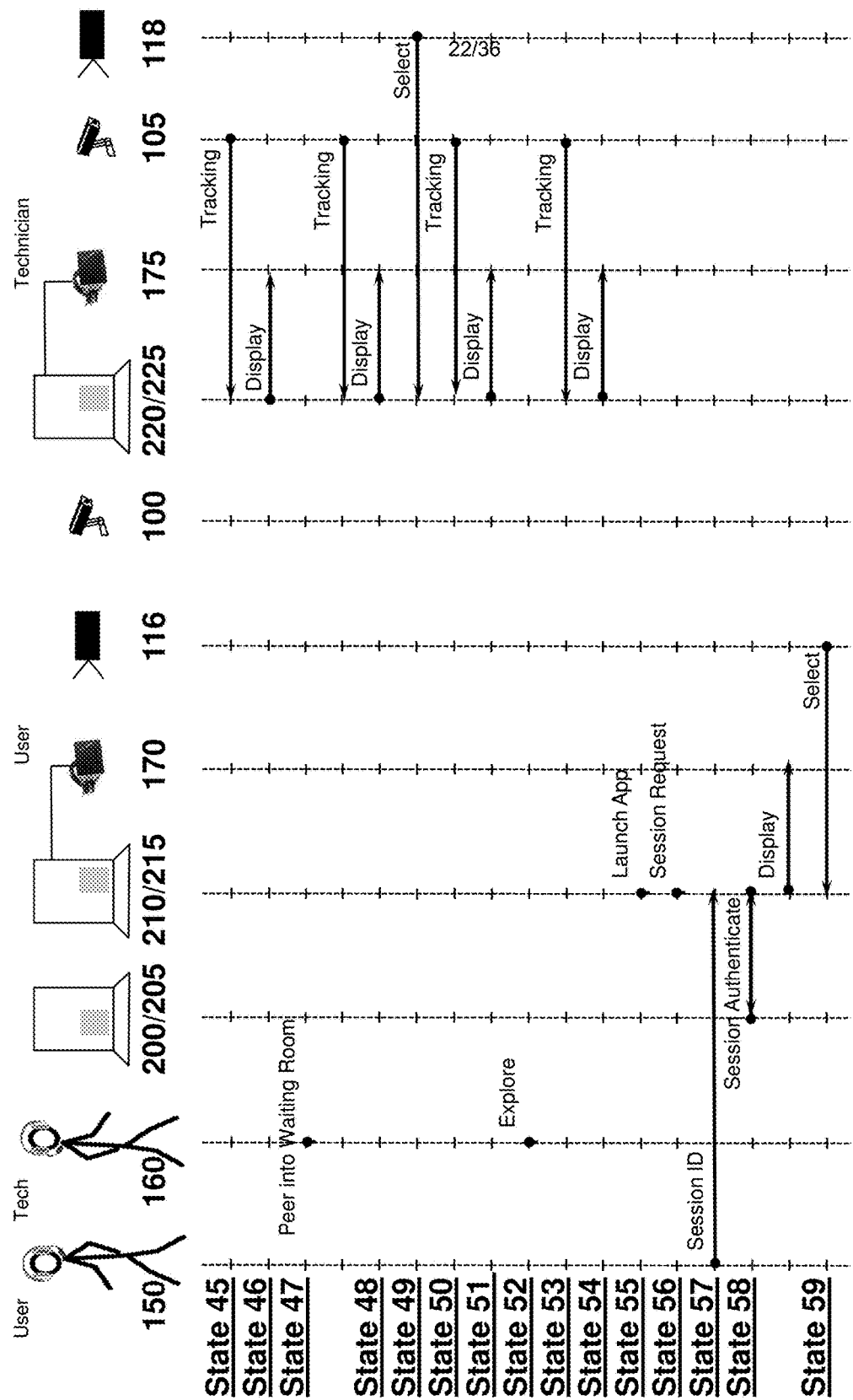
FIG. 22 illustrates a continued process of an example embodiment of a multi-user virtual reality example embodiment.

State 45 of FIG. 22. The server 210 determines, given the tracked head position of the technician 160 and Wand 118 placement from the tracking cameras 105 output, that the technician 160 has selected a certain virtual world from a plurality of displayed virtual worlds.

State 46. In response to the selection, the server 220 displays a textual description of the selected virtual world and its associated presentation 610 in the technician's 160 HMD 175. Optionally, the displayed textual description includes some or a portion of the text as previously entered by the user/presenter 150 in State 5.

State 47. The technician 160 determines from the displayed text that the selected virtual world is associated with a training presentation s/he is planning to attend. The presentation is not scheduled to start for a few minutes. The technician 160 peers into the virtual world to see if the user 150 has arrived and might start the presentation early, as illustrated for example in FIG. 8. The technician 160 views a display of the initial scene of the presentation. (In this example embodiment, the user 150 did not configure a separate pre-start scene).

State 48. The server 220 tracks the technician's 160 movements (e.g., via cameras output 105 or using other tracking mechanisms described herein and server 220) determines the technician's 160 head is positioned to be peering into a virtual world and displays in the HMD 175 a view of the room/scene associated with the meeting room (since the presentation has not yet commenced), see FIG. 8. Optionally, a system default waiting room scene is displayed in the head mounted display 175 via client server 220 (based on instructions provide from server 200). Optionally, the system defaults to a first slide in the VR slide presentation as opposed to a waiting room scene. Optionally, the participant 160 is neither allowed to peer into or access a presentation until the configured session Open time/day has occurred.

State 49. In this state, the current time is after the session open time but before the session presentation start time. The technician 160 decides to access the presentation and selects, for example using the Wand controller 118, an access selected presentation control 700. The Wand control selection is detected/received by server 220.

State 50. The server 220 receives the tracking camera output 105 and determines (e.g., from the determined position of the technician's head and Wand controller 118) that the technician 160 is selecting the open/access presentation control 700.

State 51. The server 220 displays a scene in HMD 175 associated with the first slide of the VR slide presentation as illustrated in FIG. 14.

State 52. The technician 160 walks around the lunar landscape scene to familiarize his/herself with the scene.

State 53. The server 220 receives the tracking cameras 105 output.

State 54. The server 220 displays a perspectively correct view of the lunar landscape in the HMD 175 for the technician's 160 inspection as the technician is walking.

It is getting close to the presentation start time. The user 150 logs into a network-based server 210 in a second VR studio (local studio). A room local to the user 150 is configured as a local VR studio as illustrated in FIG. 3. Optionally, the master server 200 in the local VR studio includes a master server program 205 which generates and provides for display a user interface on a console/monitor that identifies networked computing devices including the computing devices of the first VR studio (remote). The master server program 205 creates an instance of a client and binds a remote client with the master server program (e.g., creates a client-server association/linkage enabling the master server 200 to send master initiated requests and data over a communication channel and receive client 210, 220 responses, client 210, 220 initiated requests, and data or other computer programming methods of software program/module association as known to those skilled in the art of data communications and/or software development) as further described for example in U.S. patent application Ser. No. 14/971,720, filed on Dec. 16, 2015, the contents of which are incorporated herein by reference in their entirety. The second VR studio is equipped with a connected Head Mounted Display 170 (e.g., Oculus Rift) with an attached set of PPT Eyes for precision tracking. The second VR studio also includes a PPT Wand Controller 116. Optionally, the master server program 205 initializes the virtual presentation session and downloads, over a network to each client computing device's data store executable code and resources to be used in the simulation (e.g. by a control initiated by an operator prior to this state). At this point or in a separate state, for example one of the previous states, the tracking cameras 100 are initialized and calibrated (e.g., with respect to any marker tracking devices used in the simulation including, for example, the PPT Eyes affixed to the head mounted display 170 used for tracking head and body movements and/or a PPT Wand Controller 116 used for sending control actions during the VR slide presentation).

State 55. Subsequent to the Session Open Date and Time and before the Presentation Start Date and Time, the user 150 runs the "Presentation Client" application 215 from a network-based server 210 in the second VR studio. Optionally, the Designer Client application 216 and Presentation Client 215 are the same software application.

State 56. The Presentation Client 215, on startup, displays a control prompting the user 150 to login as a presenter or participant and to enter a session identifier.

State 57. The user 150 selects the presenter option and enters the session identifier automatically generated in State 5.

State 58. The server 210 receives the login request and verifies the entered session identifier matches a known session. The server 210 requests Homeworld access to server 200.

State 59. The server 210 displays a Homeworld corresponding to the sessions/presentations accessible to the user 150. Optionally, as similarly discussed with respect to State 44, the user 150 is placed directly into a virtual world corresponding to the session and user id of the user 150. The user 150 dons a head mounted display 170 and grabs a PPT Wand Controller 116. The user 150 selects, using the PPT Wand Controller 116, a displayed spherical virtual world (e.g., as illustrated in FIG. 6). The movement of the presenter's 150 head and Wand Controller 116 are recorded and tracked by the tracking room cameras 100.

Figure 23:
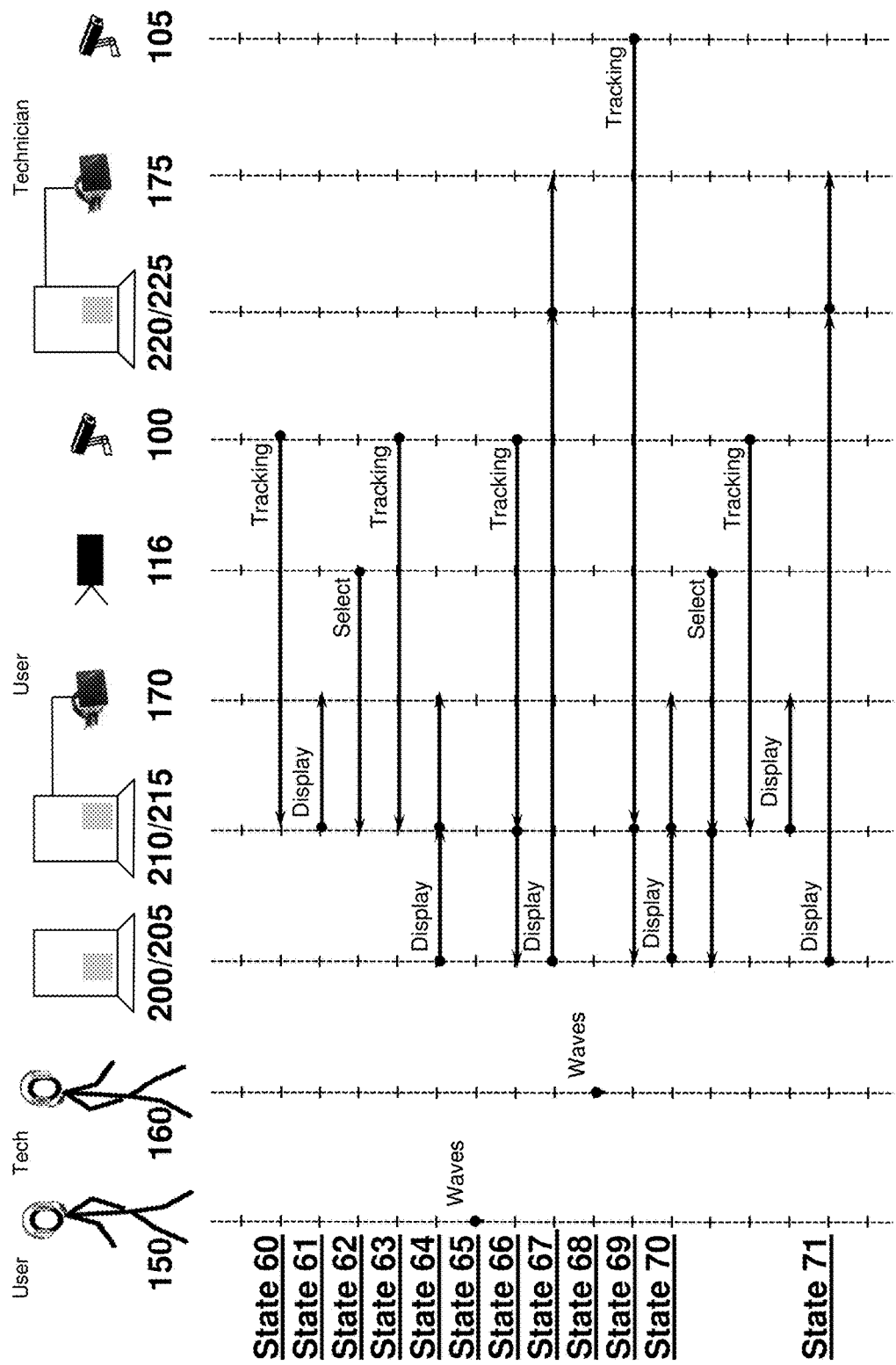
FIG. 23 illustrates a continued process of an example embodiment of a multi-user virtual reality example embodiment.

State 60 of FIG. 23. The server 210 determines, given the tracked head position of the user 150 and Wand 116 placement from the tracking cameras 100 output, the user 150 has selected a certain virtual world 600 from a plurality of displayed virtual worlds 500.

State 61. In response to the selection, the server 210 displays in the HMD 170 a textual description of the virtual world and its associated presentation 610. Optionally, the displayed textual description includes some or a portion of the text as previously entered by the user/presenter 150 in State 5. The user 150 determines from the displayed text 610 that the selected virtual world is associated with a training presentation s/he is to give.

State 62. The user 150 selects a presentation launch control 700, see FIG. 7 via Wand Controller 116.

State 63. The server 210 receives the tracking cameras 100 output and Wand Controller 116 selection.

State 64. The server 210 determines the user 150 is selecting a launch presentation control 700. The server 210 displays in the HMD 170 a first slide of the VR slide presentation which is a lunar landscape with a static screen 1400 as illustrated in FIG. 14. The server 200 provides certain movement/action instructions regarding the technician 160 as an avatar representation which is then displayed in the HMD 170 by the client computing device 210.

State 65. The user 150 sees the technician 160 (e.g., an avatar corresponding to the technician) in his/her display and waves to the technician 160 using the Wand Controller 116 as illustrated in FIG. 15. In this example embodiment, an Avatar 1500 representing the technician 160 in the scene has a display placard identifying the participant 160 as user 01.

State 66. The server 210 receives the tracking cameras 100 output and streams the camera 100 output (or, optionally, in lieu of direct camera output, data reduced user/presenter's 150 motion/actions position) to server 200.

State 67. The server 220 receives instructions from the server 200 to display a rendition of the presenter's 150 waving Wand Controller 116 in the HMD 175 of the technician 160.

State 68. The technician 160 waves back to the user 150 using his/her Wand controller 118.

State 69. The server 220 receives the tracking cameras 105 output and streams the cameras 105 output (or, optionally, in lieu of direct camera output, data reduced user/presenter's 150 motion/actions position) to server 200.

State 70. The server 210 receives instructions from the server 200 to display a rendition of the technician's 160 waving Wand Controller 116 displayed in the HMD 170 of the user 150.

The States 65-70 above illustrate, in this example, how the motion tracking data is generally managed between the computing devices 200, 210, 220 in a master/client relationship of a cluster system. In this example, motion tracking streaming/recording/processing occurs throughout the interactive presentation session and for simplicity is not detailed in the State flow language and figures.

State 71. As the presenter's 150 client is configured on first slide start to be in Presentation mode, the user 150 begins his brief presentation directing the technician's 160 attention to a Screen prop 1400, see FIG. 14. The user 150 clicks through several slides of the linked Microsoft PowerPoint presentation by selecting certain Wand 116 slide advance controls. An example slide 1400 is displayed in the Screen prop in 1400 as illustrated in FIG. 14 (from the presenter's view).

The server 210 detects/receives the user 150 slide advance controls and camera tracking output 100. The server 200 receives the user 150 entered Wand 116 controls (e.g., via server 210). A given forward/back slide control selection detected/received causes the server 210 to respond substantially immediately to advance to the next slide (or each back control selection causes a display of the previous slide) in the associated PowerPoint presentation slide deck in the display device 170. The slide control actions are also received by server 200 from 210. The server 200 instructs server 220 to change the displayed presentation slide in the HMD 175 in sync with the user/presenter 150.

Figure 24:
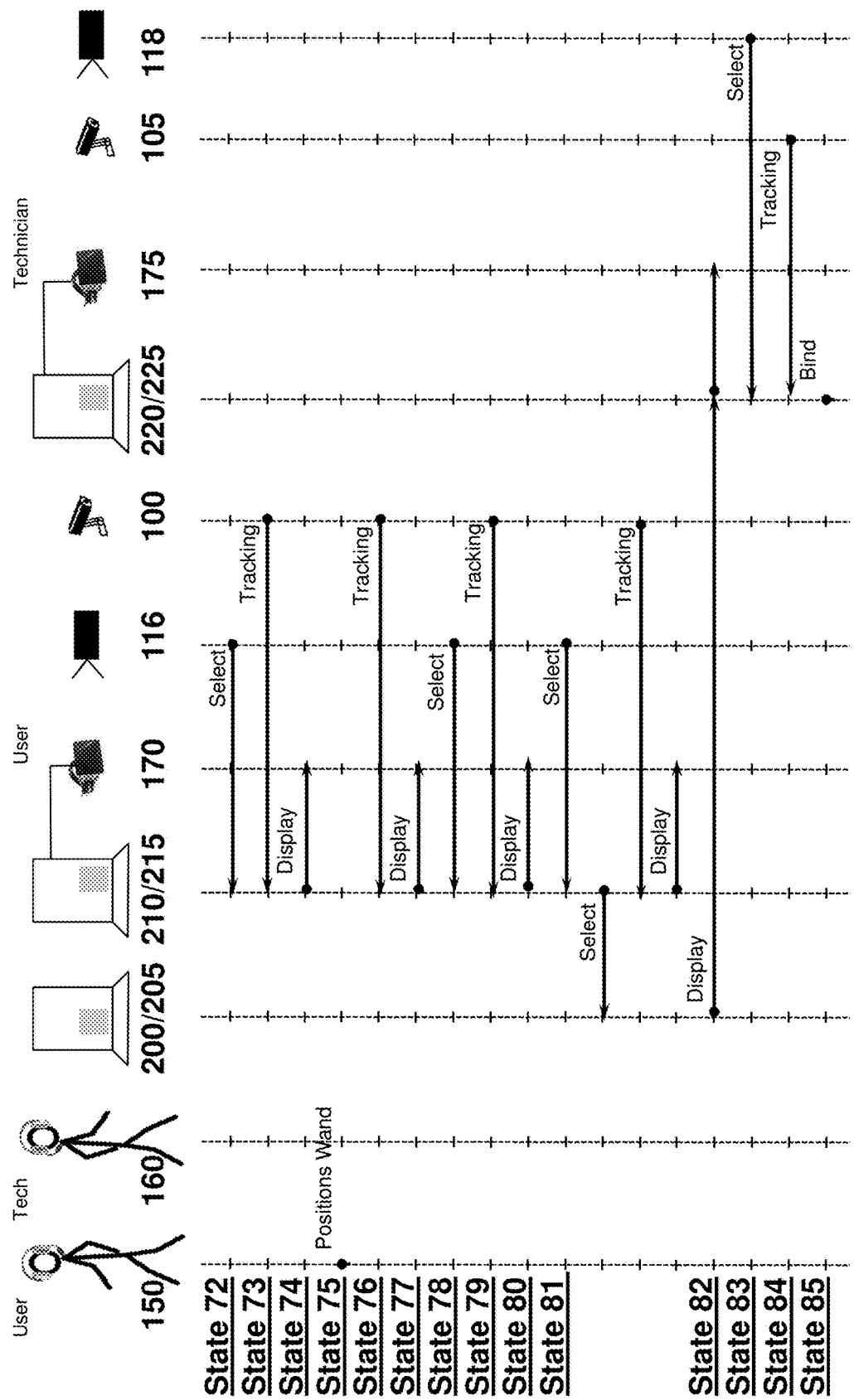
FIG. 24 illustrates a continued process of an example embodiment of a multi-user virtual reality example embodiment.

State 72 of FIG. 24. After finishing the static slide presentation, the user 150 next advances to the next slide of the VR slide presentation. In this example embodiment, this is accomplished by the user 150 first changing the presentation client control from Presentation Remote mode to Slide Clicker mode. The user 150 selects the trigger control on the Wand Controller 116. The server 210 detects/receives the trigger control.

State 73. The server 210 receives the Wand Controller 116 trigger and camera 100 tracking data.

State 74. The server 210 displays a tools menu 1000 in the HMD 170 of the user 150 as illustrated in FIG. 10.

State 75. The user 150 positions the Wand Controller 116 such that the Slide Clicker control 1080 is highlighted (or displaced forward from the other available controls).

State 76. The server 210 receives the tracking cameras 100 output and determines the user 150 has positioned the Wand Controller 116 to select the Slide Clicker control 1080.

State 77. In this example embodiment, the server 210 highlights a Slide Clicker control 1080 and provides for display a brief textual description of the selected control as illustrated in FIG. 10 (which in the example of FIG. 10 displays a description of the Pencil control and not the Slide Clicker).

State 78. The user 150 selects the highlighted Slide Clicker tool by selecting the Wand Controller 116 trigger control which is detected/received by server 210.

State 79. The server 210 receives the camera output 100 and the Slide Clicker tool selection (as determined by receipt of the control selection and the position of the Wand 116 from the cameras output 100).

State 80. The server 210 changes the presenter's 150 client control mode to Slide Clicker. In this example, the server 210 removes the visual tool display 1000 subsequent to the client mode change in HMD 170.

State 81. The user 150 advances the VR slide presentation from Slide 1 to Slide 2 by selecting a right Wand 116 control which corresponds to the next slide for the Slide Clicker which is detected/received by server 210.

State 82. The server 210 detects/receives the user 150 VR slide advance request and the camera 100 tracking data. The server 210 substantially immediately displays a slide 2 scene in the HMD 170 of the user 150. The user 150 slide control actions are sent to server 200. The server 200 instructs the server 220 (e.g., substantially simultaneously to the instruction provided to server 210) to display slide 2 in the HMD 175 of the technician 160. The scene of slide 2 is similar to slide 1 but with the addition of the Workstation 1600 on the table as illustrated in FIG. 16 (from the presenter's view).

State 83. The user 150 asks the technician 160 to pick up the Workstation 1600 to view the underside of the Workstation 1600 to read the model number. (In another example embodiment, before a technician 160 can grab the Workstation 1600, a user 150 must first activate a Grabber control 1060, for example, by bringing up the tools menu 1000, selecting the Grabber control 1060, and then pointing the user's Wand Controller 116 at the Workstation while selecting a Wand 116 control). The technician 160 moves the Wand Controller 118 to a position on the Workstation 1600 and holds the Wand Controller 118 trigger which is detected/received by server 220.

State 84. The server 220 receives the cameras 105 output and the trigger control.

State 85. The server 220 determines the Wand Controller 118 is positioned on the Workstation 1600. The server 220 binds the Wand Controller 118 and the Workstation 1600.

Figure 25:
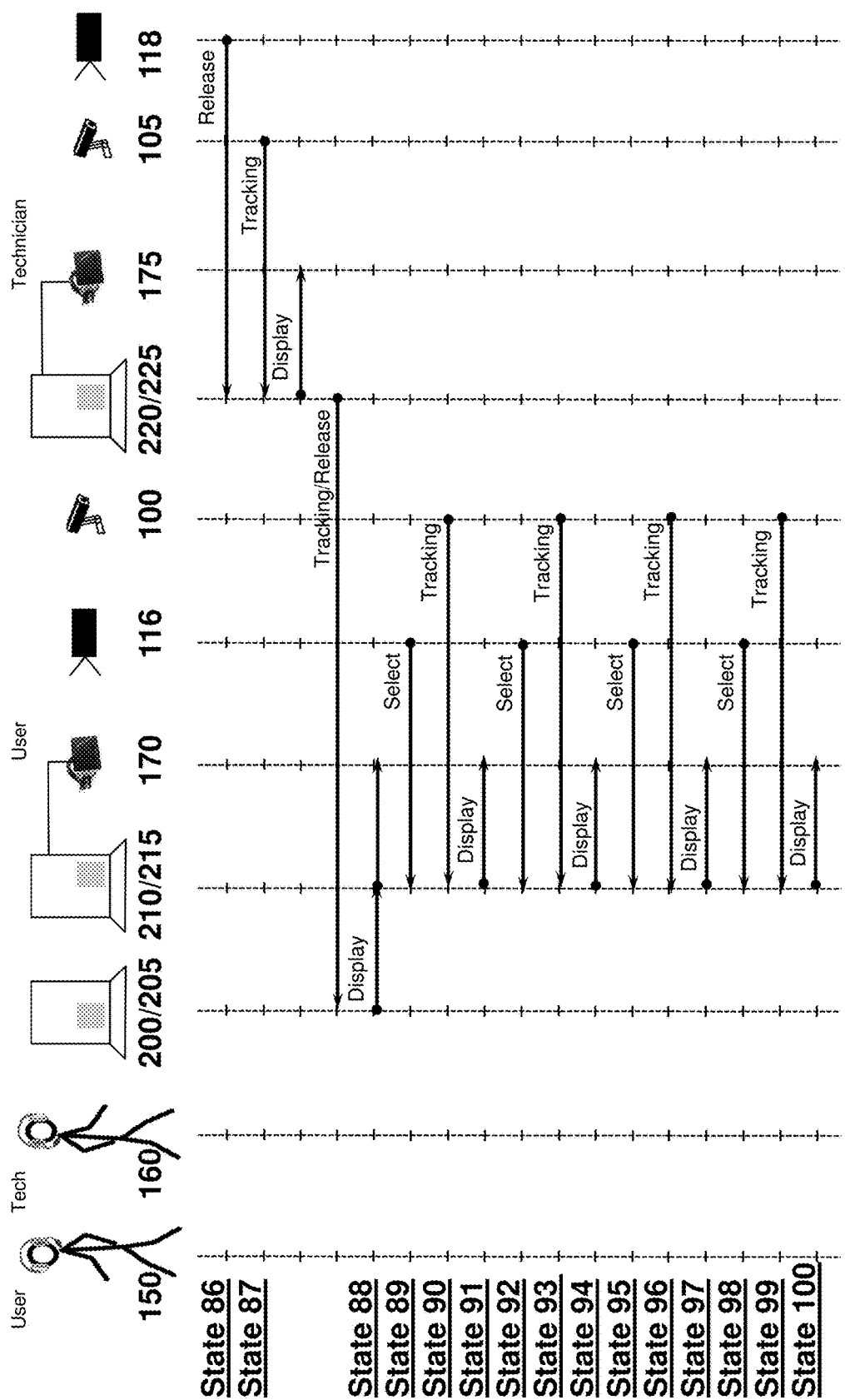
FIG. 25 illustrates a continued process of an example embodiment of a multi-user virtual reality example embodiment.

State 86 of FIG. 25. The technician 160 lifts the bound Workstation 1600 above his head in order to read the model number of the Workstation 1600. The technician 160 after reading aloud the model number releases the Wand Controller 118 trigger which is detected/received by server 220.

State 87. The server 220 receives the cameras 105 output and the trigger control release.

State 88. The server 220 displays in the HMD 175 the elevation of the Workstation 1600 and upon the trigger's release to invoke an animation script illustrating the Workstation 1600 floating through space back to the table in the scene (from the technician's 160 perspective). The server 220, substantially immediately, transmits the technician's lifting actions and the trigger release. The server 200 instructs the server 210 to display in the HMD 170 the lifting of the Workstation 1600 by the technician 160 and the floating return of the Workstation 1600 to the table in the scene (from the user's 150 perspective).

State 89. The user 150 overviews a maintenance upgrade to the displayed workstation 1600. As part of the maintenance upgrade, the user 150 would like to reinforce a point by writing/drawing a model number of the upgrade. The user 150 invokes a Marker/Pencil tool 1070 by selecting a Wand 116 control, for example the trigger control on his/her Wand Controller 116 which is detected/received by server 210.

State 90. The server 210 receives the cameras 105 output and the trigger control action.

State 91. The server 210 responds to the trigger request by displaying a tools menu 1000 in the HMD 170 of the user 150 as illustrated in FIG. 10.

State 92. The user 150 does not initially see the Marker/Pencil tool 1070 in the displayed menu (although it actually is in the display). The user 150 causes a menu tools scroll (or rotation of the displayed tools) by selecting a scroll left control 1020 as illustrated in FIG. 10 which is detected/received by server 210.

State 93. The server 210 receives the tracking cameras 100 output and determines the user 150 has selected the scroll control 1020 by the position of the Wand Controller 116 at the time the user 150 selected the trigger control.

State 94. The server 210 responds to the scroll menu selection request by causing a rotation of the displayed tools menu to the left 120 degrees to the position illustrated in FIG. 11 in HMD 170.

State 95. The new tools menu does not include the Marker/Pencil tool. The user 150 cause a subsequent scroll to the left (or rotation of the displayed tools) by selecting a displayed scroll left control 1120 illustrated in FIG. 11 which is detected/received by server 210.

State 96. The server 210 receives the tracking cameras 100 output and determines the user 150 has selected the scroll control 1120 by the position of the Wand Controller 116 at the time the user 150 selected the trigger control.

State 97. The server 210 responds to the scroll menu selection request by causing a rotation of the displayed tools menu to the left 120 degrees to the position illustrated in 12 in HMD 170.

State 98. The new tool menu also does not include the Marker/Pencil tool 1070. The user 150 cause a subsequent scroll to the left (or rotation of the displayed tools) by selecting a displayed scroll left control 1250 as illustrated in FIG. 12 which is detected/received by server 210.

State 99. The server 210 receives the tracking cameras 100 output and determines the user 150 has selected the scroll control 1250 by the position of the Wand Controller 116 at the time the user 150 selected the trigger control.

State 100. The server 210 responds to the scroll menu selection request by causing a rotation of the displayed menu to the left 120 degrees to the position as illustrated in FIG. 10 in HMD 170.

In this example, the display of presentation controls are visible to the user/presenter 150 and not the technician 160. In addition, as previously described herein, the motion tracking of the user/presenter 150 and technician 160 is being updated continually during the VR simulation via interactions between server 200 and servers 210, 220 (e.g., servers 210, 220 providing local camera tracking data to server 200 and receiving instructions from server 200 regarding position syncing of the user 150 for server 220 and user 160 for server 210 (for display)).

Figure 26:
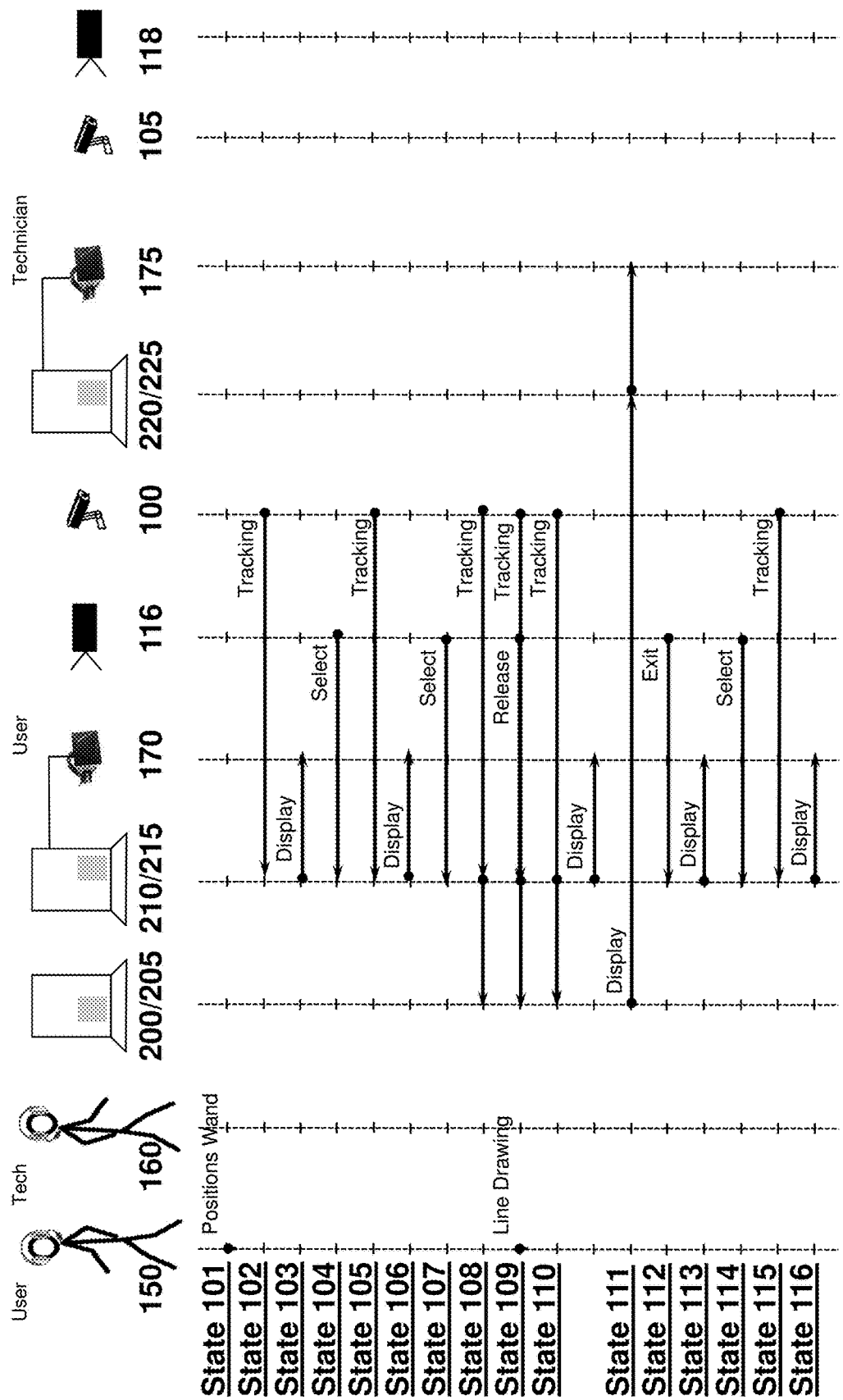
FIG. 26 illustrates a continued process of an example embodiment of a multi-user virtual reality example embodiment.

State 101 of FIG. 26. The displayed tools menu is back to the original position of State 91. The user 150 now sees the Pencil/Marker tool 1070 displayed in the tools menu. The user 150 positions the Wand controller 116 such that the Pencil/Marker control 1070 is highlighted (or displaced forward from the other menu items), see FIG. 10.

State 102. The server 210 receives the tracking cameras 100 output and determines the user 150 has positioned the Wand Controller 116 in order to select the Pencil/Marker 1070 control.

State 103. In this example embodiment, the server 210 highlights the Pencil/Marker control 1070 and display a brief textual description 1010 of the selected control in HMD 170.

State 104. The user 150 selects the highlighted tool (Pencil/Marker) by selecting a Wand 116 trigger control which is detected/received by server 210.

State 105. The server 210 receives the tracking cameras 100 output and trigger control selection and determines the user 150 has positioned the Wand Controller 116 to select the Pencil/Marker 1070 control.

State 106. The server 210 changes the client control mode to the Pencil/Marker 1070. In this example, the server 210 removes the visual tool menu display subsequent to the client mode change in the HMD 170 of the user 150.

State 107. The user 150 points the Wand Controller 116 to a dark area in the scene/slide (e.g., the lunar sky) to illustrate to the technician a written model number (via user 150 drawing) of a component upgrade to the displayed workstation 1600. The user 150 then selects a control on the Wand controller 116, for example a trigger control which is detected/received by server 210.

State 108. The server 210 receives the tracking cameras 100 output and trigger request and activates the drawing tool for user 150. The server 210 notifies server 200 of the drawing tool activation.

State 109. The user 150 draws the name of the model number of the component to be upgraded, crosses out the model number change, and above the cross-out, adds the new model number. In this example embodiment, the drawing tool initiates a line display tracking the movement of the Wand 116 and stops the line display once the wand trigger is released by the user 150 which is detected/received by server 210.

State 110. The server 210 receives the tracking cameras 100 output and trigger release. The server 210 streams (beginning in State 108) the initiation of the drawing tool, cameras 100 wand position data, and trigger release to server 200.

State 111. The server 210, substantially immediately, as the drawing action of user/presenter 150 and trigger release are received, the server 210 displays the line drawing in the HMD of the user/presenter 150. The server 200, substantially immediately, instructs the server 220 to display the presenter's 150 line drawings in substantially real-time in the HMD 175.

State 112. When the user 150 finishes drawing, the user/presenter 150 selects a Wand 116 control to exit the drawing client mode which is detected/received by server 210.

State 113. In response to the received Wand 116 controls, the server 210 exits drawing mode state. The HMD 170 is updated to reflect the state change.

State 114. The user 150 would like to next measure the distance from the lunar module to an area near the user 150 and technician 160. If the technician 160 and user 150 are too close to the lunar module, the technician 160 and user 150 might be injured when the lunar module lifts off. The user 150 brings up a tools menu by selecting a trigger control on the Wand Controller 116 which is detected/received by server 210.

State 115. The server 210 receives the tracking cameras 100 output and trigger selection.

State 116. The server 210 responds to the trigger request by displaying a tools menu 1000 in the HMD 170 of the user 150 as illustrated in FIG. 10.

Figure 27:
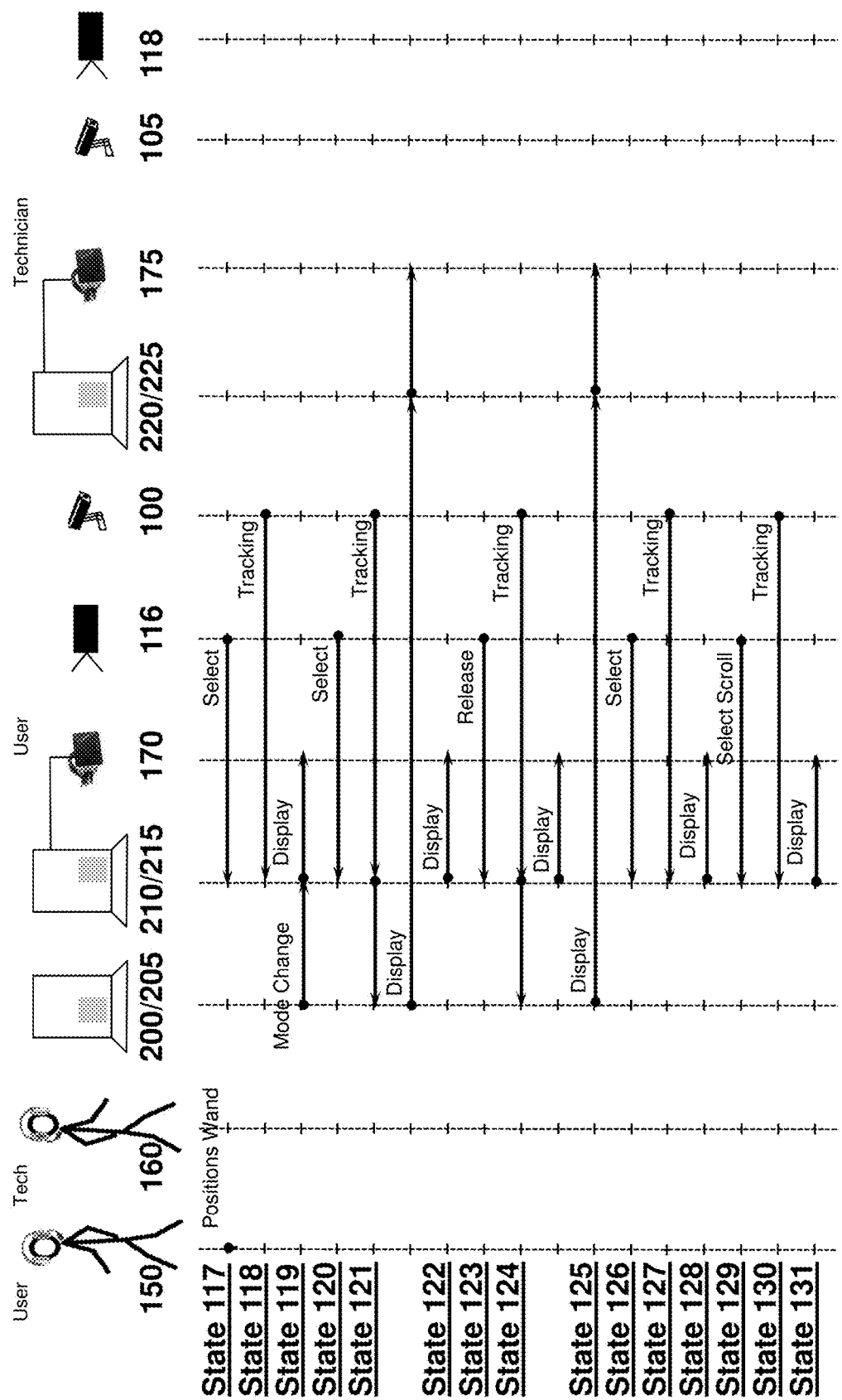
FIG. 27 illustrates a continued process of an example embodiment of a multi-user virtual reality example embodiment.

State 117 of FIG. 27. The user 150 positions the Wand 116 on the Measuring Tape control 1090 and selects the Wand 116 trigger which is detected/received by server 210.

State 118. The server 210 receives the tracking cameras 100 output and trigger control selection and determines the user 150 has positioned the Wand Controller 116 to select the Measuring Tape control 1090.

State 119. The server 210 changes the client's control mode to the Measuring Tape mode. In this example, the server 210 removes the visual tool display subsequent to the client mode change and activates the measuring tool, display which is a line emitting from the Wand Controller 116 (e.g., a laser pointer visual) to an end point in the virtual reality scene as viewed by the user 150 and technician 160, State 120. The user 150 chooses a start measuring point near the technician 160 by pointing the Wand Controller 116 at the lunar landscape near the technician 160 and selecting a control, for example the trigger control of the Wand Controller 116 which is detected/received by server 210.

State 121. The server 210 receives the tracking cameras 100 output and trigger request and determines the user 150 has directed the Wand Controller 116 to a specific area of the lunar surface The server 210 notifies server 200 of the measuring tape activation.

State 122. The server 210 causes the display of the marker position for the selected beginning point of the measurement in HMD 170. The server 200 instructs servers 220 to cause the display in the HMD 175 a marker position for the selected beginning point of the measurement.

State 123. The user 150 next chooses an ending point, in this case a point on the lunar module, by pointing the Wand Controller 116 at the lunar module and selecting (or releasing) a control, for example the trigger control of the Wand Controller 116 which is detected/received by server 210.

State 124. The server 210 receives the tracking cameras 100 output and determines an end-point that the user 150 has directed the Wand Controller 116 and the release of the trigger control of the Wand Controller 116. The server 210 informs server 200 of the Wand Controller 116 selection/release.

State 125. Upon receiving the trigger control selection/release, the server 210, substantially immediately, causes the display of a line emitting from the Wand Controller 116 (e.g., like a laser pointer) to an end point on the lunar module, to mark the end point position corresponding to the emitted line termination on the surface of the lunar module in the HMD 170. The server 200, substantially immediately to the receipt of the trigger control selection/release from server 210 causes server 220 to display a line emitting from the Wand Controller 116 (e.g., like a laser pointer) to an end point on the lunar module, to mark the end point position corresponding to the emitted line termination on the surface of the lunar module in the HMD 175. Optionally, the server 210 displays in the HMD 170a virtual measuring tape line 1800 between the starting point and ending point as illustrated in FIG. 18. Similarly, server 200 instructs server 220 to display in the HMD 175 a virtual measuring tape line 1800. In this example, the distance 1810 (e.g., virtual distance, in meters, feet, yards, miles, etc.) between the starting point (e.g., the lunar landscape near the technician 160) and the ending point (e.g., a point on the lunar module) is displayed in association with the line 1800 display between the start and end points. Optionally, the virtual line pointer emitting from the Wand Controller 116 when selecting a measuring point is removed when the user 150 releases the Wand Controller 116 trigger.

State 126. As the user 150 and technician 160 are too close to the lunar module for an anticipated liftoff, the user 150 invokes a transport feature to move the user 150 and participant 160 to a distant location on a remote hill. The user 150 selects a control to access the Tools Menu, for example by selection the Wand Control 116 trigger which is detected/received by server 210.

State 127. The server 210 receives the tracking cameras 100 output and trigger control selection and determines the user 150 has positioned the Wand Controller 116 to select the tools menu 1000.

State 128. The server 210 displays a tools menu 1000 in the HMD 170 of the user 150 as illustrated in FIG. 10.

State 129. The user 150 does not see the Jump To tool in the displayed menu. The user 150 causes a menu tools scroll by selecting a scroll left control 1020 as illustrated in FIG. 10 which is detected/received by server 210.

State 130. The server 210 receives the tracking cameras 100 output and determines the user 150 has selected the scroll control 1020 by the position of the Wand Controller 116 at the time the user 150 selected the trigger control State 131. The server 210 responds to the scroll menu selection request by causing a rotation of the displayed tools menu to the left 120 degrees to the position illustrated in FIG. 11 in HMD 170.

Figure 28:
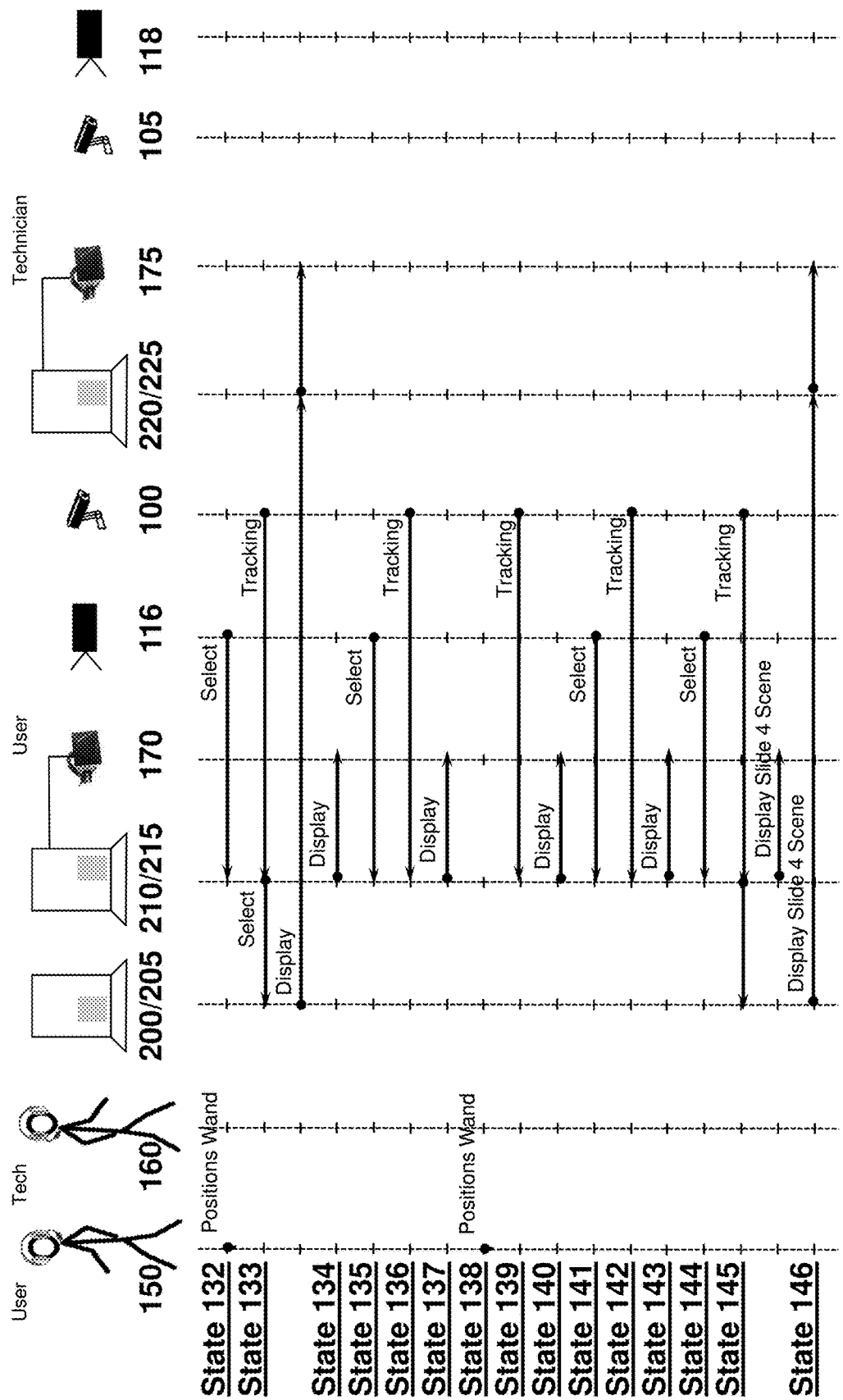
FIG. 28 illustrates a continued process of an example embodiment of a multi-user virtual reality example embodiment.

State 132 of FIG. 28. The user 150 positions the Wand Controller 116 on the displayed Jump To control 1110 and selects the Wand Controller 116 trigger control which is detected/received by server 210.

State 133. The server 210 receives the tracking cameras 100 output and trigger control selection and determines the user 150 has positioned the Wand Controller 116 to select the Jump To control 1110. The server 210 notifies the server 200 of the Jump To control selection.

State 134. In this example embodiment, the server 210 transports the user 150 to the hill location behind the lunar module in the scene. In this example, the transportation is substantially immediate and the presenter's 150 view in the HMD 170 is from the hill facing the lunar module. Simultaneously (or nearly simultaneously), the server 200 instructs the server 220 to transport the technician 160 to the hill location behind the lunar module in the scene near the user 150. In this example, the transportation is substantially immediate and the technician's 160 view in the HMD 175 is from the hill facing the lunar module.

State 135. The user 150 finishes the presentation with a final slide. The final slide includes an animation of the lunar module lifting off. In order to transition to the final slide, the user 150 accesses the Slide Clicker control. The user 150 selects a control to access the Tools Menu, for example by selecting the Wand Control 116 trigger which is detected/received by server 210.

State 136. The server 210 receives the tracking cameras 100 output and trigger control selection and determines the user 150 has positioned the Wand Controller 116 to select the Tools menu 1000.

State 137. The server 210 responds to the trigger request by displaying a tools menu 1000 in the HMD 170 of the user 150 as illustrated in FIG. 10.

States 138-143. See States 75-80.

State 144. The user 150 advances the VR slide presentation from Slide 3 to Slide 4 by selecting a right Wand 116 control which corresponds to the next slide for the Slide Clicker which is detected/received by server 210.

State 145. The server 210 receives tracking data and the slide advance request. The server 210 notifies the server 200 of the slide advance.

State 146. The server 210 displays the slide 4 scene in the HMD 170 and the server 200 instructs the server 220 to display the slide 4 scene in the HMD 175. Slide 4 is configured to initiate an animation script on slide start. Thus, in this case, an animation script is initiated. The server 210 and the server 220 display the animation of the lunar module lifting off from the moon surface, in the respective HMDs 170,175.

Figure 29:
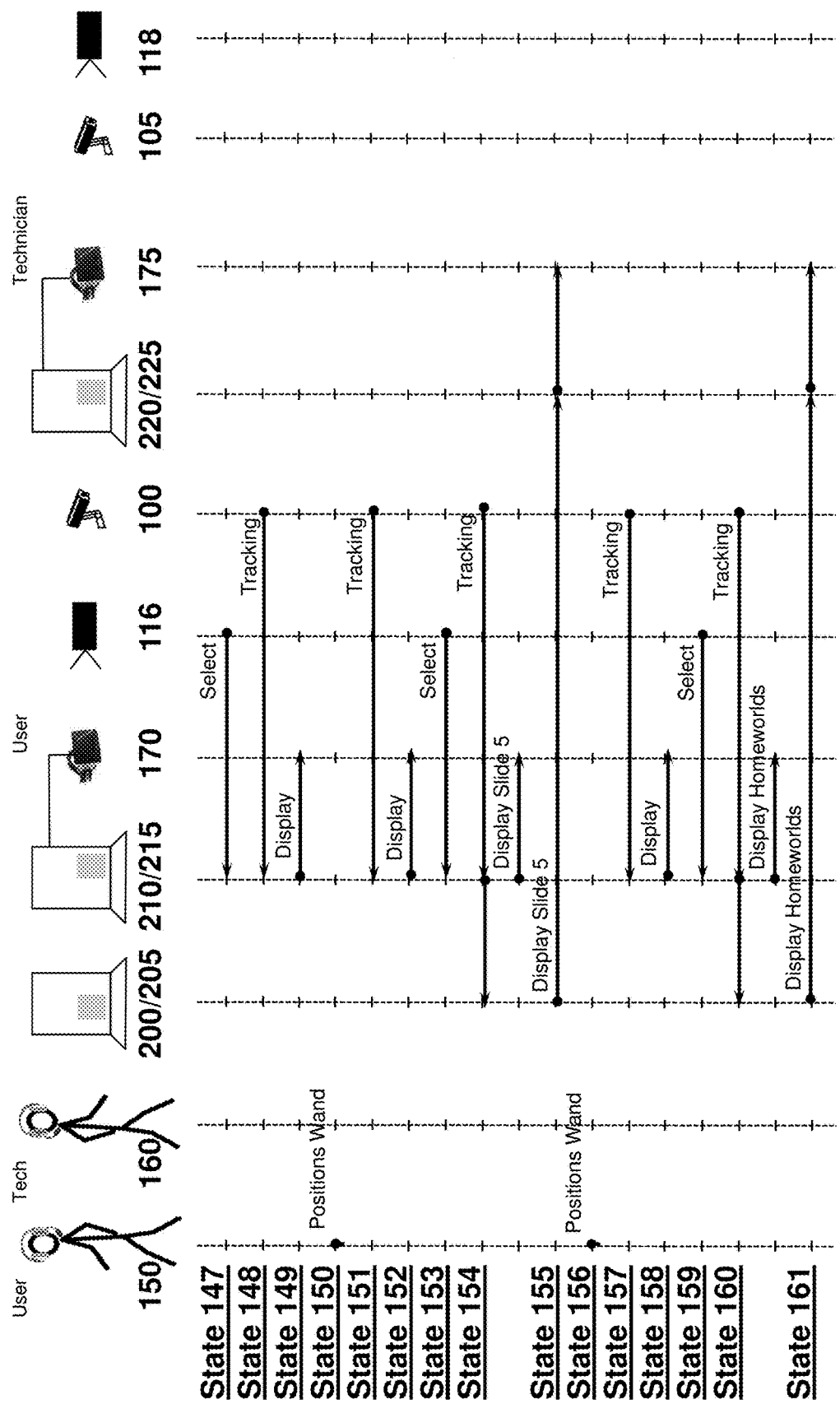
FIG. 29 illustrates a continued process of an example embodiment of a multi-user virtual reality example embodiment.

State 147 of FIG. 29. The presentation is now over. The user 150 ends the presentation, for example, by selecting a Homeworld control 1200. The user 150 selects a control to access the Tools Menu, for example by selecting the Wand Control 116 trigger which is detected/received by server 210.

State 148. The server 210 receives the tracking cameras 100 output and trigger control selection and determines the user 150 has positioned the Wand Controller 116 to select the Tools menu 1000.

State 149. The server 210 responds to the trigger request by displaying a tools menu 1000 in the HMD 170 of the user 150 as illustrated in FIG. 10.

State 150. The user 150 positions the Wand Controller 116 such that the Slide Clicker control 1200 is a selected menu item.

State 151. The server 210 receives tracking cameras 100 output data and determines the user 150 has positioned the Wand Controller 116 at the Slide Clicker control 1200.

State 152. The server 210 highlights (or displaces forward from the other available controls or other manner to indicate the Wand is positioned on a tool/menu item) the Slide Clicker control 1200, see FIG. 12.

State 153. The user 150 advances the VR slide presentation from Slide 4 to Slide 5 ("The End") by selecting a right Wand 116 control which corresponds to the next slide for the Slide Clicker. The server 210 detects the Wand 116 trigger selection and notifies server 200 of the Slide Clicker selection.

State 154. The server 210 receives the tracking cameras 100 output and trigger control selection (e.g., via server 210) and determines the user 150 has positioned the Wand Controller 116 to advance the VR slide presentation from Slide 4 to Slide 5. The server 210 notifies server 200 of the slide advance.

State 155. The server 210 displays the slide 5 scene in the HMD 170. The server 200 instructs the server 220 to display the slide 5 scene in the HMD 175.

State 156. The user 150 positions the Wand Controller 116 such that the Slide Clicker control 1200 is a selected menu item.

State 157. Substantially at the same time, the server 210 receives tracking cameras 100 output data and determines the user 150 has positioned the Wand Controller 116 on the Homeworld control 1200.

State 158. The server 210 highlights (or displaces forward from the other available controls) the Homeworld control 1200, see FIG. 12 The server 210 also displays a brief textual description of the selected control in the menu of controls 1010 as illustrated in FIG. 10 (note, wherein the example of FIG. 10 displays a highlighted control and an example textual description of the Pencil control but not a Homeworld).

State 159. The user 150 selects the highlighted Homeworld tool 1200 by selecting the Wand Controller 116 trigger control. The server 210 detects/receives the Wand 116 trigger selection.

State 160. The server 210 receives the tracking cameras 100 output and trigger control selection and determines the user 150 has positioned the Wand Controller 116 to select the highlighted Homeworld tool 1200. The server 210 notifies the server 200 of the user selection.

State 161. The server 210 changes the display to the Homeworld scene in HMD 170. The server 200 instructs server 220 to change the scene displayed in HMDs 175 to the Homeworld scene. (In this example, the user/presenter 150 exiting a presentation causes the presentation to end for all users including the technician 160.)

In the example above, the server 200 (or other servers 210 and 220) enable a talk path, using for example a VoIP protocol talk path, enabling the user 150 and participant 160 to communicate throughout the slide presentation via their respective headsets 130,135.

In the example collaborative VR presentation described above, the VR slide presentation session is hosted by a user/presenter 150. The VR presentations described herein may also be unhosted. This allows a simple or sophisticated, self-running training module to be designed and then used by a trainee without a human supervisor. For example, in State 50 of the example process above, a control can be presented to a user which initiates a self-running training module in which user/presenter 150 is not present for the session but was previously recorded and embedded into the session. Advantageously, a participant can experiences a rich VR learning environment with minimal training development cost for a provider.

Optionally, a one or more initiate recording controls are provided (e.g., a handheld initiated trigger), that when selected by a presenter and/or participant enables the real-time recording of audio and/or user motion/actions capture of himself or a participant during the course of a VR presentation. Optionally, the recording continues until the recording initiator selects a recording stop control (or release of a control). Optionally, one or more controls are provided that enable the presenter and/or participant to instantly use and/or associate the recording with the current presentation (e.g., to illustrate to a user a statement(s) and/or action(s) s/he just performed, save comments/actions for later review, etc.).

Thus, as described above, an example collaborative virtual reality presentation may be provided via a client/server architecture with motion tracking. Advantageously, a meeting host may create a structured VR slide presentation from a set of computer-aided tools. The meeting host can then present the created VR presentation slides with associated animations/tools/transports to local and/or remote users in a rich virtual reality environment.

Collaborative Virtual Reality

An aspect of this disclosure relates to systems and methods for enabling a multi-user virtual reality and/or augmented reality experience, such as, by way of example, those described in U.S. patent application Ser. No. 14/971,720, filed on Dec. 16, 2015, the contents of which are incorporated herein by reference in their entirety.

An aspect of the disclosure relates to an example cluster computing system configured to interface and work in conjunction with a tracking system, to provide a high quality multi-user, virtual and/or augmented reality experience.

An aspect of this disclosure relates generally to devices and methods for enabling a multi-user virtual or augmented reality experience, and in particular, to a cluster computing system which works in conjunction with a motion capture tracking element.

An aspect of the disclosure relates to an example cluster computing system configured to interface and work in conjunction with a tracking system, to provide a high quality multi-user, virtual and/or augmented reality experience, with significantly reduced human-perceptible latencies. Optionally, the example cluster computing system further enables content providers to create single-user virtual and/or augmented reality experiences, where the cluster computing system extends the single-user virtual and/or augmented reality experience via a cooperative distributed and centralized computing architecture to a multi-user virtual and/or augmented reality experience (e.g., by having a master server generating and enabling the of rendering the different viewpoints for each client in a multi-user VR simulation the clients. Optionally, the cluster computing system further manages via abstraction the intricacies of interworking in a multi-user environment with various hardware components from various hardware manufacturers Advantageously, virtual reality and/or simulated environments as described herein can be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for example, in an automotive augmented reality environment.

Conventionally, VR and AR environments have been oriented to a single-user environment. Recently, multi-user VR environments/worlds have been created which enable users to collaborate and share a virtual world experience. A number of technical challenges arise in the implementation of a multi-user VR environments. Generally, users are on separate computing platforms connected by a Local-Area-Network or in some cases a Wide-Area-Network (e.g., if the VR participants are geographical separated) and these networks are subject to inherent communication delays, which may result in an unrealistic simulation of views and actions. Another key challenge of multi-user VR systems is the timely synchronization and rendering of a VR participant's action from the viewpoint (e.g., correct perspective) of each participant in the simulation. Further, each VR participant may be configured with different hardware including but not limited to different: computing platforms, displays, trackers, and input devices. Thus, there is a need to enable a dynamic and real-time (or near real-time) immersive, multi-user virtual reality environment in which user actions and scenes are synchronized across varying hardware devices with minimal programmatic and configuration effort on the part of virtual reality content creators. Advantageously, embodiments of the virtual/augmented reality cluster system achieve some or all these objectives via a client-server architecture which enables certain client contextual processing and certain centralized server processing and synchronization control in order to provide a multi-user virtual user experience which seems lifelike to all participants of the simulation.

Aspects of the disclosure relates to an example cluster computing system configured to interface and work in conjunction with a tracking system, to provide a high quality multi-user, lifelike, virtual and/or augmented reality experience, with significantly reduced human-perceptible latencies. Thus, aspects of the disclosure herein relate to a multi-user VR/AR environment that may be configured to enable both timely user actions in a display in the first person (that is, the system's rendering of a user action in the viewpoint of the user, optionally, on a computing device local and/or associated with a user) and the view of a user's action by other participants of the simulation (optionally, rendered on a computing device local and/or associated with a user). Aspects of the disclosure further relate to systems and processes that provide timely synchronization (for example, via a master computing device) and an enabled rendering of a VR participant's action from the viewpoint (e.g., the correct perspective) of each participant in the simulation. Further, aspects of the disclosure relate to systems and processes that provide a dynamic and real-time (or near real-time) immersive, multi-user virtual reality environment in which user actions and scenes are synchronized across varying hardware devices, optionally with minimal programmatic and configuration effort on the part of virtual reality content creators/operators/participants.

A given embodiment may include some or all of the features, functionality, systems and methods described herein.

An example embodiment provides a cluster system, comprising: a master computing device; a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device and to the master computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by the master computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed by the first computing device and not by the master computing device, the privileged operation enabling an orientation of a first scene of a simulation to be rendered in the head mounted display associated with the first user in synchronization with movement of the head mounted display in at least five degrees of freedom; transmit, from the first computing device to the master computing device, a position of the first user in the physical space and provide a first instruction by the master computing device enabling an image corresponding to the first user to be rendered at a first virtual position in a display device associated with the second user, wherein the first virtual position is based at least in part on the position of the first user in the physical space and on a viewpoint of the second user; receive, at the master computing device from one or more of the plurality of motion tracking cameras, position data corresponding to the third marker; and at least partly in response to receipt of the position data corresponding to the third marker and on the accessed configuration information, determine that a non-privileged operation is to be performed by the master computing device and not by the first computing device, wherein the non-privileged operation comprises enabling: synchronized movement of a virtual representation of the third marker from a viewpoint of the first user corresponding to received position changes associated with the third marker to be rendered in the head mounted display associated with the first user and synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light to the second computing device; and, optionally wherein the third marker is attached to a limb of the first user; and, optionally wherein the third marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a user interface of the master computing device, a third user to indicate what types of operations are privileged and what types of operations are non-privileged; and, optionally wherein the virtual marker representation of the third marker comprises a virtual representation of a glove.

An example embodiment provides a cluster system, comprising: a master computing device; a plurality of motion tracking cameras, wherein the plurality of motion tracking cameras configured to reside in a physical space coincident with the first user, the plurality of motion tracking cameras configured to detect infrared light and to communicate position data derived from detected infrared light to the master computing device; a marker, wearable or holdable by the first user, configured to emit a repetitive pattern of infrared light pulses, wherein the marker is associated with one or more non-privileged operations that are to be performed remotely by the master computing device; non-transitory media storing instructions readable by the cluster system, that when executed by the cluster system, cause the cluster system to: access configuration information comprising information indicating what types of operations are privileged and what types of operations are non-privileged; receive at the master computing device, a position of the first user in the physical space and provide a first instruction by the master computing device enabling an image corresponding to the first user to be rendered at a first virtual position in a display device associated with a second user, wherein the first virtual position is based at least in part on the position of the first user in the physical space and on a viewpoint of the second user; receive, at the master computing device, from one or more of the plurality of motion tracking cameras, position data corresponding to the marker; and at least partly in response to the receipt of the position of the marker and on the accessed configuration information, determine that a non-privileged operation is to be performed by the master computing device and not by another computing device associated with the cluster system, wherein the non-privileged operation comprises enabling: synchronized movement of a virtual representation of the marker from a viewpoint of the first user corresponding to received position changes associated with the marker to be rendered in the head mounted display associated with the first user and synchronized movement of the virtual representation of the marker from a viewpoint of the second user corresponding to received position changes associated with the third marker to be rendered in the head mounted display associated with the second user; and, optionally wherein the marker is configured to be attached to a limb of the first user; and, optionally wherein the marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a third user interface of the master computing device, a user to indicate what types of operations are privileged and what types of operations are non-privileged.

An example embodiment provides a cluster system, comprising: a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by a computing device other than the first computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed locally by the first computing device and not by a computing device other than the first computing device, the privileged operation enabling an orientation of a first scene of a simulation to be rendered in the head mounted display associated with the first user in synchronization with movement of the head mounted display in at least five degrees of freedom; transmit, from the first computing device to a master computing device, a position of the first user in the physical space; receive, at the second computing device, a first instruction enabling: an image corresponding to the first user to be rendered at a first virtual position in a display device associated with the second user, wherein first virtual position is based at least in part on the position of the first user in the physical space and on a viewpoint of the second user; receive, at the first computing device, a first non-privileged instruction enabling: synchronized movement of a virtual representation of the third marker from a viewpoint of the first user corresponding to received position changes associated with the third marker to be rendered in the head mounted display associated with the first user; and receive, at the second computing device, a second non-privileged instruction enabling: synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light to the second computing device; and, optionally wherein the plurality of motion tracking cameras are configured to detect infrared light and to communicate position data derived from detected infrared light to a computing device other than the first computing device or the second computing device; and, optionally wherein the third marker is configured to be attached to a limb of the first user; and, optionally wherein the third marker is attached to or included as a component of a handheld tracking device; and, optionally wherein the at least five degrees of freedom comprise X-axis, Y-axis, Z-axis, yaw, and roll; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses.

Example features will now be described with reference to the figures.

Figure 31:
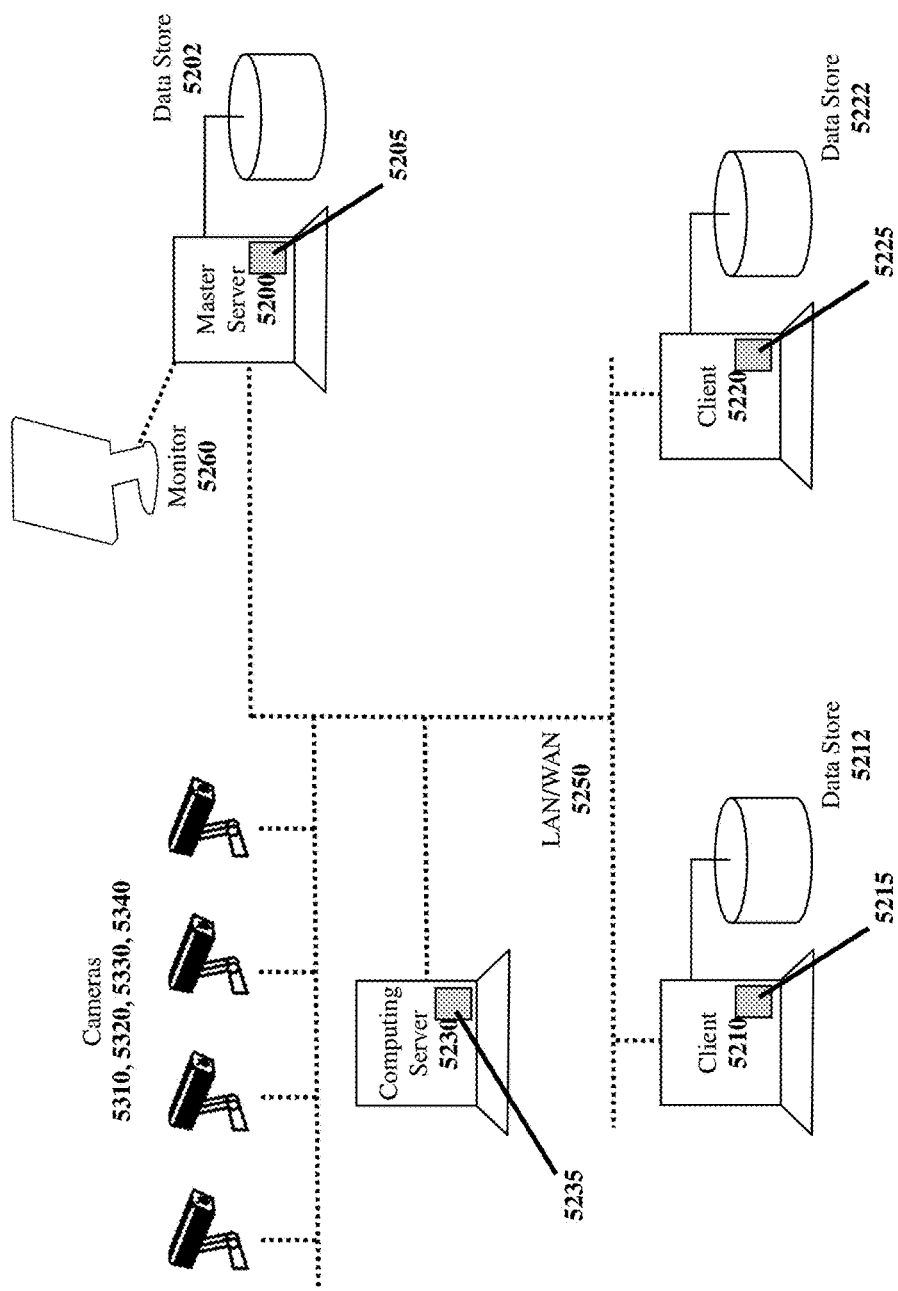
FIG. 31 illustrates an example operating environment of a clustered system with a master server and multiple clients.

FIG. 31 illustrates an example operating environment of a clustered system with a master server and multiple clients. As described herein, the illustrated system architecture can be used to facilitate a virtual and/or augmented reality experience, and in particular, a multi-user virtual and/or augmented reality experience. The system may be configured to perform some or all of the following: image capture and tracking functions, video/image processing, marker identification (e.g., LED marker identification), user/object position calculations, action synchronization, and/or dynamic rendering of virtual worlds in an optimized (e.g., in substantially real-time and/or minimal rendering delays) manner to create a lifelike experience. For clarity, the description herein may refer to virtual reality, which is intended to encompass both virtual reality and augmented reality, unless the context indicates otherwise.

As illustrated in FIG. 31, a master server computing device 5200 (e.g., a general purpose computer, a tablet computer, a cloud-based server, a smart phone, a graphics processing unit, etc.) is coupled to a plurality of client computing devices 5210, 5220 over a data network 5250 (e.g., a local area network, a wide-area network, the Internet, a private network, a public network, etc.). Optionally, the master server 5200 may be directly connected to a console/monitor 5260 (or over the data network 5250 to a console/monitor 5260) which displays a user interface via master server software 5200 for a user/participant or operator to provision, designate, and/or configure the master server 5200 (e.g., download and/or upgrade software, provision data communication interfaces, configure accounts, administer security, edit files, etc.). Optionally, the master server 5200 also provides a computing platform for compiling and/or executing certain programs and/or programmatic scripts (e.g., simulations), receiving and sending certain communications, performing video/image processing tasks, performing math computations, displaying/rendering certain images (e.g., rendering virtual worlds), providing client synchronization, hosting a client application, etc.

A given computing device 5200, 5210, and 5220 may be further configured with a data store 5202, 5212, and 5222, respectively, enabling the server to store in memory data associated with the VR session, simulations, models, objects, images, certain parameters, executable scripts/code, local event logs, error logs, etc. Thus, for example, the master server computing device 5200 may host a master server software program 5205, as illustrated in FIG. X6, comprising a single software program or a plurality of software programs or software modules including, for example, a render engine 5610 configured to render and/or enable the rendering of VR scenes, a physics engine 5615 (e.g., that provides a simulation of physical systems, such as rigid and soft body dynamics, collision detection, and fluid dynamics, and that provides an interface that hides the low-level details of the physics needed in virtual reality applications to enable application/game developers to focus on the higher-level functionalities of the application), a rules engine 5620, a simulation control engine 5625 (that coordinates simulation execution), a session manager 5630, a simulation state synchronizer engine 5635 (that, for example, synchronizes associated client viewpoints) and/or an error handling 5640, a client-server communications manager 5650 (that, for example, manages client server communications including over a data communication network (e.g., a low latency data communication network)), resource manager 5655 (that, for example, manages resources, including shared resources (e.g., simulation objects, scenes, etc.), virtual reality tracking and marker identification software 5660 (e.g., the Vizard VR™ toolkit and PPT Studio software from WorldViz LLC of Santa Barbara) by way of example.

The master server computing device 5200 may include cluster nodes (e.g., companion computing devices) that handle gameplay/simulation logic, tracking software, and one or more additional servers that process communications from client computing device. The master server computing device 5200 may include a login server, including a client/user identity and access authentication engine, that manages login sessions with client computing devices, validates client computing devices (e.g., by checking password and device identifiers), and if the client computing devices are validated, enables the devices to access the master computing device 5200 and/or cluster nodes. The data store 5202 associated with the master server computing device 5200 may store user account information such as password information, user/device identifiers, status of game/simulation play which may be stored upon a user suspending a game/simulation or other virtual/augmented reality activity and which may be accessed and utilized when the activity is restarted to provide a continuous experience, user usage information (e.g., time and duration of virtual/augmented reality activity), other users the user may be linked to (e.g., other users the user has interacted with when engaging in virtual/augmented reality activities), etc.

The master server computing device 5200 may further comprise multiple servers distributed over a broad geographic area to reduce latency with respect to interactions with client server devices, wherein a given server (or servers) may serve client computing devices in its geographical area. The various master server computing devices may include network interfaces and may be interconnected via high speed data networks to further reduce latencies. The cluster nodes may include dedicated high speed graphic processors to process virtual/augmented reality graphic tasks. The master server computing device 5200 may include one or more administrator terminals.

Similarly, as illustrated in FIG. 31, one or more client computing devices 5210, 5220 (e.g., a general purpose computer, a tablet computer, a cloud-based server, a smart phone, a graphics processing unit, a game console, etc.) are coupled to the master server 5200 over a data network 5250 (e.g., a local area network, a wide-area network, the Internet, a private network, a public network, etc.). Optionally, each client device 5210, 5220 can connect with other client devices via the data network 5250 (e.g., in a peer-to-peer manner). Optionally, a given client computing device 5210, 5220 may be connected directly or over a network to a console which displays a user interface via client software 5215, 5225 to a user/participant or operator and which can be used to provision, designate, and configure the given client computing device 5210, 5200 (e.g., download and/or upgrade software, provision data communication interfaces, configure accounts, administer security, edit files, etc.). Optionally, a given client computing device 5210, 5200 provides a computing platform for compiling and/or executing certain programs and/or programmatic scripts, receiving and sending certain communications, performing video/image processing tasks, identifying distinct markers from recorded infrared light, calculating marker positions in space, performing math computations, enabling the displaying/rendering of certain images (e.g., rendering virtual worlds or augmented images), etc. For example, a given client computing device 5210, 5200 may include a 3D rendering engine, a 3D sound engine, a virtual reality execution engine, an avatar engine, a simulation state synchronizer engine, a session manager engine and/or a network interface.

Figure 32:
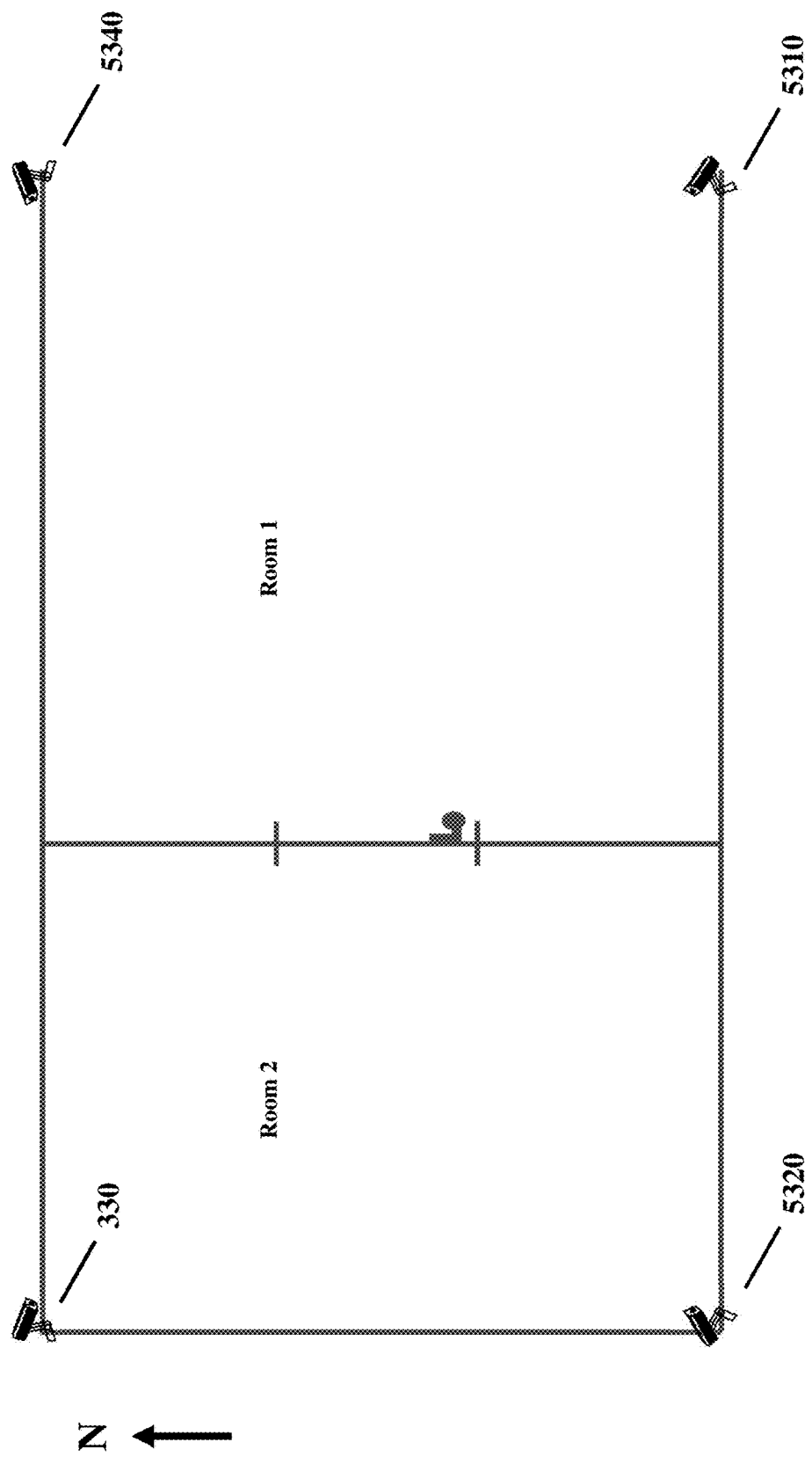
FIG. 32 illustrates an example operating environment of a precision positioning tracking motion capture system of a clustered system.

FIG. 31 also illustrates an optional element of the cluster system, a plurality of motion capture cameras 5310, 5320, 5330, and 5340. Motion tracking is a crucial component of most virtual reality systems. By tracking the position and orientation of the user, the cluster system can control the simulation's viewpoint such that the user can navigate through the virtual world just as naturally as they would navigate through the physical world. In addition, tracked movements of an individual in the physical world may be mapped onto certain movements of an avatar in the virtual world. Optionally, these motion capture cameras 5310-5340 are connected physically via cabling or wirelessly to the data network 5250 and/or directly to the master server 5200, client 5210, and/or client 5200. Optionally, the video output and/or detected marker identities and marker positions are streamed from the cameras 5310-5340 to the master server computing device 5200 and/or the client computing devices 5210, 5200 as further described herein below. Optionally, a plurality of motion capture cameras are positioned above and/or reside within a staging area in which VR session users participate in a simulation. FIG. 32 illustrates an example camera positioning in a simulation. By way of example, multiple (e.g., 2, 4, 6, 8, 9, 10, 11, 12) tracking cameras (e.g., precision position tracking (PPT) cameras, such as the PPT X™ precision motion tracking cameras from WorldViz LLC of Santa Barbara) may stream live video to a master server computing device 5200, or a client computing device 5210, 5200, which are provisioned with virtual reality tracking software (e.g., the Vizard VR' toolkit or PPT Studio from WorldViz LLC of Santa Barbara; dll for Windows; C source library for Linux) capable of image processing live video images in substantially real-time.

Optionally in addition or instead, a dedicated computing device 5230 (e.g., a laptop, PC, smartphone, server, etc.) may be optionally provisioned with the virtual reality tracking software (e.g., Vizard VR and/or PPT Studio from WorldViz LLC of Santa Barbara) capable of processing the received live camera output stream in substantially real-time. Optionally, the motion capture cameras record image data including emitted infrared light in a tracking area. Optionally, the recorded image data is provided (e.g., streamed) to the computing device 5230 or other computing device via a data network (e.g., 5250). Optionally, the computing device receiving the image data has certain software (e.g., PPT Studio software from WorldViz LLC of Santa Barbara) capable of determining from the image data, a position and identity for each infrared marker in the field of view/tracking area of the motion capture cameras.

Optionally, the calculated/determined/derived marker position and identity information (e.g., tracking data) may be used (e.g., by the computing device) to render a change in a scene or orientation of a scene as viewed by a user (e.g., in a head mounted display or other display). For example, infrared markers may comprise light emitting devices (LED) which may be configured to be attached to or mounted on an item worn by the user (e.g., headgear). Optionally, a marker device can be attached to articles of clothing and/or strapped or otherwise attached to or physically associated with a user. Optionally, an infrared marker tracking device includes two or more light emitting components attached to one or more items worn by the user and the system tracks the light source in three dimensions to determine the user's movements in time. Optionally, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user may be modified to simulate the sideways movement of the user (e.g., displaying an image behind a tree which was obstructing the user's view prior to the user's sideways movement).

For example, the virtual reality tracking software 5660 may incorporate a visual tool for configuring devices that the VR tracking software supports, including displays (e.g., head-mounted displays, multi-screen projection walls, consumer 3D monitors), trackers (head trackers, gloves, full body motion capture), and input devices (e.g., wands, steering wheels, gamepads, joysticks, etc.). The VR tracking software may enable editing of transform nodes (e.g., position, rotation, scale), clone/copy nodes, rename nodes, delete nodes, insert new group/transform nodes, and add/remove/modify descriptors. The VR tracking software may, enable the layout of a virtual scene by combining and arranging multiple independent 3D models. The VR tracking software may enable a given virtual reality scene or objects to react to a user's natural body motions. Thus, for example, the VR tracking software may enable a user to interact with head, hands, and feet with virtual objects in a manner similar to real objects to provide a convincing sensation of telepresence. The VR tracking software optionally provides full body motion capture technology that delivers full human presence for both first person point of view and third person points of view experiences. The VR tracking software optionally enables the integration of live full feature avatars.

Other optional features of the PPT X cameras of the clustered system may include some or all of the following: charge-couple device camera sensors; three degrees-of-freedom positioning; six degrees-of-freedom (X, Y, Z, yaw, pitch, roll) positioning with an optional sensor; approximately 5 meter, 15 meter, 30 meter camera range and a recommended tracking space of approximately 10 meters by 10 meters by 10 meters, or other tracking space; multiple (e.g., 2, 4, 6, 8, 9, 10, 11) independent three degrees-of-freedom tracking targets (where, for a marker to be tracked, preferably the marker is visible by two or more cameras); tracking precision of approximately less than 0.5, 1, 2, or 5 millimeters over a 3 meter by 3 meter by 3 meter volume; optical sensor precision may be about 1:10,000, 1:20,000, 1:30,000 arc at 75 percent; tracking accuracy of approximately less than a 0.1, 0.5, or 1 centimeter over a 3 meter by 3 meter by 3 meter volume; a field of view of 60, 68, 75, or 80 degrees horizontal (standard) and 80, 88, 95 degrees horizontal (wide) for each camera (and not, for example, the resulting trackable space of the system of cameras); less than 30 seconds, one minute, or two minutes calibration using a digital calibration rig; a 30 HZ, 60 Hz, or 120 Hz update rate; a centralized computing device for image processing; a maximum cable length to cameras of approximately 15 meter, 30 meters 50, meters, or 75 meters; analog camera interface; minimum latency of 10, 18, or 30 milliseconds; interface options (e.g., RS-232, USB, Bluetooth, WiFi, etc.), 115.2 kilobits per second, streamed or polled and Ethernet; and, ambient conditions utilizing indoor fluorescent or other lighting; camera size of 160 by 70 by 60 millimeters and weighting 500 grams. It is understood that dimensions, ranges, and components, other than those recited above, may be used.

Optionally, high performance precision position tracking (PPT) cameras (e.g., 1-32 high performance Precision Position Tracking cameras, such as the PPT E™ precision motion tracking cameras from WorldViz LLC of Santa Barbara) configured to record image data, detect infrared light, and determine the identity and position of detected infrared markers and output stream two dimensional centroid coordinates of the detected infrared markers in the camera field of view (e.g., as similarly described above for the PPT X but via onboard camera image/video processing in the case of PPT E), among other features, to the master server computing device 5200 and/or the client computing device 5210, 5200. Optionally, the marker position data (e.g., tracking data) may be used (e.g., by the computing device) to render a change in a scene or orientation of a scene as viewed by a user (e.g., in a head mounted display or other visible display). Other features of the PPT cameras of the clustered system may include some or all of the following: color or black and white complementary metal-oxide-semiconductor camera sensors; three degrees-of-freedom positioning; six degrees-of-freedom (X, Y, Z, yaw, pitch, roll) positioning with an optional sensor; approximately 5, 10, or 20 meter camera range or other working camera range, and a recommended tracking space of approximately 20 meters by 20 meters by 10 meters, or other tracking space (where, for a marker to be tracked, preferably the marker is visible by two or more cameras). Overall tracking space dimensions may be determined by the camera range, camera layout, and background lighting. Other optional features may include 1-32 independent three degrees-of-freedom tracking targets; tracking precision of approximately less than one-quarter of a millimeter over a 3 meter by 3 meter by 3 meter volume; optical sensor precision is 1:20,000 arc at 75 percent; tracking accuracy of approximately less than a quarter of a centimeter over a 3 meter by 3 meter by 3 meter volume; a field of view for a given camera of 79 degrees horizontal (standard) and 98 degrees horizontal (wide) for each camera (and not, for example, the resulting trackable space of the system of cameras); less than one minute calibration using a digital calibration rig; 180 Hz update rate; centralized computing device for image processing; maximum cable length to cameras of approximately 200 meters; analog camera interface; minimum latency of approximately 20 milliseconds; interface options include Ethernet, using VRPN (Virtual-Reality Peripheral Network); compatibility with certain ambient conditions (e.g., indoor fluorescent lighting); and camera size of 45 by 32 by 92 millimeters and weighting 145 grams. It is understood that dimensions, ranges, and components other than those recited above, may be used, such as those discussed with respect to other embodiments.

As previously described herein, the motion tracking cameras 5310-5340 record emitted infrared light pulses (e.g., emitted infrared light pulses) from tracking emitter devices associated with a VR participant. An example tracking device which emits trackable infrared light signatures is a wireless Precision Position Tracking (PPT) device, PPT Eyes™, from WorldViz LLC of Santa Barbara. The PPT Eyes is a motion tracker mountable to 3D glasses or VR head mounted displays which provides wide-area tracking and can be integrated with or attached to display headgear enabling the tracking of a user's head and/or body movements when combined with virtual reality tracking software. The tracking software, which optionally executes on board the camera 5310-5340, on the master server 5200, a stand-alone computing device/server 5230, and/or client computing device 5210, 5200, is capable of identifying via the streaming camera video the one or more markers of the PPT devices.

Other features of a head mountable wireless PPT device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (with low intensity setting) with a range of more than 20 meters (with high intensity setting) without impacting performance; optionally factory or self-mounted onto commercially available passive and active 3D glasses; automatic "go-to-sleep" mode if not moved for a first period of time (e.g., 30 seconds), and turn off after a second period of times (e.g., 10 minutes) to save on battery power; user switchable between USB charge mode and USB power mode; easily reprogrammable device settings (sleep mode and turn-off timer periods, LED Identifiers, LED light intensity) via a simple application (or via software toolkit from WorldViz LLC of Santa Barbara) wherein the device is connected to a user's computer via a wired or wireless interface (e.g., a micro USB port); compatible with a plurality of protocols (e.g., TrackD, VRPN, WorldViz PPT Studio™, etc.); six degrees-of-freedom (X, Y, Z, yaw, pitch, roll) enabling the full determination of left/right eye locations needed for stereoscopic viewing; angular range of a full 360 degrees—all axis; tracking precision of approximately less than a quarter of a millimeter over a 3 meter by 3 meter by 3 meter volume with a rotation precision of 0.09 degrees; position accuracy of approximately less than a quarter of a millimeter over a 3 meter by 3 meter by 3 meter volume with a rotation accuracy of one degree RMS yaw, one quarter of a degree RMS roll; update rate of 180 Hz); latency of no more than 20 milliseconds; light weight 30 grams (with two infrared diffusion balls); device size of 203 by 14 by 32 millimeters; active LED mode (PPT Marker IDs). It is understood that dimensions, ranges, and components, other than those recited above, may be used, such as those discussed with respect to other embodiments.

Optionally, the motion tracking cameras record emitted infrared light pulses from tracking devices held by a user. An example handheld tracking device which emits trackable infrared light signatures may be a wireless Precision Position Tracking (PPT) Wand™ from WorldViz LLC of Santa Barbara. The PPT Wand is a wireless, battery powered wand. The wand provides interaction and navigation in immersive virtual reality systems and may include a joystick/pad and trigger enabling hand tracking and hand grabbing and/or moving of virtual objects. Other optional features of a handheld wireless tracking device may include some or all of the following: a rechargeable (e.g., lithium ion) battery endurance of 8 hours with a range of more than 20 meters without impacting performance; an ergonomic one-handed design, vibrant button touch, and a multitude of input modes; automatic "go-to-sleep" mode if not moved for one minute, and turn off after 10 minutes to save on battery power; user switchable between USB charge mode and USB power mode; easily reprogrammable wand settings (sleep mode and turn-off timer periods, LED Identifiers, LED light intensity) via a simple application (or via software toolkit from WorldViz LLC of Santa Barbara) wherein the wand is connected to a user's computer (e.g., wirelessly, via a micro USB port, or via other interface); compatible with a plurality of protocols including TrackD, VRPN, and WorldViz native PPT protocol; six degrees-of-freedom (X, Y, Z, yaw, pitch, roll); angular range of a full 360 degrees—all axis; tracking precision of approximately less than a quarter of a millimeter over a 3 meter by 3 meter by 3 meter volume with a rotation precision of 0.03 degrees; position accuracy of approximately less than a quarter of a millimeter over a 3 meter by 3 meter by 3 meter volume with a rotation accuracy of one degree RMS yaw, one quarter of a degree RMS in pitch and roll; update rate of 180 Hz with PPT E series); latency of 20 milliseconds with PPT E series; light weight 196 grams; wand size of 239 by 65 by 110 millimeters; passive and active LED mode (PPT Marker IDs). It is understood that dimensions, ranges, and components, other than those recited above, may be used, such as those discussed with respect to other embodiments.

Other optional motion tracking features which can be employed in the clustered system include but are not limited to: inertial-based motion tracking, magnetic-based motion tracking, optical motion tracking, motion capture suits, and/or other motion tracking systems that may be utilized in virtual reality applications.

In the example clustered system, certain input devices may be provided for a user to manipulate (e.g., by one or more of the following: grasping, placing an object, finger flexion, abduction between fingers, thumb crossover, palm arch, wrist flexion, wrist abduction, etc.) the environment during a virtual reality session. For example, the input device may include one or more of the following examples: gamepads, joysticks, mouse, keyboard, haptic glove, wand, and/or other input devices used to manipulate an environment that may be utilized in a virtual reality application.

In the example clustered system, certain displays may be employed to present a virtual reality experience to a user including but not limited to: stereophonic displays (e.g., Oculus), a Cave Automatic Virtual Reality (CAVE) 3-dimension projector system with single display wall, a 2-dimension monitor, a 3-dimension monitor, and/or other display devices that may be utilized in a virtual reality application. Optionally, the cluster system integrates motion tracking to enable certain displays, including 2-dimensional displays, to render the worlds appropriately so that users feel as though they're looking beyond the wall into the virtual world (e.g., the images adapt to movement so that users feel more like they are looking through a window than looking at a picture).

Example Multi-User Embodiment

An example of a collaborative Virtual Reality (VR) session illustrates certain optional features and advantages of the system in which user actions and display of such actions are synchronized across varying hardware devices with minimal programmatic and configuration effort on the part of VR developers/content creators. Advantageously, because the example clustered system manages the underlying communications, the simulation execution and control, and the Avatar positional changes for each participant in a multi-user simulation, the system enables VR creators to focus their efforts on the content of a simplified simulation scenario/environment (including for example, a single-user simulation). Further, this example embodiment illustrates a novel approach to a multi-user simulation environment which enables local contextual computing in association with each VR participant in order to present certain aspects, for example participant's actions of a first type, of the simulation in substantially-real time (e.g., with minimal display delays and/or communication latencies, such as those that would not be perceived by a user) to the VR participant. By contrast, certain other aspects of the simulation, for example participant's actions of a second type, are only partially processed in a local context or are not processed at all in the local context but rather are processed in a remote context. Tracking data associated with the second type of participant's action may be transmitted to and received at a master server for centralized processing (e.g., at a master server) and then scene rendering content changes are performed by the master server and distributed, over a communication medium (e.g., a data network), to each client participant in the multi-user session. Therefore, in certain simulations, the data sent between the master and clients is primarily limited to the position and orientation of the participants of the simulation.

Figure 30:
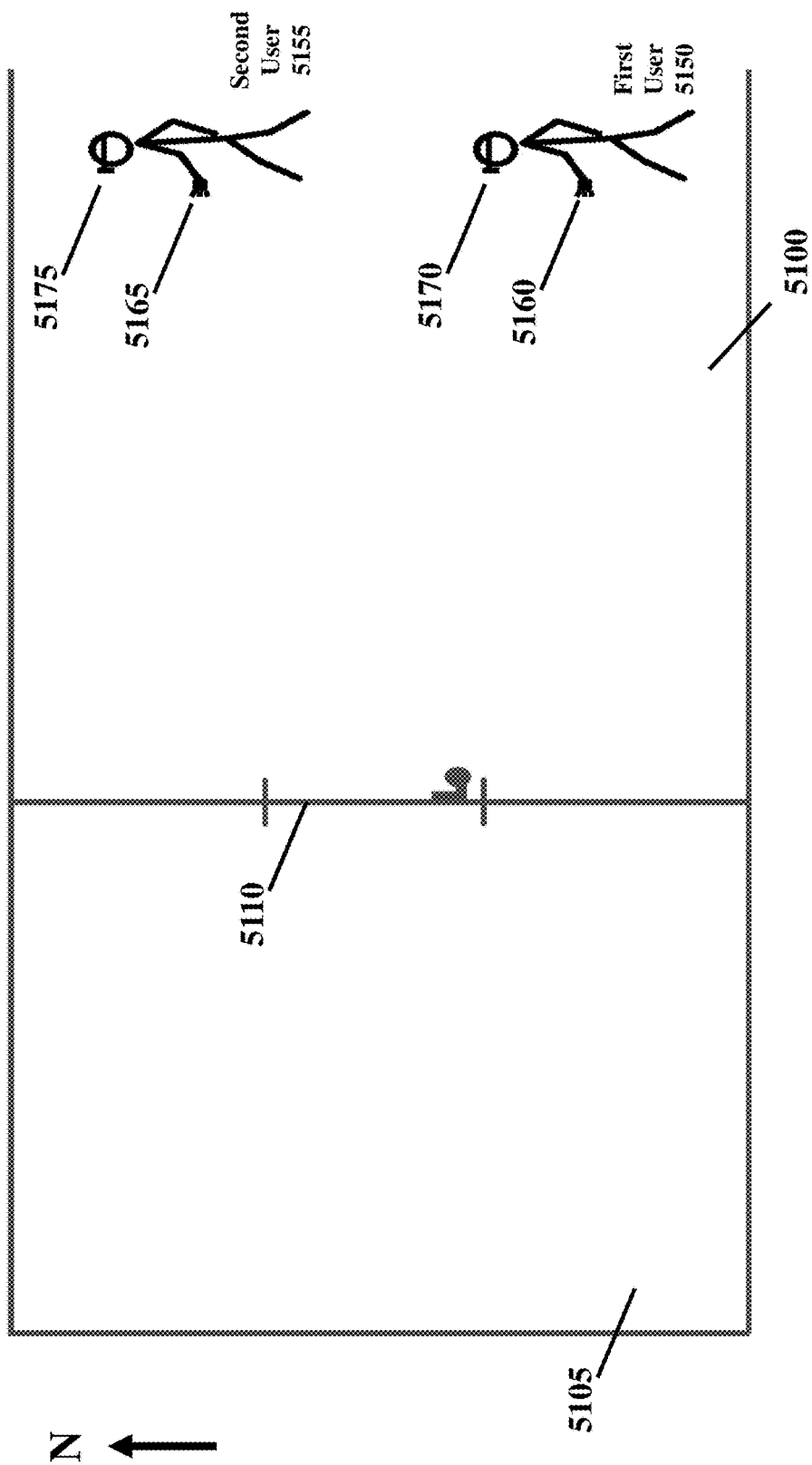
FIG. 30 illustrates an example embodiment of a virtual reality scenario.

In this illustrative example, two users experience an interactive VR session (hereinafter referred to as a simulation or VR simulation) in which the users begin in a first room and one user walks into a second room (it is understood that this example assumes two users for clarity, although other scenarios may have more than two users). FIG. 30 illustrates a configuration of the two rooms 5100, 5105 of the simulation. Room 5100 is configured with a sliding door 5110 which enables a user to walk from Room 5100 to Room 5105 upon opening the sliding door 5110. In this example, the sliding door 5110 and the wall separating Room 5100 and Room 5105 are merely a simulation as there is no physical wall separating Room 5100 and Room 5105 in the real world (although Rooms 5100 and 5105 may be physical, real world rooms). Further in this example, Room 5105 is configured with the adjoining sliding door 5110 and a physical chair 120 facing the door 5110, as illustrated in FIG. 30. In addition, in this example, the sliding door 5110 slides opens in response to the application of a left-to-right hand movement from a user and automatically closes from right-to-left when no pressure is applied to the door or door handle. In this example, a first user 5150 is initially positioned to the left of a second user 5155 and, correspondingly, the second user 5155 is positioned to the right of the first user 5150. Both users begin the VR session/simulation at the eastern portion of the room, each facing west towards the sliding door 5110.

In this example, a system of four tracking cameras 5310-5340 (e.g., a motion capture system including, for example, a PPT X camera system running at 60 Hz or a PPT E camera systems running at 180 HZ, both from WorldViz, LLC of Santa Barbara, Calif.) are configured in the VR session in order to track certain user movements of the first 5150 and second 5155 users via a set of trackable infrared LED markers attached to or configured in association with each user, see also FIG. 32. For example, a precision positioning tracking device, such as the PPT Eyes tracking device from WorldViz, may be affixed to a wearable head mounted display 5170, 5175 of each user to track each user's head and body movements/travel. In this example, each user's right hand is configured with a haptic glove 5160 and 5165 respectively, where the haptic glove is configured to simulate a touch sensation when a user interacts with an object in the simulation to enable a wearer to "feel" a virtual object as if it really existed, and wherein the glove further includes a one or more trackable infrared LEDs and/or finger movement sensors.

In this example, at least four separate computing devices and/or computing servers 5200, 5210, 5200, and 5230 are employed in the simulation as previously described herein, see also FIG. 31. In this example, computing server 5200 is configured as a master computing server and is provisioned in association with server program software 5205 (e.g., WorldViz cluster master from WorldViz LLC of Santa Barbara). In this example, computing device 5210 (e.g., a Graphic Processing Unit (GPU), a processing unit to provide rapid visual/display processing) is provisioned in association with a software client 5215 (e.g., a WorldViz cluster client from WorldViz LLC of Santa Barbara) and wherein the client is configured in a client-server relationship with master server software 5205, as further described herein below. Similarly, in this example, computing device 5200 (e.g., a GPU) is provisioned in association with a software client 5225 (e.g., a WorldViz cluster client from WorldViz of Santa Barbara) and wherein the client is configured in a client-server relationship with master server software 5205, as further described herein below. Each of the three computing devices are interconnected via a local-area or wide-area data communication network 5250 as further described above.

In the example embodiment, the cluster system performs a set of initialization and/or connection acts, such as a simulation launch, followed by the actual simulation. These initialization and launch acts, and the simulation of the example embodiment are further described below.

In this example, the master server 5205 and clients 5215, 5225 initialization precedes the client-server connection process. Optionally, the connection process precedes the initialization process. Optionally, the initialization process may be manually performed by a user (as opposed to being automatically performed by the system) and occurs independent from any client-server binding/association.

Virtual Reality Initialization

As previously mentioned herein, clustering environments enable the distribution of computational tasks across multiple computing resources within a network of computers, thus, enabling the simulation of computationally expensive virtual/augmented reality worlds. To avoid bogging down the network (e.g., creating network latencies) during a simulation the amount of data that each computer transmits and receives is minimized. This is accomplished by, for example, loading the virtual world on each computing device and then pass only the data that is unique to the local/client computer. In this example, the master server 5200 and each client 5210, 5200 are initially seeded with a set of identical copies of executable programmatic code and associated data (e.g., resource files and modules), which is loaded during the initialization process or during runtime. This limits the primary communications between the master server 5205 and clients 5215, 5225 during the VR session to synchronization calls which keep the viewpoint and scene-graph states identical across all clients in the multi-user VR simulation. The synchronization may be performed in substantially real time (so that any delay is not perceptible or is barely perceptible, to users). Optionally, resources, such as models, textures, and audio files are not generally transmitted from the master to clients during the VR session.

Optionally, the resources needed for the simulation in this example are downloaded from the master server's data store 5202 to the clients and stored in each client's data store 5212, 5222, wherein the data stores comprise computer memory and can be configured as a general purpose file system, tables, flat databases and/or SQL databases by way of non-limiting illustrative example. Optionally, to avoid distributing/downloading/uploading files and/or copies of files across computing servers and computing devices, a file sharing network with a common data store may be employed with absolute, full network paths (e.g., beginning with a drive letter followed by the rest of the path) or relative paths (a path relative to the current directory) to the stored resources specified at each participating computing server and/or computing device.

Optionally, the simulation initialization is initiated in response to a user/administrator selection (e.g., the first user 5150, the second user 5155, or a third user) of a control at the master server 5205. The master server 5205 downloads to each client computing device 5210, 5200 the executable code and resources to be used in the VR simulation. Upon receipt of the executable code and resources, each networked client 5215, 5225 loads their respective data store 5212, 5222. Optionally, the code and resources are downloaded directly by the master into the data store 5212, 5222). Optionally, any problems and/or detected errors in loading the code and resources are reported to the administrator/user who initiated the download such that the administrator/user can take corrective action. Optionally, each client in the network of clients (e.g., 5215, 5225) independently requests (e.g., via a user interface control of the software clients 5215, 5225) the master server 5205 to initialize each client's respective data store 5212, 5222. Optionally, any or certain detected errors in client initialization are displayed to the associated client administrator/user and/or the administrator/user of the master server 5205 in order to take corrective action. When initialization completes (e.g., without fatal errors), the clients 5215, 5225 are data store synchronized with the master server 5205 and the initialization step is complete.

Cluster Connection Management

The cluster client software program enables a client computing device to receive signals/requests/messages to launch a simulation (e.g., to receive a signal from an associated/bound master server software program) and synchronize user actions during a launched simulation (e.g., via a synchronous (sync) update from an associated/bound master server program). In this example, the users 5150, 5155 launch their respective client software programs 5215, 5225.

The master server software program enables a master computing device/server to send signals/requests/messages to launch simulations (e.g., to send a signal to one or more associated/bound clients) and synchronize user actions across the associated/bound client programs. In this example embodiment, a user (e.g., users 5150, 5155) or an operator launches an instance of the master server software program 5205 on the computing server 5200. Optionally, the master server program 5205 displays, via a user interface, the computing devices 5210, 5200 that are connected over a communication medium (e.g., a local-area or wide-area data network) and that are running the cluster client software programs 5215, 5225. Optionally, the master server program 5205 user interface displays the IP address of the data connected computing devices/servers and the name of each client 5215, 5225. Optionally, the server program 5205 provides an add control (e.g., a check box control) by which a user 5150, 5155 or an operator of the cluster computing system can associate/bind a given client with the master server in the network of connected clients. Optionally, more than one instance of the client software program can be launched per computing device/computing server, including the master server 5200. Optionally, the master server program 5205 enables, via a user interface, a user/operator to specify a data communication port (e.g., a TCP/IP port) in which the associated/bound master server and client programs can communicate over a local-area or wide-area data network. Optionally, the master server program 5205 enables, via a user interface, a user/operator to refresh the list of connected clients by, for example, broadcasting a message to the cluster clients and waiting for their response.

Optionally, the master server program 5205 provides certain cluster synchronization processes to ensure the multi-user VR session is reliably and timely synchronized across all clients. If for example, a client were to fall behind with respect to rendering or enable rendering in a multi-user session, the VR experience for the lagging client, and other participants viewing the client, might seem sub-optimal, unrealistic and/or sluggish. These processes optionally include but are not limited to: sync frames, sync draw, and sync resources. Optionally, if the sync frames process is enabled via a user interface of the master cluster 5205, each client computing device/server blocks (e.g. delays a period of time, delays until a condition is satisfied, delays until a signal is received, delays until a routine completes, delays until a message is received, etc.) at the end of each frame until all other computing devices/servers finish processing their updates for that frame (as determined by the master server program 5205 by, for example, receiving a frame update complete message from each client or its equivalent (e.g., a function call unblocks)). For example, in a blend screen simulation configuration, it may be the case that a client would prefer a drop in frame rate rather than ever seeing a discrepancy (e.g., a screen tear) across blended or butted displays. Optionally, if sync draw is enabled and sync frames is enabled, in addition to blocking until all updates are complete, the client computing device/servers 5215, 5225 will optionally also block until all other client computing device/servers 5215, 5225 finish rendering their respective frame. Optionally, if the sync resources function is enabled, all resources in a script/executable code folder are automatically synchronized with the connected clients when running a VR simulation/session. Optionally, when the resource syncing function is enabled, a resource filter can be configured/programmed by the user/operator to block certain file types from being synced from the master with the clients. For example, a user can exclude log files from being sent to a specified client or all clients (e.g., to reduce network congestion and latencies). Optionally, multiple filters can be configured/programmed to restrict more than one type of resource (e.g., models, textures, etc.) synchronization with connected clients.

Optionally, the master server program 5205 executing on the master server provides certain cluster session timer controls to ensure the multi-user VR session is adequately synchronized across all clients. A synchronization timeout or series of synchronization timeout events may cause an operator or user of the VR session to halt the VR session and take corrective action to repair the troublesome client(s).

Optionally, the master server program 5205 enables a user/operator to change a default time period (e.g., 100 milliseconds, 500 ms, 1 sec, etc.) the cluster master and client program will wait after a timeout occurs before attempting to establish a data connection (e.g., a TCP/IP data connection) to attempt synchronization. Optionally, in the event of a timeout, the cluster master 5205 and/or client program 5215, 5225 will automatically retry synchronization a configurable number of automatic retries before determining that the problem that caused the timeout is not correctible without further action. Optionally, a failed retry and/or a failed connection attempt is reported to the user/ operator of the client and/or master server as an alarm/error (e.g., via a user interface displayed on a display and/or via an audible alert) and/or logged as an error to an error log file.

Optionally, the master server program 5205 enables a user/operator to change, via a user interface, a default time period which the cluster master 5205 and client program 5215, 5225 will wait to finish sending/receiving messages for each frame in a VR session (e.g., 100 milliseconds, 500 ms, 1 sec, etc.). Optionally, in the event message sending and/or receiving for a frame exceeds a specified default time limit, a failed frame alarm/error may be reported to the user/operator of the client and/or master server (e.g., via a user interface displayed on a display and/or via an audible alert) and/or logged as an error to an error log file.

Optionally, the master server program 5205 enables a user/operator to change a default time period the cluster master 5205 and client 5215, 5225 programs will wait for synchronization to complete at the end of each frame (e.g., 100 milliseconds, 500 ms, 1 sec, etc.). Optionally, in the event the synchronization for a frame exceeds the specified default time limit, a failed frame alarm/error may be reported to the user/operator of the client and/or master server (e.g., via a user interface displayed on a display and/or via an audible alert) and/or logged as an error to an error log file.

Optionally, during the initialization and/or connection process, an exchange of resource types and/or hardware component types and capabilities occur between the master server program 5205 and associated clients programs 5215, 5225. For example, the resource and hardware exchange can include the manufacturer and model of the client head mounted display, the pixel resolution of the client display, the make and model of the graphic processing unit, the make and model of a hand held wand used in association with a client, etc.

Virtual Reality Rendering Startup

In this example, after the initialization and connection processes are complete, the master initiates a second command or sequence of commands to cause the clients to load the executable code of the VR scene in the render engine of each client computing server 5210, 5200. Optionally, any problems and/or detected errors in loading the VR scene into the render engine are reported to the first user 5150 and second user 5155 via the user's head mounted display 5170 and 5175, respectively, and/or a separate console/monitor of the client computing server 5210, 5200. Optionally, any detected problems and/or detected errors are mirrored to and/or exclusively provided to the master server program 5205. Optionally, any detected errors are logged to the master server's data store 5202 and/or displayed via a console/monitor to an operator of the master server 5200. Optionally, the master server program 5205 takes certain automatic action to repair detected errors, including for example, reloading the render engine of the client 5210, 5200, optionally, with certain modified parameters. Optionally, the master server program 5205 waits for a repair action to be initiated by the operator. Optionally, each client in the network of clients independently loads their respective render engine. After each client's render engine is loaded, the multi-user simulation is ready to begin.

Virtual Reality Simulation

The cluster system is used to share the rendering of a scene across multiple image generators and/or display screens. The cluster system, and in particular the master server software 5205, manages the viewpoint, or the rendered view, of each connected client, for example, by sending a sync command with certain position and orientation matrices of one or more avatars associated with the VR scene. By having the master perform certain computational tasks as described herein, the client's computational load is reduced enabling the clients to run more efficiently. Advantageously, as previously described herein, the rendered view is optionally further converted by the master server program 5205 to a set of commands/formats compatible with the hardware of a given client based on an identification of the client hardware/software obtained during initialization or registration (e.g., the pixel resolution of the client display, the display type, etc.). Further, because the cluster system as a whole performs the motion capture tracking, image processing, position calculations, etc., and converts the received input into perspectively correct renderings for each client's view, the VR program creator is divorced from these low level technicalities and instead interfaces with an abstracted view of the cluster system, and can thus focus on other aspects of the simulation (e.g., the simulation model, training tasks to be achieved by the simulation, the simulation scripting, etc.).

As previously described, the cluster system may optionally cause the rendering of certain aspects of the VR simulation to occur on the computing device/server of the client (e.g., computing in a local context), independent from, and not immediately synchronized with other participants in the VR session. This local context position determination and image rendering will hereinafter be referred to as "privileged." Privileged operations and/or rendering enables the cluster system to provide immediate display/action feedback to the user (this can also be characterized as "high frequency" feedback) with little or no human perceptible latency (e.g., less than 10 ms, less than 5 ms, less than 1 ms), thereby enabling the simulation to feel as lifelike as possible.

An example of an action that may be treated as privileged is a rotation of a user's viewpoint display (e.g., a user wearing a head mounted display, configured with PPT emitters, looking to the right, left, up, down, etc.). It has been determined through research that if latencies in a visual rendering of a scene in response to a head movement exceed approximately 10 milliseconds, then the rendering of the virtual scene is no longer indistinguishable from a real scene from a participant's perspective. Depending on the individual and the task at hand, the discrepancy from a real scene as detected by the human visual system may lead to disorientation or sub-optimal performance. Therefore, in many types of simulations this action type may be configured to be privileged. Another example of an action which may be treated as privileged is tracked travel (e.g., walking) of a user. In both of these example privileged actions, the received tracking and positioning/orientation change data of the user are processed and rendered substantially immediately in a local context by the client computing device associated with the user.

Notably, the cluster system enables a first party to the system (e.g., a user, a participant, an operator, a content creator, and/or a developer/scripting agent, etc., or any combination thereof) to define/configure/program/designate the system to cause certain aspects or elements of the VR simulation to be rendered in a privileged manner. Optionally, the cluster system recommends to the first party, via a user interface displayed on a display, which aspects/elements should be privileged based at least in part on certain predefined, detected, and/or measured criteria including, for example, a measured latency of a network connecting the computing devices and/or tracking cameras that exceeds a specified threshold, or based at least in part on a measured processing latency of a connected computing device exceeding a threshold as determined, for example, by having the computing device perform certain computational operations. Optionally in addition or instead, the cluster system recommends to the first party which aspects/elements should be privileged based at least in part on the mass/size of a moveable virtual object and certain physics associated with an object (e.g., a large rock on a hill or a key in a lock). Optionally, in addition or instead, the cluster system recommends to the first party that certain predefined aspect/elements should be considered privileged such as head tracking, user travel, user limb movement, etc. Optionally in addition or instead, the cluster system recommends to the first party which aspects/elements of the system should be privileged based at least in part on the identification/detection of certain haptic devices (including, device make and/or model) on initialization wherein, generally, haptic devices are configured as privileged.

Optionally, the cluster system automatically configures for the first party certain aspects/elements of the system as privileged or not privileged based at least in part on one or more criteria described herein (e.g., measured latencies, measured processing capabilities, physics, haptic device outputs, etc.). For example, if the system measures a network latency between a master computing device 5200 and a slave/client computing device 5210, 5200 that exceeds 10 milliseconds (or other specified threshold) the computing device may be automatically configured to operate in a privileged manner with respect to certain functions/portions of the simulation (e.g., previously identified as critical or potentially privileged) to thereby provide relatively reduced latencies.

Optionally, the system may provide a user interface via which the first party may define/configure/program/designate the system to cause certain aspects of the VR simulation and/or elements of the simulation to be rendered in a privileged manner dependent upon the type of application. The system may receive and act on the information and commands provided via the user interface. For example, in a multi-user sport training simulation, ball physics may be privileged to each user client. In another example, in a flight vehicle simulator certain responses, say control yoke and side-stick, need to be privileged in order to provide a low latency, realistic experience, whereas the attitude and position of the virtual flight vehicle do not need to be privileged as some latency (e.g., up to 200 ms or other threshold), will not adversely affect the realism of the virtual reality experience. As described herein, head movement and travel may optionally be generally configured as privileged operations. Limb movements, may be generally configured as privileged operations but can also be configured as non-privileged given measured network latencies and computing device processing capabilities.

Taste and smell are not generally rendered visually per se and, therefore, may be categorized as non-privileged in the client-server cluster configuration domain (which may optionally categorize which aspects may be privileged and which aspects are never to be treated as privileged). However, with respect to sound in multi-user simulations, there are certain situations in which it may be advantageous for sound to be rendered in a local context or privileged operation. Optionally, sound rendering intended to convey accurate angular and distance cues (e.g., gunshots, car engine and tire sounds, the sound of an object striking a surface, a person speaking, a dog barking, a door opening or closing, footsteps, etc.) may need to be privileged operations (and so are categorized as potentially privileged) because they are susceptible to latency and may be closely synchronized with a corresponding visual rendering. Ambient sound, such as, for example, background noise or music with no pinpoint localization needed, can be configured as non-privileged operations (e.g., processed by a master server or enabled by a communication channel via the master server).

In the cluster system, once a position matrix (which may include orientation information) of an action (e.g., of a user, part of a user, or object, etc.) is derived from the received tracking data by a client 5215, 5225 for a privileged action, the position matrix is sent to the master server program 5205. Optionally, a client 5215, 5225 performs and transmits the position and orientation determination for each frame (or set series of frames) in order that the master server program 5205 has as much information coming in as possible about the privileged operation. The position matrix received from the client 5215, 5225, coupled with the position data of the other simulation users (e.g., previously stored position data or position data determined/derived from tracking data), enables the master server program 5205 to provide scene rendering information to each client 5215, 5225 wherein each client 5215, 5225 is configured to receive over the network scene position and orientation data suitable for local rendering (e.g., by a head mounted display or other display) and wherein the received client rendering information includes actions taken by other simulation users in a perspectively correct viewpoint. By way of illustration, an example of a perspectively correct viewpoint is where a virtual wall of the simulation may obstruct an observer's view of another user when the user travels, in the simulation, behind the virtual wall. In an illustrative example, the master server program 5205 may provide client 5225 position and orientation for the first user in a data array in response to certain conditions (e.g., frame event, time out event, set series of frames (e.g., 2, 3, 4, 5 frames, etc.), etc.) for local scene rendering. Similarly, the master server program 5205 may provide client 5215 with position and orientation for the second user.

Certain other VR actions may be considered and processed by the cluster system as non-privileged (e.g., remote or not in a local processing context). For example, the movement of a tracking wand or the movement of a user's hand may be categorized and treated as non-privileged. Non-privileged user action tracking data (e.g., marker tracking identity and position data received from motion tracking camera(s) or tracking computing server 5230) is processed by the master server program 5205 and positional scene changes/actions are identified for each connected client 5215, 5225 and downloaded (e.g., via a sync operation) to the connected clients for local context rendering (e.g., wherein each client 5215, 5225 is configured to receive over the network scene position and orientation data suitable for local rendering), including the client/user from which the action originated (as further described below).

In this example, each user is wearing a head mounted display 5170, 5175 with an attached PPT emitter (e.g., LED equipped PPT Eyes). Each user 5150, 5155 in this example, is also wearing a right-hand glove 5160, 5165 configured with finger motion sensors and one or more infrared LEDs. The LED(s) associated with the PPT emitter and glove may each emit a unique infrared light pattern/code (e.g., marker Identification (ID)) which is recorded by the tracking cameras. The light patterns emitted by the LEDs uniquely identify a user's head movement, user travel, and user's right hand movement. The PPT tracking camera output (e.g., either PPT X indirect output wherein the output may be processed by, for example, using PPT studio software using an intermediate computing device 5230 (e.g., a dedicated computing device or a shared computing device such as the server 5230 or PPT E direct output)) is received by the master server program 5205 and client programs 5215, 5225. The output from the intermediate computing device 5230 or direct output in the case of PPT E provides infrared marker identify and space position of the LED markers. The client programs 5215, 5225 similarly receive glove 5160, 5165 marker ID and finger movement sensor data.

Figure 33:
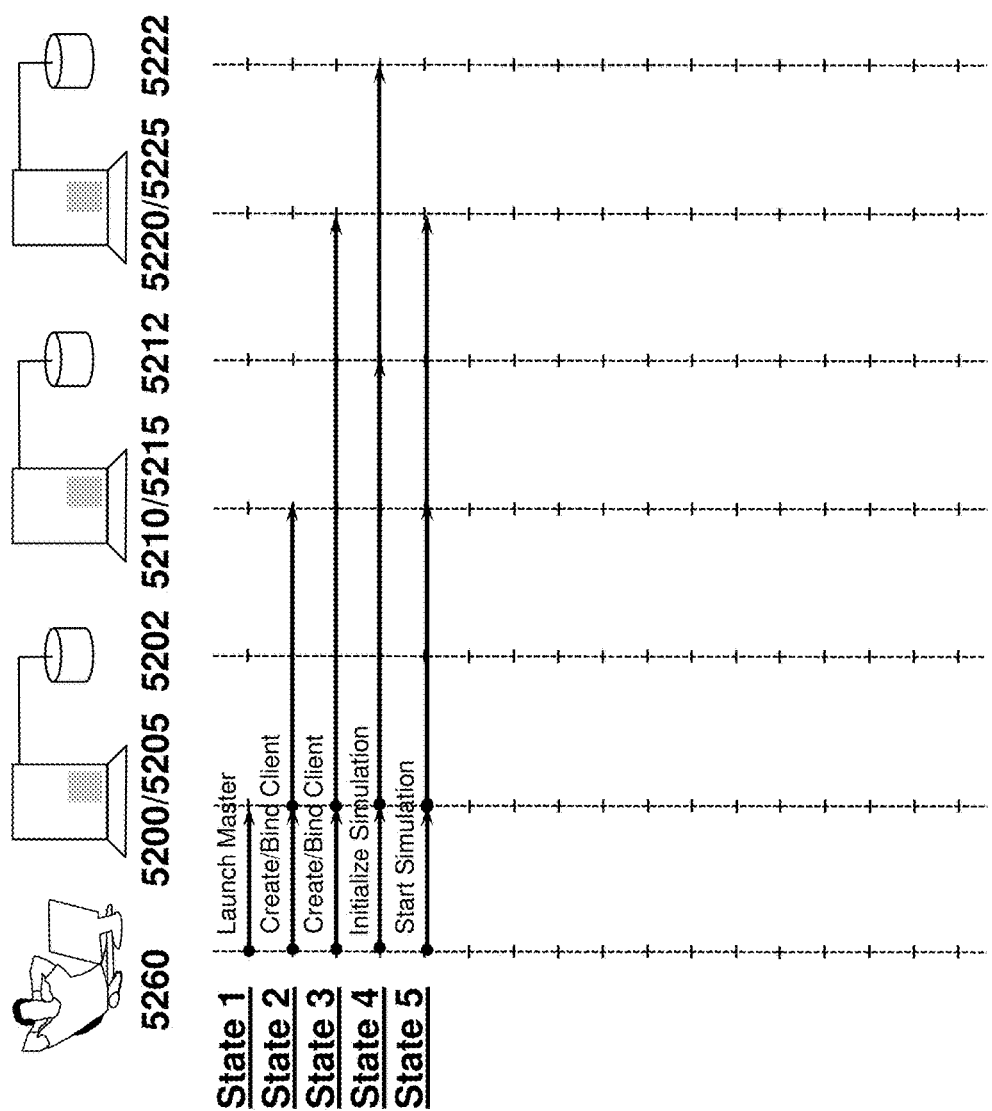
FIG. 33 illustrates a process of an example embodiment of a multi-user virtual reality example embodiment.
Figure 34:
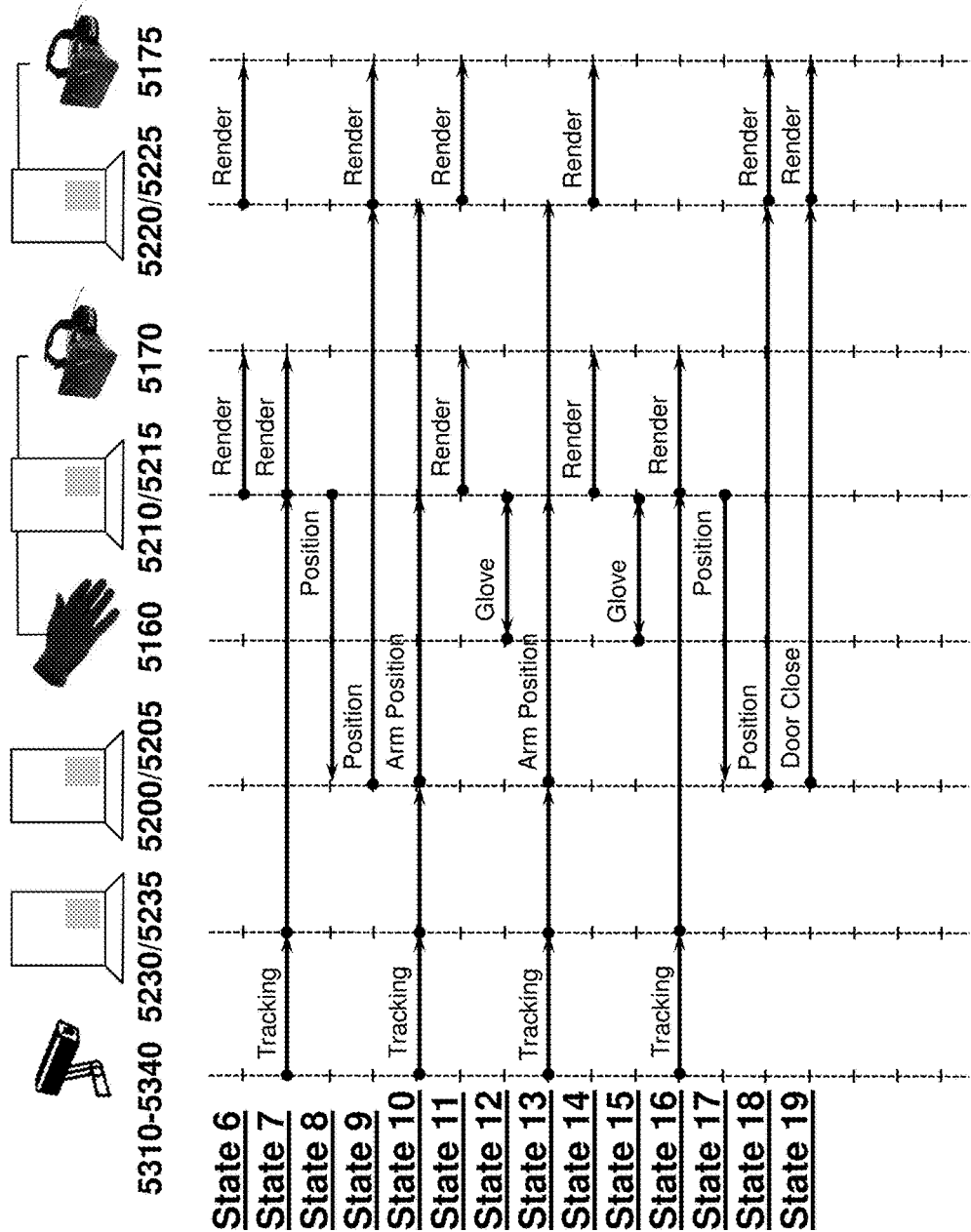
FIG. 34 illustrates a continued process of an example embodiment of a multi-user virtual reality example embodiment.
Figure 35:
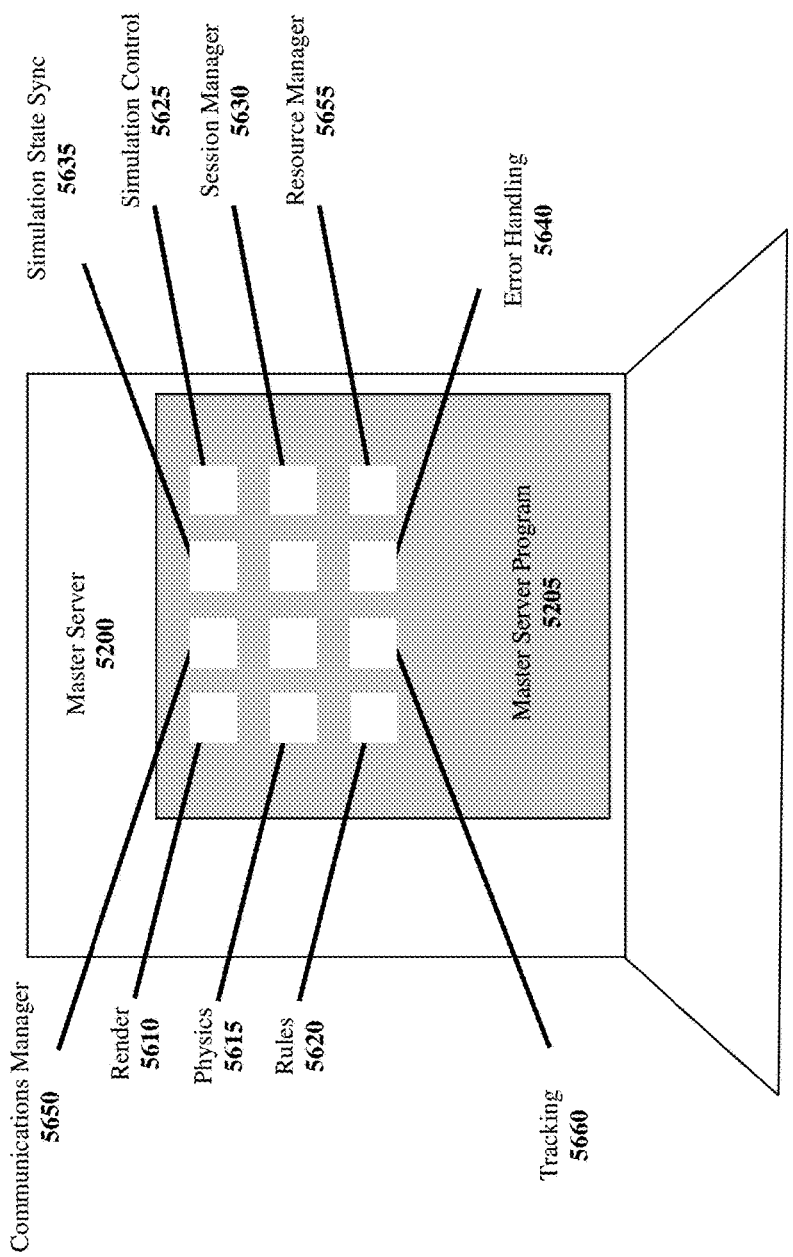
FIG. 35 illustrates an example configuration of software modules of a clustered system.

FIG. 33 and FIG. 34 illustrate a first example process workflow of the example clustered system discussed above. Process states are listed on the left and elements of the operating environment of FIGS. 1, 2, and 3 are listed across the top.

State 1 of FIG. 33. An instance of the master server program 5205 launches on the computing server 5200 (e.g., in response to a launch command provided by a system administrator via monitor 5260).

State 2. The master server program 5205 generates and provides for display a user interface on a console/monitor 5260 that identifies the network connected computing devices 5210 and 5200 (e.g., using differentiating identifiers, such as an alphanumeric name and/or an icon). The master server program 5205 receives, via the user interface, a selection by the system administrator of an add control, and in response, the master server program 5205 creates an instance of a client 5215 on the computing device 5210 and binds (e.g., creates a client-server association/linkage enabling the master to send master initiated requests and data over a communication channel and receive client responses, client initiated requests, and data or other computer programming methods of software program/module association as known to those skilled in the art of data communications and/or software development) the created client 5215 with the master server program 5205. In this state or an earlier or later state the configured clients 5215, 5225 and master server access configuration information indicating what types of operations associated with the simulation are privileged and what types of operations are non-privileged.

State 3. The actions of State 2 are repeated to create and bind client 5225 on the computing device 5200 with the master server program 5205.

State 4. The master server program 5205 initializes the simulation (e.g., in response to determining that the system administrator has selected an initialize control presented via a user interface of the master server program 5205 presented on console/monitor 5260), and downloads, over the network 5250, to each client computing device's data store 5212, 5222 executable code and resources to be used in the simulation. In States 1, 2, 3, or 4 (or in a separate state) the tracking cameras 5310-5340 are also initialized and calibrated (e.g., with respect to the marker tracking devices used in the simulation). In addition, the unique infrared marker IDs (e.g., by each marker emitting a distinctive pattern) of the tracking devices are associated with users 5150, 5155 and clients 5215, 5225, respectively.

State 5. The simulation session begins (e.g., in response to detecting that the administrator selected a user interface control of the master server program 5205 presented on console/monitor 5260 initiating a virtual world script on the master server 5205). In response to the control selection, the master server 5200 initiates a simulation in each client 5215, 5225 (e.g., via a sync call/command/instruction).

State 6 of FIG. 34. In response to the VR launch, a display/scene of Room 5100 is rendered (or caused to be rendered) in the head mounted display 5170, 5175 of each user 5150 (first user), 5155 (second user) via the client software 5215, 5225. In this example, the first user's viewpoint/display includes an avatar (e.g., a virtual representation) of the second user. The second user's viewpoint/display includes an avatar of the first user.

State 7. First user 5150 walks from the front (East side) of Room 5100 to the sliding door 5110. The PPT motion tracking cameras 5310-5340 (e.g., PPT X cameras) record the first user's 5150 steps, including in this example, the infrared light signal emitted by the tracking markers (e.g., a left marker and a right marker of a PPT Eyes tracking device) affixed to the Head Mounted Display (HMD) 5170. In this example, a computing device 5230 hosting a motion tracking software program 5235 (e.g. PPT Studio) performs certain operations on the camera video output, including but not limited to, one or more of the following: an analog to digital conversion of the captured video (using an analog to digital conversion device and/or conversion software), identification of marker patterns and from the marker patterns identifies each marker in the camera field of view, calculations of two dimensional centroids of marker positions, determine the center point position between the two markers of the tracking device (e.g., PPT Eyes tracking device), etc.

At least partly in response to accessing the privileged operation configuration information, the client 5215 executing on the computing device 5210 receives the tracking data from computing device 5230 and performs certain calculations with respect to the infrared markers associated with the first user 5150 to create a series of position matrices corresponding to the first user movement (e.g., wherein a given matrix may express the position/orientation coordinates in space of the first user 5150 in 5 degrees of freedom, x, y, z, yaw, roll, or other degrees of freedom) and a new viewpoint is rendered (and/or causes a new viewpoint to be rendered) in the client/display 5215, 5170 (e.g., via a local context privileged rendering operation as previously described herein).

The process of State 7 may be continually repeated as the first user 5150 travels/walks to the sliding door 5110 with the first user's head mounted display 5170 displaying an expanding view of the wall separating Room 5100 from Room 5105 and the sliding door 5110 (e.g., a scene of the simulation). Optionally, PPT E motion tracking cameras are used in place of or in addition to PPT X cameras, in which case the camera output includes marker identification and associated marker position data (including each marker position and/or a center point positon between two markers of a two marker tracking device) eliminating the need for the standalone computing device 5230 to perform the operations.

State 8. Once each new first user position matrix is determined/generated for the first user in State 7, the new position matrix is sent/streamed by the client 5215 over the data network 5250 to the master server program 5205. Optionally, the master server program 5205 receives the new position matrix in response to a server request/calling function.

State 9. With respect to the master server program 5205, the master server program 5205 receives the position matrices from the client 5215. With each received position matrix corresponding to the first user movement, the master server program 5205 generates, based at least in part on and taking into consideration the current position data (e.g., including head position and body location) of the second user 5155, a new orientation/position of the first user avatar (referred to hereinafter as avatar1). This new orientation/position of avatar1 is downloaded (e.g., via a synchronize call/operation/instruction) from the master server program 5205 to the second client 5225 (and/or client computing device 5200) for rendering in the head mounted display 5175 of the second user 5155. As each synchronized update is received from the server 5205, the associated avatar1 positioning in the scene is rendered by the client/display 5225, 5175. The second user views in their head mounted display 5175 avatar1 walking towards the sliding door 5110.

As illustrated with respect to States 7-9 of this example, the cluster system manages the technicalities discussed herein associated with the substantially real-time communications between client and server and server and clients (e.g. real-time in nature but subject to certain processing and network transmission delays/latencies). In addition, this example illustrates how the cluster system manages/enables the various avatar renderings to occur in their perspectively correct views for each user in the multi-user system, wherein the user's view or viewpoint of each avatar/participant in the simulation is based in part on positional changes of each avatar/participant in the simulation (optionally including the extremities of each avatar/participant) together with positional changes from which each user views the simulation. Thus, because the cluster system manages the technicalities, the simulation content creator/developers may concentrate their creative efforts on the simulation application itself rather than having to code/develop programs to deal with such technicalities.

State 10. Upon reaching the sliding door 5110, the first user 5150 in this example reaches out with the gloved hand to grab a handle on the sliding door 5110. In this example, arm movement is treated as a non-privileged operation (e.g., a remote server operation). The PPT motion tracking cameras 5310-5340 record the first user's 5150 hand reaching towards the handle via the identified infrared light signal emitted by the LED marker(s) attached to, for example, the glove 5160. At least partly in response to accessing the privileged operation configuration information, the master server program 5205 executing on the computing device 5200 receives the glove tracking data from computing device 5230 and performs certain calculations with respect to the received infrared marker(s) associated with the first user's hand to create a series of hand position matrices (e.g., where a given position matrix expresses the position coordinates of the first user's hand). The resulting one or more position matrices are downloaded (e.g., via a synchronize command/operation/instruction) from the master server program 5205 to the clients 5215, 5225.

State 11. Upon receipt by the client 5215 of the hand tracking position data, a new position of the first user's hand is rendered (or caused to be rendered) in the first user's head mounted display 5170. Upon receipt by the client 5225 of the hand tracking position data, a new position of the first user's hand in Avatar1 is rendered in the second user's head mounted display 5170. The position calculation sequence is repeated by the master server program 5205 and rendering by the clients 5215, 5225 is repeated as the gloved hand of the first user reaches for the sliding door handle.

State 12. In this example, first user 5150 grasps with the gloved hand the handle on the sliding door 5110. From the received light emitted from the glove markers of the first user (e.g., the infrared light recorded by one or more of the cameras 5310-5340), and at least partly in response to accessing the privileged operation configuration information, the master server 5205 identifies by way of the output from computing device 5230 that the first user's right hand has made contact with the sliding door handle (e.g., via a position in space of the first user's extended right hand) of the simulation (note, in this virtual reality simulation embodiment there is no physical door or handle).

In this example, the master server 5205 instructs (e.g., via a non-privileged master server synchronize command/operation/instruction directed only to client 5215 using, for example, a masking synchronous command/operation/instruction) the client 5215 to create a sense of touch in the gloved hand of the first user, by for example, causing via an instruction/operation the inflating of a collection of air pockets in the glove 5160 on the palm side to create pressure force against the user's hand. Thus, optionally, touch feedback is processed/caused as a non-privileged operation.

Alternatively or in addition, optionally the cluster system uses the sensors in the glove 5160 (rather than the determined position of the glove hand) of the first user to detect a grasp action by the user (this example privileged operation is illustrated in FIG. 34 rather than a non-privileged operation described herein above). At least partly in response to accessing the privileged operation configuration information, the client 5215, upon detecting the glove grasp (e.g. fingers closing), in a client privileged operation, instructs the glove to create a sense of touch as previously described herein.

State 13. In this example, first user 5150 opens the door 5110 with a left to right movement of the gloved hand. The master server 5205 generates a series of hand position matrices (e.g., via the received tracking data from computing device 5230 as previously described and at least partly in response to accessing the privileged operation configuration information, for example, with respect to State 10). A series of new arm position movements are determined and downloaded (e.g., via a synchronize commands/operations/instructions) from the master server 5205 to the clients 5215, 5225.

State 14. Upon receipt by the client 5215 of the hand tracking position data, a new position of the first user's hand and the door 5110 is rendered (or caused to be rendered) in the first user's head mounted display 5170. Upon receipt by the client 5225 of the hand tracking position data, a new position of the first user's hand in Avatar1 and the door movement 5110 is rendered in the second user's head mounted display 5175. The position calculation sequence is repeated by the master server program 5205 and rendering by the clients 5215, 5225 as the gloved hand of the first user opens the sliding door 5110.

State 15. First user 5150 releases the door handle, which in this example, is treated as a privileged client operation, and so is processed locally by the client 5215. At least partly in response to accessing the privileged operation configuration information, the client 5215 upon detecting the handle release via sensors in the glove (e.g., by detecting the opening of the user's hand), instructs the glove 5160 to remove the pressure force (e.g., by deflating the collection of air pockets in glove 5160.)

Optionally, the door handle release action is neither identified nor received in this example by the master server program 5205, and consequently, the action is not rendered in the client 5225. Optionally, the cluster system enables one or more clients 5215, 5225 to send/receive communications between each other. Optionally, client-to-client communication is enabled via the master server program 5205. Optionally, client-to-client communication is enabled via user interface control(s) of the client and is not enabled via the master server program 5205. Optionally, the handle release action of this example is communicated directly from the client 5215 to the client 5225 in a peer-to-peer communication (i.e., not via the master server program 5205). Optionally, the receipt of the handle release action by the client 5225 causes the avatar1's right hand as viewed by the second user 5155 to be colored an unnatural skin color (e.g., green) via customized software of the clients 5215, 5225. Thus, as illustrated in this example, the cluster system facilitates/enables client communications and through these communications, customized software of the simulation can be developed/incorporated to provide certain simulation effects specific to one or a plurality of clients.

State 16. First user 5150 walks through the door opening. The PPT motion tracking cameras 5310-5340 record the first user's 5150 steps through the simulated door 5110 via the infrared light emitted by the tracking markers affixed to the head mounted display 5170. At least partly in response to accessing the privileged operation configuration information, the client 5215 executing on the computing device 5210 receives from the computing device 5230 tracking data and performs certain calculations with respect to the infrared markers associated with the first user 5150 to create a series of position matrices corresponding to the first user movement (e.g., as previously described with respect to, for example, State 7), and a new viewpoint is rendered (or caused to be rendered) by the client/display 5215, 5170 for each new position/orientation matrix (e.g., via a local context privileged rendering operation as previously described herein). The image capture, processing, and client 5215 rendering sequence is continually repeated as the first user 5150 walks through the sliding door with the first user's head mounted display 5170 displaying a view of the inside of Room 5105.

State 17. As similarly described with respect to State 8, after each new first user position matrix is determined/calculated in State 16, the new position matrix is sent by the client 5215 over the data network 5250 to the master server program 5205.

State 18. With respect to the master server program 5205, the master server program 5205 receives the generated position matrices corresponding to the first user from the client 5215. For a given received position matrix from the client 5215, the master server 5200 creates, based at least in part on and taking into consideration the current position data (including head position and body location) of the second user 5155, a new orientation/position of avatar1. This new avatar1 positioning data is downloaded (e.g., via a synchronize call/operation/instruction) from the master server program 5205 to the second client 5225 (and/or client computing device 5200) for rendering in the head mounted display 5175 of the second user 5155 (see also State 9). As each synchronized update is received from the server 5205, the associated avatar1 positioning in the scene is rendered by the client/display 5225, 5175. The second user views in their head mounted display 5175 avatar1 walking through the sliding door. In this example embodiment, at least a portion of the front part of the avatar's body is concealed by the wall as the first user enters the second room (Room 5105).

State 19. When the master server program 5205 determines that the first user 5150 has cleared the door passage, the master server program 5205 simulates the door 5110 closing behind the first user. The master server program 5205 determines the first user 5150 has cleared the door passage based on the at least in part on the received position matrices from the client 5215 or, optionally, by independently identifying first user 5150 marker data from the tracking data output of the computing device 5230. The master server program 5205 downloads (e.g., via a synchronize call/operation/instruction) to the client 5225 an update to the VR scene wherein the sliding door closes and/or provides the client with instructions to close the door in the VR scene. The client/display 5225, 5175 renders (or causes the rendering) a view of the door closing scene(s) behind the avatar1 in the viewpoint of the second user's head mounted display 5175.

Thus, as described above, an example clustered system provides a multi-user virtual reality simulation via a client/server architecture. Advantageously, the client/server architecture enables timely viewing of certain privileged user actions and server-based synchronization of non-privileged user actions to create a lifelike simulation experience. In addition, many of the technical details of rendering avatar representations of simulation participant in the viewpoint of each user is derived by the server and made available to the clients in a format compatible with the hardware used by each participant. It is understood that while certain examples above may refer to a virtual slideshow, the foregoing example processes and systems may be similarly utilized with other virtual documents and presentation formats.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals and other computing devices described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A cluster system, comprising:
a plurality of motion tracking cameras, wherein the plurality of motion tracking cameras are placeable in a physical space coincident with a presenter and a first user, the plurality of motion tracking cameras configured to detect infrared light and to communicate position data, corresponding to detected infrared light;
non-transitory media storing instructions readable by the cluster system, that when executed by the cluster system, cause the cluster system to:
join a head mounted display of the first user to a virtual reality presentation session in response to receipt of a first control selection by the first user;
render during the virtual reality presentation session, in the head mounted display of the first user, a scene defined by a first slide of a virtual reality slide presentation that comprises a plurality of virtual reality slides, wherein an initial placement of the first user in the scene is defined by the virtual reality slide presentation;
join a head mounted display of the presenter to the virtual reality presentation session in response to receipt of a second control selection by the presenter;
render, in the head mounted display of the presenter, the scene defined by the first slide of the virtual reality slide presentation and a representation of the first user;
subsequent to the presenter joining the virtual reality presentation session, render, in the head mounted display of the first user, a representation of the presenter wherein an initial placement of the presenter in the scene is defined by the virtual reality slide presentation; and in response to receipt of a third control selection by the presenter, advance the virtual reality slide presentation to a second slide wherein the second slide causes a corresponding scene change to be rendered in the head mounted display of the presenter and the head mounted display of the first user.

2. The cluster system of claim 1, wherein the cluster system is configured to receive the virtual reality slide presentation from a presentation designer client configured to enable virtual reality slide presentations to be designed using a two dimensional display.

3. The cluster system of claim 1, wherein the cluster system is configured to receive the virtual reality slide presentation from a presentation designer client configured to enable virtual reality slide presentations to be designed and to display a thumbnail version of one or more slides of a virtual reality slide presentation being designed.

4. The cluster system of claim 1, wherein the plurality of motion tracking cameras are configured to derive an identity of one or more markers from a detected repetitive pattern of infrared light pulses.

5. The cluster system of claim 1, wherein a portion of the slides of the virtual reality slide presentation comprises a virtual reality recording of a second user presenting using one or more of the slides of the virtual reality slide presentation.

6. The cluster system of claim 1, wherein a portion of the cluster system further comprises one or more computing devices configured in a cloud-based computing environment.

7. The cluster system of claim 1, wherein the cluster system further comprises:
a master computing device; and
wherein the plurality of motion tracking cameras are configured to communicate position data corresponding to detected infrared light to the master computing device.

8. The cluster system of claim 1, wherein the corresponding scene change in response to the slide advance comprises the appearance of an object.

9. A cluster system, comprising:
a first plurality of motion tracking cameras, wherein the first plurality of motion tracking cameras are placeable in a physical space coincident with a presenter, the plurality of motion tracking cameras configured to detect infrared light and to communicate position data, corresponding to detected infrared light;
a second plurality of motion tracking cameras, wherein the second plurality of motion tracking cameras are placeable in a physical space coincident with a first user, the plurality of motion tracking cameras configured to detect infrared light and to communicate position data, corresponding to detected infrared light;
non-transitory media storing instructions readable by the cluster system, that when executed by the cluster system, cause the cluster system to:
join a head mounted display of the first user to a virtual reality conference session in response to receipt of a first control selection by the first user;
render during the virtual reality conference session, in the head mounted display of the first user, a scene defined by a first slide of a virtual reality slide presentation comprising a plurality of slides, wherein an initial placement of the first user in the scene is defined by the virtual reality slide presentation;
join a head mounted display of the presenter to the virtual reality conference session in response to receipt of a first control selection by the presenter;
render, in the head mounted display of the presenter, the scene defined by the first slide of the virtual reality slide presentation and a representation of the first user;
subsequent to the presenter joining the virtual reality conference session, render, in the head mounted display of the first user, a representation of the presenter wherein an initial placement of the presenter in the scene is defined by the virtual reality slide presentation; and
in response to receipt of a third control selection by the presenter, advance the virtual reality slide presentation to a second slide wherein the second slide causes a corresponding scene change to be rendered in the head mounted display of the presenter and the head mounted display of the first user.

10. The cluster system of claim 9, wherein first user is geographically remote from the presenter.

11. The cluster system of claim 9, wherein the cluster system further comprises:
a first computing device local to the first plurality of motion tracking cameras;
a master computing device; and,
wherein the position data corresponding to detected infrared light is transmitted to the master computing device of the cluster system via the first computing device.

12. The cluster system of claim 9, wherein the virtual reality slide presentation is designed via a first user interface and the first user interface displays a thumbnail version of one or more slides of the virtual reality slide presentation.

13. The cluster system of claim 9, wherein the first plurality of motion tracking cameras and second plurality of motion tracking cameras are configured to derive an identity of one or more markers from a detected repetitive pattern of infrared light pulses.

14. The cluster system of claim 9, wherein a portion of the slides of the virtual reality slide presentation comprises a virtual reality recording of a second user presenting using one or more of the slides of the virtual reality slide presentation.

15. The cluster system of claim 9, wherein the cluster system is configured to receive the virtual reality slide presentation from a presentation designer client configured to enable virtual reality slide presentations to be is designed via a computer-aided design user interface.

16. The cluster system of claim 9, wherein a portion of the cluster system further comprises one or more computing devices configured in a cloud-based computing environment.

17. The cluster system of claim 9, wherein the cluster system further comprises:
a master computing device; and
wherein the first plurality of motion tracking cameras and the second plurality of motion tracking cameras are configured to communicate position data corresponding to detected infrared light to the master computing device.

18. The cluster system of claim 9, wherein the corresponding scene change in response to the slide advance comprises the appearance of an object.

19. Non-transitory media that stores instructions that when executed by a computer system cause the computer system to perform operations comprising:
- render, in a head mounted display of a first user, a scene defined by a first slide of a virtual slide reality presentation comprising a plurality of virtual reality slides, wherein an initial placement of the first user in the scene is defined by the virtual reality slide presentation;
- link a head mounted display of presenter to a virtual reality slide presentation session in response to receipt of a first control selection by the presenter;
- render during the virtual reality slide presentation session, in the head mounted display of the presenter, the scene defined by the first slide of the virtual reality slide presentation and a representation of the first user;
- subsequent to the presenter joining the virtual reality slide presentation session, render, in the head mounted display of the first user, a representation of the presenter, wherein an initial placement of the presenter in the scene is defined by the virtual reality slide presentation; and
- in response to receipt of a second control selection by the presenter, advance the virtual reality slide presentation to a second slide, wherein the second slide causes a corresponding scene change to be rendered in the head mounted display of the presenter and the head mounted display of the first user.

* * * * *